US011789174B2

(12) United States Patent
Widmer et al.

(10) Patent No.: US 11,789,174 B2
(45) Date of Patent: Oct. 17, 2023

(54) FOREIGN OBJECT DETECTION CIRCUIT

(71) Applicant: WiTricity Corporation, Watertown, MA (US)

(72) Inventors: Hans Peter Widmer, Wohlenschwil (CH); Lukas Sieber, Olten (CH)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 18/059,306

(22) Filed: Nov. 28, 2022

(65) Prior Publication Data

US 2023/0094691 A1 Mar. 30, 2023

Related U.S. Application Data

(63) Continuation of application No. 17/232,868, filed on Apr. 16, 2021, now Pat. No. 11,513,251, which is a
(Continued)

(51) Int. Cl.
*G01V 3/10* (2006.01)
*H02J 50/12* (2016.01)
*H02J 50/60* (2016.01)

(52) U.S. Cl.
CPC .............. *G01V 3/104* (2013.01); *H02J 50/12* (2016.02); *H02J 50/60* (2016.02)

(58) Field of Classification Search
CPC ......... G01V 3/104; G01V 3/101; H02J 50/12; H02J 50/60; H02J 50/10; Y02T 10/70;
(Continued)

(56) References Cited

U.S. PATENT DOCUMENTS 11,002,874 B2    5/2021  Widmer et al.
2009/0039873 A1* 2/2009  Kirchdoerffer ...... G01D 5/2046
                                              324/207.16
(Continued)

FOREIGN PATENT DOCUMENTS

CN    107112808    8/2017
CN    107529346    12/2017
(Continued)

OTHER PUBLICATIONS

Wang B, Long J, Teo KH. Multi-Channel Capacitive Sensor Arrays. Sensors. 2016; 16(2):150 https://doi.org/10.3390/s16020150 (Year: 2016).*
(Continued)

*Primary Examiner* — Tung X Nguyen
*Assistant Examiner* — Robert P Alejnikov, Jr.
(74) *Attorney, Agent, or Firm* — Colby Nipper PLLC

(57) ABSTRACT

The present disclosure describes techniques for detecting foreign objects. In some aspects, an apparatus for detecting objects is provided. The apparatus includes a plurality of sense circuits, each of the plurality of sense circuits including a primary sense coil having a first terminal and a second terminal, a secondary sense coil having a first terminal and a second terminal, and a capacitor having a first terminal and a second terminal. The first terminal of the capacitor is electrically connected to the second terminals of each of the primary sense coil and the secondary sense coil. The apparatus further includes a driver circuit electrically connected to the first terminal of the primary sense coil of each of the plurality of sense circuits. The apparatus further includes a measurement circuit electrically connected to the first terminal of the secondary sense coil of each of the plurality of sense circuits.

15 Claims, 22 Drawing Sheets

Related U.S. Application Data continuation of application No. 16/358,534, filed on Mar. 19, 2019, now Pat. No. 11,002,874.

(60) Provisional application No. 62/783,488, filed on Dec. 21, 2018.

(58) Field of Classification Search
CPC .... Y02T 10/7072; Y02T 90/14; B60L 53/122; B60L 53/124
USPC ........................................................ 324/200
See application file for complete search history.

(56) References Cited

U.S. PATENT DOCUMENTS

| | | | |
|---|---|---|---|
| 2012/0326513 A1* | 12/2012 | Chiu ................. | H02J 9/06 307/66 |
| 2014/0015329 A1 | 1/2014 | Widmer et al. | |
| 2014/0091634 A1* | 4/2014 | Mayo ................. | H02J 50/40 307/104 |
| 2016/0087687 A1* | 3/2016 | Kesler ................ | H02J 50/80 307/104 |
| 2016/0118806 A1* | 4/2016 | Standke ............. | H02J 50/12 307/104 |
| 2016/0187519 A1 | 6/2016 | Widmer et al. | |
| 2016/0187520 A1 | 6/2016 | Widmer et al. | |
| 2018/0076671 A1 | 3/2018 | Chopra et al. | |
| 2018/0128650 A1 | 5/2018 | Bruwer et al. | |
| 2018/0294681 A1* | 10/2018 | Bae .................... | H02J 50/80 |
| 2018/0334050 A1* | 11/2018 | Widmer ............. | B60L 53/126 |
| 2019/0225099 A1 | 7/2019 | Sieber et al. | |
| 2020/0200937 A1 | 6/2020 | Widmer et al. | |
| 2021/0231825 A1 | 7/2021 | Widmer et al. | |
| 2023/0099095 A1 | 3/2023 | Widmer et al. | |

FOREIGN PATENT DOCUMENTS

| | | |
|---|---|---|
| CN | 108092414 | 5/2018 |
| EP | 0826984 | 3/1998 |
| EP | 1965177 | 9/2008 |
| JP | 2015533273 | 11/2015 |
| KR | 20130034681 | 4/2013 |
| WO | 2020131194 | 6/2020 |

OTHER PUBLICATIONS

"Non-Final Office Action", U.S. Appl. No. 18/059,280, filed Jun. 9, 2023, 11 pages.

"International Preliminary Report on Patentability", Application No. PCT/US2019/054844, dated Jun. 16, 2021, 10 pages.

"International Search Report and Written Opinion", PCT Application No. PCT/US2019/054844, dated Jan. 30, 2020, 15 pages.

"Non-Final Office Action", U.S. Appl. No. 16/358,534, dated Sep. 16, 2020, 26 Pages.

"Notice of Allowance", U.S. Appl. No. 16/358,534, dated Jan. 11, 2021, 11 pages.

"Notice of Allowance", U.S. Appl. No. 17/232,868, dated Oct. 6, 2022, 12 pages.

"Restriction Requirement", U.S. Appl. No. 17/232,868, dated Sep. 2, 2022, 7 pages.

"Foreign Office Action", JP Application No. 2021-536200, dated May 22, 2023, 10 pages.

"Notice of Allowance", U.S. Appl. No. 18/059,280, dated Aug. 30, 2023, 8 pages.

* cited by examiner

FOREIGN OBJECT DETECTION CIRCUIT

RELATED APPLICATIONS

This application is a continuation of U.S. Utility patent application Ser. No. 16/358,534 filed Mar. 19, 2019 entitled "Foreign Object Detection Circuit Using Mutual Impedance Sensing" which in turn claims priority to Provisional Application No. 62/783,488 entitled "Foreign Object Detection Circuit Using Mutual Impedance Sensing" filed Dec. 21, 2018 and assigned to the assignee hereof and hereby expressly incorporated by reference herein in its entirety.

FIELD

The present disclosure relates generally to object detection, for example, in an application for inductive power transfer. In particular, the present disclosure is directed to a circuit for measuring changes of a mutual impedance between sense coils of a plurality of sense circuits.

BACKGROUND

Object detection may be valuable for a variety of applications, and in particular for applications where it may be useful to detect objects within a predetermined region. For example, in certain inductive power transfer applications (or other types of wireless power transfer applications) it may be useful to be able to rapidly detect foreign objects that may be present in an inductive power region and that could be susceptible to induction heating due to the high magnetic field strength in that region. In an inductive wireless electric vehicle charging (WEVC) system, magnetic flux densities above a transmit coil (e.g., a primary coil) can be at relatively high levels to allow for sufficient power transfer (e.g., for a WEVC system power may be transferred on the order of kilowatts—e.g., 3.3 kW, 11 kW, and the like). Metallic objects or other objects present in the magnetic field can experience undesirable induction heating. For this reason, foreign object detection (FOD) may be implemented to detect metal objects or other objects that are affected by a magnetic field generated by the coils of the wireless power transfer system. Solutions for improving sensitivity, cost effectiveness, accuracy, and reliability of an object detection system for various applications and such as for WEVC applications are desired.

SUMMARY

In one aspect of the disclosure, an apparatus for detecting objects is provided. The apparatus includes a plurality of sense circuits. Each of the plurality of sense circuits includes a primary sense coil having a first terminal and a second terminal, a secondary sense coil having a first terminal and a second terminal, and a capacitor having a first terminal and a second terminal. The first terminal of the capacitor is electrically connected to the second terminals of each of the primary sense coil and the secondary sense coil. The apparatus further includes a driver circuit electrically connected to the first terminal of the primary sense coil of each of the plurality of sense circuits. The apparatus further includes a measurement circuit electrically connected to the first terminal of the secondary sense coil of each of the plurality of sense circuits.

In another aspect of the disclosure, a method for measuring changes in electrical characteristics for detecting objects is provided. The method includes applying, from a driver circuit, an input signal at an operating frequency to a first terminal of a primary sense coil. A second terminal of the primary sense coil is electrically connected to a first terminal of a capacitor. The method further includes measuring, at a measurement circuit, an electrical characteristic at an output electrically connected to a first terminal of a secondary sense coil. A second terminal of the secondary sense coil is electrically connected to the first terminal of the capacitor. The method further includes detecting whether an object is proximate to the primary sense coil or the secondary sense coil based on the electrical characteristic.

In yet another aspect of the disclosure, an apparatus for detecting objects is provided. The apparatus includes a plurality of sense circuits. Each of the plurality of sense circuits includes a primary sense coil, a secondary sense coil, and means for compensating mutual reactance between the primary sense coil and the secondary sense coil substantially at an operating frequency of a sense signal. The apparatus further includes means for applying an input signal to each of the plurality of sense circuits. The apparatus further includes means for measuring an output signal at an output of the secondary sense coil. In an aspect, the apparatus may further include means for detecting whether an object is proximate to the primary or the secondary sense coil based on the output signal. In certain aspects, the means for detecting further includes means for determining a magnitude of a change in mutual impedance between the primary sense coil and the secondary sense coil based on the output signal.

In yet another aspect of the disclosure, an apparatus for detecting objects is provided. The apparatus includes a plurality of sense circuits. Each of the plurality of sense circuits includes a primary sense coil, a secondary sense coil, and a capacitor configured to compensate mutual reactance between the primary sense coil and the secondary sense coil substantially at an operating frequency of a sense signal. The apparatus further includes a driver circuit electrically connected to the primary sense coil of each of the plurality of sense circuits. The apparatus further includes a measurement circuit electrically connected to the secondary sense coil of each of the plurality of sense circuits. The apparatus further includes a detection circuit electrically connected to the measurement circuit and configured to determine whether an object is present based on determining a magnitude of a change in mutual impedance between the primary sense coil and the secondary sense coil based on the output of the measurement circuit.

In yet another aspect of the disclosure, an apparatus for detecting objects is provided. The apparatus includes a plurality of sense circuits. Each of the plurality of sense circuits includes at least one sense coil electrically coupled to a capacitor. The apparatus further includes a driver circuit including a first plurality of switches. Each of the first plurality of switches are respectively connected to each of the plurality of sense circuits. The apparatus further includes a measurement circuit comprising a second plurality of switches. Each of the second plurality of switches are respectively connected to each of the plurality of sense circuits (e.g., at an output). In some aspects, the apparatus may further include a detection circuit electrically connected to the measurement circuit and configured to determine whether an object is proximate the at least one sense coil of at least one of the plurality of sense circuits based on an output of the measurement circuit. In certain aspects, the driver circuit may include a current source circuit including an amplifier circuit having an amplifier output and a multiplexer electrically connected between the amplifier output and the plurality of sense circuits and configured to selectively connect each of the plurality of sense circuits to the amplifier output. In certain aspects, the measurement circuit may be configured to measure a voltage at the first terminal of the secondary sense coil. In certain aspects, the driver circuit may be configured to operate as a current source and is configured to maintain an output wherein changes in electrical impedance of each of the plurality of sense circuits have a substantially negligible impact on an electrical current signal provided by the driver circuit. In certain aspects, the at least one sense coil of each of the plurality of sense circuits may be positioned to be distributed over a predetermined area at least partially defined by a wireless power transmit coil configured to inductively transfer power. In certain aspects, a frequency of a magnetic field generated by the wireless power transmit coil is different than an operating frequency of a sense signal output by the driver circuit. In certain aspects, the measurement circuit may include an output multiplexer formed at least in part by the second plurality of switches and configured to selectively connect each of the plurality of sense circuits to a measurement amplifier circuit. In certain aspects, each of the plurality of sense circuits may further include a shunt inductor. In certain aspects, the capacitor and the shunt inductor may be configured as a high pass filter configured to attenuate influence of a wireless power transfer field. In certain aspects, the driver circuit may include a plurality of resistors where each of the plurality of resistors is respectively connected to each of the plurality of sense circuits.

In yet another aspect of the disclosure, an apparatus for detecting objects is provided. The apparatus includes a plurality of sense circuits. Each of the plurality of sense circuits includes a first primary sense coil, a second primary sense coil, and a secondary sense coil. The apparatus further includes a driver circuit electrically connected to the first primary sense coil and to the second primary sense coil of each of the plurality of sense circuits. The apparatus further includes a measurement circuit electrically connected to the secondary sense coil of each of the plurality of sense circuits. In an aspect, the apparatus may include a detection circuit configured to determine whether an object is proximate at least one of the sense coils based on an output of the measurement circuit. In an aspect, the driver circuit may include a first current source circuit configured to apply a first signal to the first primary sense coil. The driver circuit may further include a second current source circuit configured to apply a second signal to the second primary sense coil. In an aspect, the measurement circuit may be configured to measure an open-circuit voltage at an output of the secondary sense coil. In an aspect, the first current source circuit and the second current source circuit are configured to control amplitudes and phases of the first signal and the second signal such that magnetic flux components generated by the first primary sense coil and the second primary sense coil are substantially cancel (e.g., and voltage at an output of the secondary sense coil is substantially zero or fixed in the absence of an object). In an aspect, the driver circuit may include a first input multiplexer including a first plurality of switches electrically connected to each first primary sense coil of the plurality of sense circuits. In an aspect, the driver circuit may include a second input multiplexer including a second plurality of switches electrically connected to each second primary sense coil of the plurality of sense circuits. In certain aspects, the first primary sense coil, the second primary sense coil, and the secondary sense coil of each of the plurality of sense circuits may be positioned to be distributed over a predetermined area at least partially defined by a wireless power transmit coil configured to inductively transfer power. In certain aspects, a frequency of a magnetic field generated by the wireless power transmit coil is different than an operating frequency of sense signals output by the driver circuit.

BRIEF DESCRIPTION OF THE DRAWINGS

In the figures, the third and fourth digit of a reference number identify the figure in which the reference number first appears. The use of the same reference numbers in different instances in the description or the figures indicates like elements.

DETAILED DESCRIPTION

Figure 1:
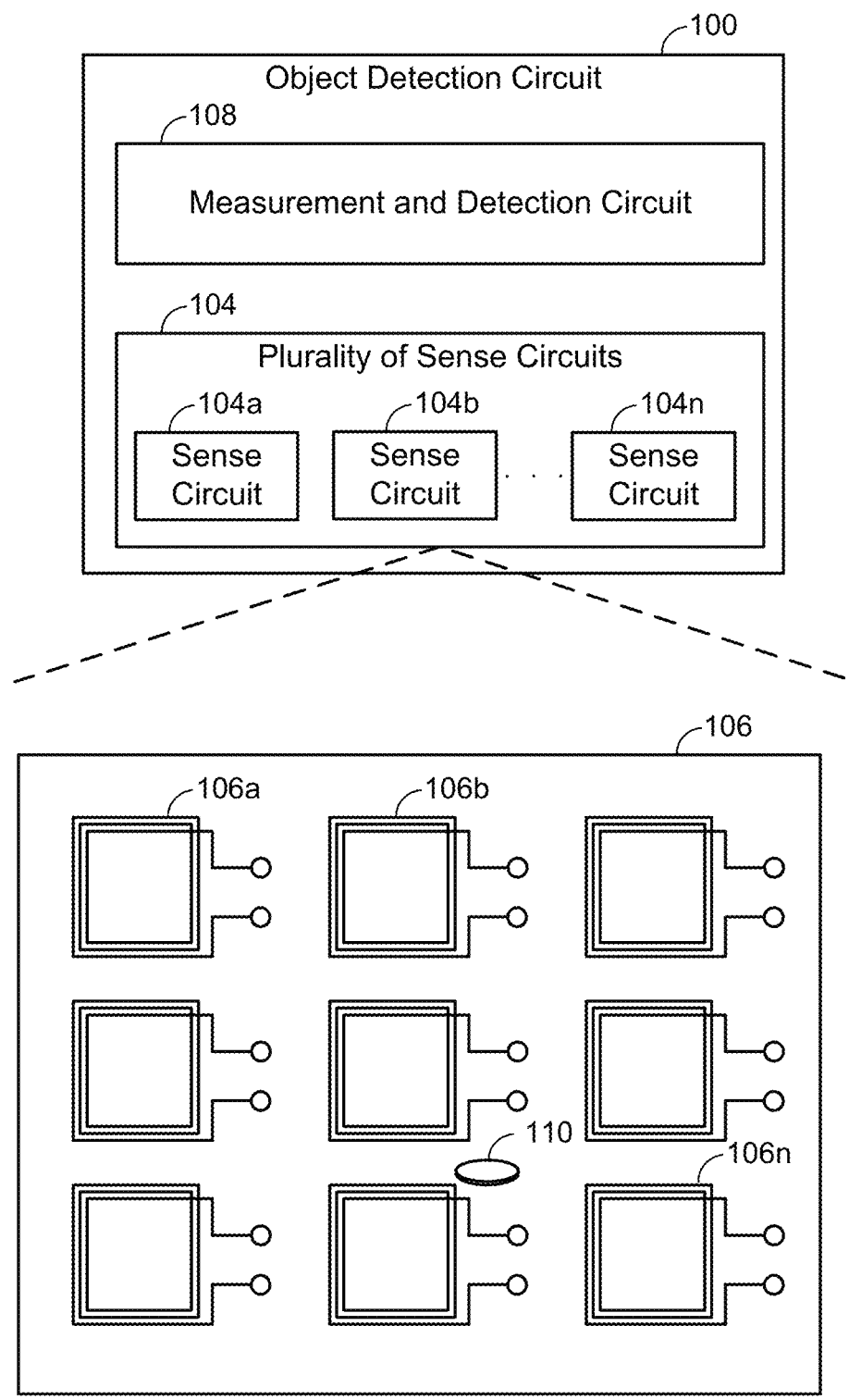
FIG. 1 illustrates an example implementation of an object detection circuit.

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

As mentioned above object detection (and particularly metal object detection) may be valuable for a variety of applications. For detection in a predetermined region an object detection system may include a plurality of sense elements (e.g., a planar array of sense coils) distributed across a predetermined area. The predetermined region may be defined by the space where metal objects may be found and where the magnetic flux density exceeds certain limits (e.g., a threshold determined based on what levels of temperature an object 110 might be heated up). This is generally a three-dimensional space. The number N of sense elements may be proportional or related to the minimum size of objects that are desirable to be detected. For a system that is configured to detect small objects (e.g., the size of a paper clip), the number of sense elements may be relatively high (e.g., in the order of 400). Drive circuitry for applying sense signals to each of the sense elements, the plurality of sense circuits each including a sense element and additional elements for conditioning, as well as corresponding measurement circuitry as needed for looking for changes in electrical characteristics that may correspond to the presence of an object may be costly or complex as the number N of sense elements increases.

Aspects of implementations described herein relate to configurations for driving and measurement circuitry for one or more sense circuits that allow for higher accuracy, sensitivity, and temperature stability as needed for detecting smaller objects. Aspects described herein relate to an implementation of the object detection circuit 100 of FIG. 1 based on a mutual impedance sensing approach that includes a sense signal source characterized by a current source (e.g., a quasi-ideal current source) that allows for determining changes in mutual impedance based on measuring a voltage (e.g., using a quasi-ideal voltage measurement circuit) in one or more sense circuits. Aspects of implementations based on mutual impedance sensing described in detail below allows for improved detection sensitivity e.g., in presence of strong temperature variations such as they may be experienced in an outdoor environment.

FIG. 1 illustrates an example implementation of an object detection circuit 100 that includes a plurality of (N) sense circuits 104 illustrated in FIG. 1 by sense circuits 104*a*, 104*b*, some dots, and sense circuit 104*n*. The plurality of sense circuits 104 is also referred herein as to the plurality of sense circuits 104*a*, 104*b*, . . . , 104*n*. As illustrated in FIG. 1, each sense circuit of the plurality of sense circuits 104*a*, 104*b*, . . . , 104*n* includes a corresponding sense element (e.g., a sense coil) of a plurality of (N) sense elements 106*a*, 106*b*, . . . , 106*n*, respectively, configured to sense a change in one or more electrical characteristics that change in response to the presence of the object 110 in proximity to at least one of the plurality of sense elements 106*a*, 106*b*, . . . , 106*n* to be able to provide detection coverage for an entire predetermined detection region. Each of the plurality sense circuit 104*a*, 104*b*, . . . , 104*n* may also include additional conditioning circuitry (not shown in FIG. 1) e.g., configured to improve measurement of a change in the one or more electrical characteristics. Each of the plurality of sense circuits 104a, 104b, . . . , 104n also defines at least one measurement port (not shown in FIG. 1) where the change in an electrical characteristic (e.g., an impedance) is measured and refers to.

Each of the plurality of sense elements 106a, 106b, . . . , 106n is shown in FIG. 1 as a "circular" coil for purposes of illustration. However, in other implementations, the sense elements 106a, 106b, . . . , 106n may include a sense coil having another coil topology e.g., a figure-eight-like (DD) topology (e.g., as shown in FIG. 6C). In yet other implementations, the plurality of sense elements 106a, 106b, . . . , 106n may include sense coils of a mixed coil topology e.g., "circular" and DD (e.g., as shown in FIG. 6C). In further implementations, the plurality of sense elements 106a, 106b, . . . , 106n may include sense coils (e.g., solenoid coils) with a ferrite core (not shown herein) that are physically smaller compared to "air" coils. In yet further implementations, the plurality of sense elements 106a, 106b, . . . , 106n may include other inductive devices that can be used for generating and detecting a magnetic field for detecting an object 110. In some implementations further described herein, each of the plurality of sense elements 106a, 106b, . . . , 106n may include a double or even a triple sense coil arrangement (e.g., as shown in FIGS. 7F to 7H) that may be used in conjunction with a transimpedance or mutual impedance sensing approach. In some implementations, the plurality of sense elements 106a, 106b, . . . , 106n is arranged in an array 106, such as a two-dimensional array 106 as shown in FIG. 1. However, in other implementations, the sense elements of the plurality of sense elements 106a, 106b, . . . , 106n are arranged in other configurations that do not conform to rows or columns (radial or interleaved), are at least partially overlapping or have irregular spacing, have different size, have different shapes (circular, hexagonal, etc.), or cover irregular detection areas, or any combination thereof. As such the term "array" as used herein denotes a plurality of sense elements 106a, 106b, . . . , 106n that are arranged over a predetermined area. Furthermore, the number N of sense elements of an array 106 and thus the number N of sense circuits can vary widely based on the application including the total region in which the object 110 is to be detected and the smallest size of an object the object detection circuit 100 is configured to detect.

Each of the plurality of sense circuits 104a, 104b, . . . , 104n including a corresponding sense element of the plurality of sense elements 106a, 106b, . . . , 106n are operably connected to a measurement and detection circuit 108. The measurement and detection circuit 108 is configured to measure one or more electrical characteristics at each of the plurality of sense circuits 104a, 104b, . . . , 104n and process the measurements to output a signal indicative of whether presence of an object 110 is detected. In some aspect, the output may include the location of the object 110 based on information about the particular sense element of the plurality of sense elements 106a, 106b, . . . , 106n at which the object 110 is detected. The measurement and detection circuit 108 may be configured to selectively (e.g., sequentially) apply a sense signal individually to each of the plurality of sense circuits 104a, 104b, . . . , 104n to allow for measurement of changes in at least one electrical characteristic at each of the plurality of sense circuits 104a, 104b, . . . , 104n in response to the presence of the object 110. The measurement and detection circuit 108 further includes a measurement circuit to output for each of the plurality of sense circuits 104a, 104b, . . . , 104n at least one measurement value indicative of an electrical characteristic.

The measurement and detection circuit 108 may include signal processing circuitry configured to process and filter the measurement output and determine whether an object 110 is potentially present (e.g., based on a time-differential detection approach). At least a portion of the measurement and detection circuit 108 may be implemented by one or more micro-controllers or processors. For example, at least a portion of the measurement and detection circuit 108 may be implemented as an application-specific integrated circuit (ASIC), a field programmable gate array (FPGA) device, digital signal processor (DSP), or another processor device. The measurement and detection circuit 108 may be configured to receive information from each of the components of the object detection circuit 108 and perform calculations based on the received information. The measurement and detection circuit 108 may be configured to generate control signals for each of the components that may adjust the operation of that component. The measurement and detection circuit 108 may further include a memory (not shown) configured to store data, for example, such as instructions for causing the measurement and detection circuit 108 to perform particular functions, such as those related to object detection. As will be described further, for purposes of selectively driving each of the plurality of sense circuits 104a, 104b, . . . , 104n and measuring the output of each of the plurality of sense circuits 104a, 104b, . . . , 104n further analog or other circuit components may be included in the measurement and detection circuit 108.

In an exemplary implementation, an object 110 is detected by applying a sinusoidal sense signal and by measuring a change of an impedance at each of the plurality of sense circuits 104a, 104b, . . . , 104n. While the description may refer to sinusoidal signals it should be appreciated that any alternating voltage or alternating current may be applied and are contemplated by different implementations described herein. For example, the object detection circuit 100 may be configured to detect metallic objects (or other objects) that can cause changes in at least one of an impedance (e.g., a mutual impedance) as measured in each of the plurality of sense circuits 104a, 104b, . . . , 104n. In an exemplary implementation, the measurement and detection circuit 108 is configured to cause each of the plurality of sense elements (e.g., sense coils) 106a, 106b, . . . , 106n (e.g., sequentially) to generate an alternating magnetic field at an operating frequency also referred herein as to the sense frequency $f_s$. If a metallic object 110 is present in the alternating magnetic field as generated by a sense element, eddy currents will be generated in the object 110 if the object is electrically conductive (metallic). According to Lentz' law, the eddy currents in the object 110 will generate another (secondary) magnetic field that interacts with the respective sense element (e.g., a mutual coupling is developed). This may cause a change in an electrical characteristic (e.g., an impedance) of at least a portion of the plurality of sense elements 106a, 106b, . . . , 106n and thus a change in an electrical characteristic as measured at the at least one measurement port of the corresponding sense circuits of the plurality of sense circuits 104a, 104b, . . . , 104n. Other interactions such as electric field (capacitive) interactions or ferromagnetic interaction between an object 110 and a sense element (e.g., a sense coil) of the plurality of sense elements 106a, 106b, . . . , 106n are also possible that cause a change in an electrical characteristic (e.g., an impedance) of at least a portion of the plurality of sense elements 106a, 106b, . . . , 106n.

In other implementations, an object 110 is detected by applying a sense signal different from a sinusoidal signal (single frequency) and by measuring a change in a response to that signal. In an exemplary implementation, the measurement and detection circuit 108 is configured to selectively (e.g., sequentially) excite each of the plurality of sense elements 106a, 106b, . . . , 106n with a pulse suitable for measuring an impulse response and presence of an object is determined based on measuring a change in an impulse response in each of the plurality of sense circuits 104a, 104b, . . . , 104n.

In another exemplary implementation, the measurement and detection circuit 108 is configured to selectively (e.g., sequentially) drive each of the plurality of sense circuits 104a, 104b, . . . , 104n with a multiple frequency (multi-tone) signal and presence of an object is determined based on measuring a change in an impedance as measured in each of the plurality of sense circuits 104a, 104b, . . . , 104n and for each frequency component individually.

In another exemplary implementation, the measurement and detection circuit 108 is configured to selectively (e.g., sequentially) drive each of the plurality of sense circuits 104a, 104b, . . . , 104n with another suitable waveform (e.g., a pseudo-noise signal) and presence of an object 110 is determined based on measuring a change in a response to that waveform in each of the plurality of sense circuits 104a, 104b, . . . , 104n.

The descriptions of the object detection circuit 100 herein assume a measurement and detection circuit 100 that is configured to detect changes in an impedance at a single frequency and determine if the object 110 is present in proximity to at least one of the plurality of sense elements 106a, 106b, . . . , 106n. However, this should not exclude implementations using a measurement and detection circuit 100 that is configured to detect changes in one or more electrical characteristics using other sense signal waveforms to determine whether an object 110 is present.

Example Inductive Wireless Power Application for Object Detection

The object detection circuit 100 of FIG. 1 may be used in a variety of applications for detecting objects, such as metallic objects, within a predetermined detection region as previously defined. In one example mentioned above, in an inductive wireless power transfer system, magnetic flux densities above a transmit coil (e.g., a primary coil) and below a receive coil (e.g., secondary coil) can be at relatively high levels to allow for sufficient power transfer (e.g., for a wireless electric vehicle charging (WEVC) system power may be transferred on the order of kilowatts, e.g., 3.3 kW, 11 kW, or at even higher levels). Metallic objects or other objects present in the magnetic field can experience undesirable induction heating based on interaction with the wireless power field. For this reason, the object detection circuit 100 may be integrated into a wireless power transfer system to detect metal objects or other objects that are affected by a magnetic field generated by the coils used for the wireless power transfer. Such detection may allow the wireless power transfer system to respond appropriately (e.g., reduce or stop power transmission, alert a user, and the like).

Figure 2A:
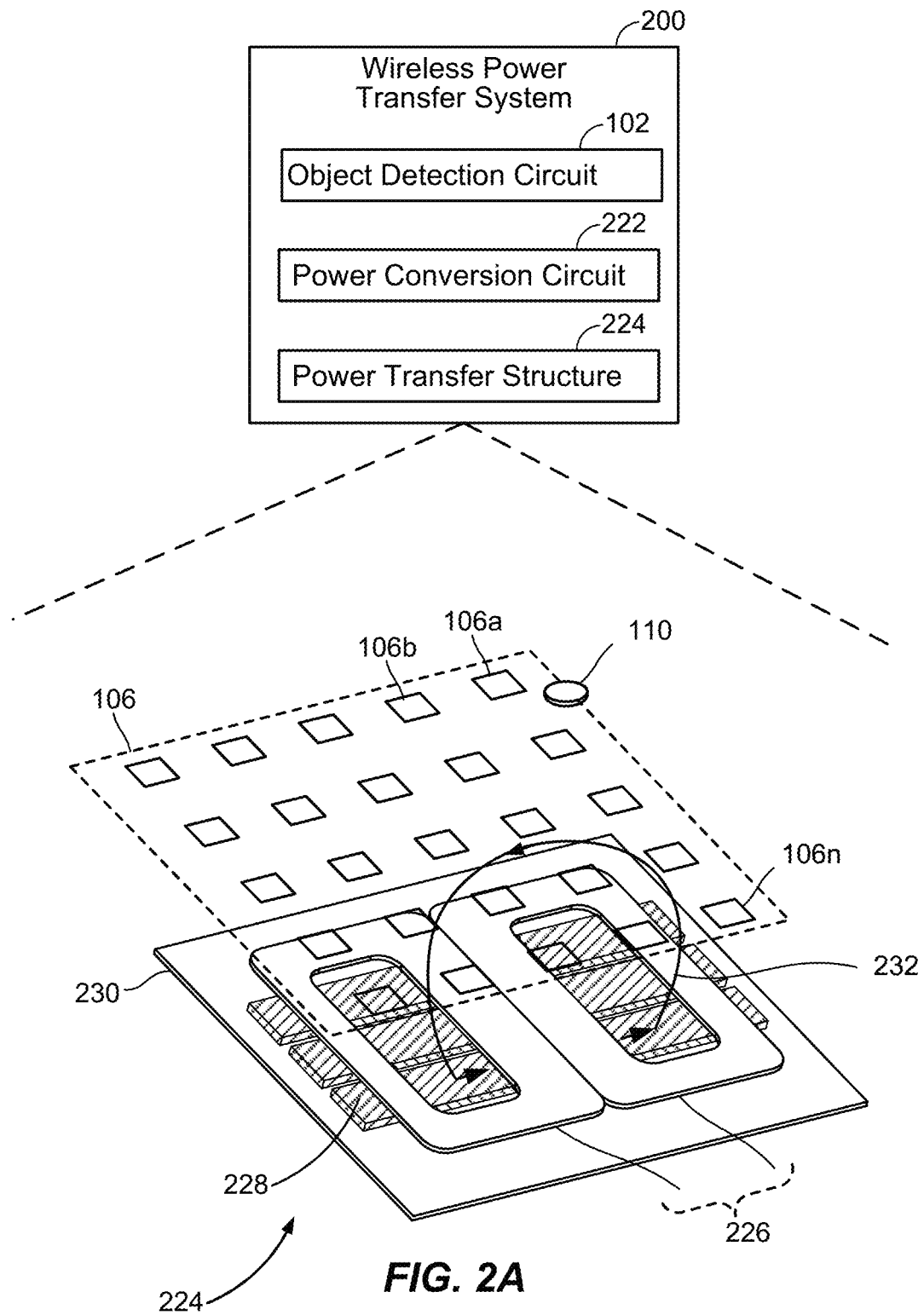
FIG. 2A is a perspective view illustrating an example implementation of a wireless power transfer system including the object detection circuit of FIG. 1.

FIG. 2A illustrates an example implementation of a wireless power transfer system 200 including the object detection circuit 100 of FIG. 1, a power conversion circuit 222 and a wireless power transfer structure 224. The wireless power transfer system 200 may depict either a wireless power transmit system that generates a magnetic field 232 for transferring power or a wireless power receive system that can couple and receive power via the magnetic field 232. When the wireless power transfer system 200 is configured as a wireless power transmit system, the power conversion circuit 222 is configured to convert power from a power source (not shown) to a suitable operating frequency (e.g., 85 kHz) and form for wireless power transfer via the wireless power transfer structure 224. It may be more likely that when integrated with an object detection circuit 100, the wireless power transfer system 200 may be a wireless power transmit system as power may be generally transferred from the ground or other upward facing surface where metallic objects will generally come to a rest. However other implementations are possible, e.g., the object detection circuit 100 or a portion thereof may be also integrated into a wireless power receive system. When the wireless power transfer system 200 is configured as a wireless power receive system, the power conversion circuit 222 is configured to convert power received via the wireless power transfer structure 224 into a suitable form (e.g., DC with a suitable voltage and current level) for providing power to a load, such as a battery.

The wireless power transfer structure 224 (also sometimes referred to as a "pad") is configured to wirelessly transmit or receive power. FIG. 2A illustrates one example of a wireless power transfer structure 224 and how the sense element array 106 of FIG. 1 may be integrated. The wireless power transfer structure 224 includes a coil 226 also referred to as the wireless power transfer coil that is configured to generate an alternating magnetic field when driven with a current by the power conversion circuit 222. The wireless power transfer structure 224 may further include ferrite 228 configured to channel and/or provide a path for magnetic flux (e.g., may be arranged in one or more ferrite bars which can be a combination of ferrite tiles arranged to form the bars). The power transfer structure 224 may also include a shield 230 (also sometimes referred to as a back plate). The shield 230 is configured to prevent the magnetic field 232 or associated electromagnetic emissions from extending beyond a boundary determined by the shield 230 or at least to attenuate the magnetic field 232 extending beyond that boundary. As an example, the shield 230 may be formed from aluminum.

In the illustrated example, the wireless power transfer structure 224 includes a double-D (DD) coil topology, which includes two electrically conductive structures disposed proximate to one another forming the DD wireless power transfer coil 226. The wireless power transfer structure 224 is configured to generate a magnetic field (indicated in FIG. 2A by line of flux 232) by running alternating current through the DD wireless power transfer coil 226. Generally, the current in the two center sections of the DD wireless power transfer coil 226 runs in the same direction. In this way, a high magnetic flux is generated in the center of the DD wireless power transfer coil 226 and is channeled through the ferrite 228 and arches above the DD wireless power transfer coil 226 from one opening (magnetic pole area) to the other opening (magnetic pole area) of the DD wireless power transfer coil 226 as indicated in FIG. 2A by a line of flux. Other coil topologies are also applicable to the techniques described herein, including a multi-coil topology (e.g., Bi-polar, DD plus Circular) or just a single coil Circular or Solenoid topology.

The wireless power transfer system 200 further includes the object detection circuit 100 of FIG. 1 that may include a plurality of sense circuits 104a, 104b, . . . , 104n each sense circuit including a sense element (e.g., a sense coil) of the plurality of sense elements 106a, 106b, . . . , 106n as illustrated in FIG. 2A. The plurality of sense elements 106a, 106b, . . . , 106n may be arranged in a substantially planar array 106 to cover a predetermined area (e.g., at least the area covered by the wireless power transfer coil 226 or the ferrite 228). If each sense element of a plurality of sense elements 106a, 106b, . . . , 106n constitutes a sense coil (or an arrangement of sense coils), then the size and the number N of sense elements 106a, 106b, . . . , 106n may depend on the size of the wireless power transfer coil 226 or the ferrite 228 and also on the smallest size of an object 110 that is required to be detected by the object detection circuit 100. For example, if the minimum size of a metallic object 110 required to be detected is the size of a coin (e.g., a 1 €cent coin), then the size of each sense element of the plurality of sense elements 106a, 106b, . . . , 106n may be either on the order of this minimum size or a multiple thereof (e.g., with a 10-times larger area), assuming that those minimum size objects are located in close proximity of a plane defined by the array 106 (e.g., on the top surface of the housing 236 of the base pad as shown later in FIG. 2B). As a mere illustrative example, the number N of sense elements of the array 106 could be on the order of 64 (e.g., 8×8 array) to be able to provide coverage of the entire predetermined area with the required sensitivity.

Further the system shown in FIG. 2A may include a housing (not shown in FIG. 2A but shown later in FIG. 2B as housing 236) configured to house, for example at least the wireless power transfer coil 226, the ferrite 228, the sense element array 106, and potentially the shield 230. The housing may be made of any suitable material (e.g., hard plastic, ceramics etc.) and can be designed to provide structural support for example to support the weight of various objects such as vehicles that may pass over the housing. In some implementations, the housing may be made of a non-conductive material to avoid interfering or interacting with the magnetic field 232. The sense element array 106, in one exemplary implementation, is positioned between the wireless power transfer coil 226 and the housing 236 (with other intervening layers if desired) so that the sense elements of the plurality of sense elements 106a, 106b, . . . , 106n are positioned closer to objects that may rest on the surface of the housing 236 and where magnetic field levels could be high during power transfer.

All or just a portion of the power conversion circuit 222 may also be housed in the housing 236. Although in some implementations the power conversion circuit 222 may be housed separately from the housing 236 that houses the wireless power transfer structure 224. In some cases, the power conversion circuit 222 is housed in the housing 236 but is positioned on the other side of the shield 230 from the ferrite 228.

Figure 2B:
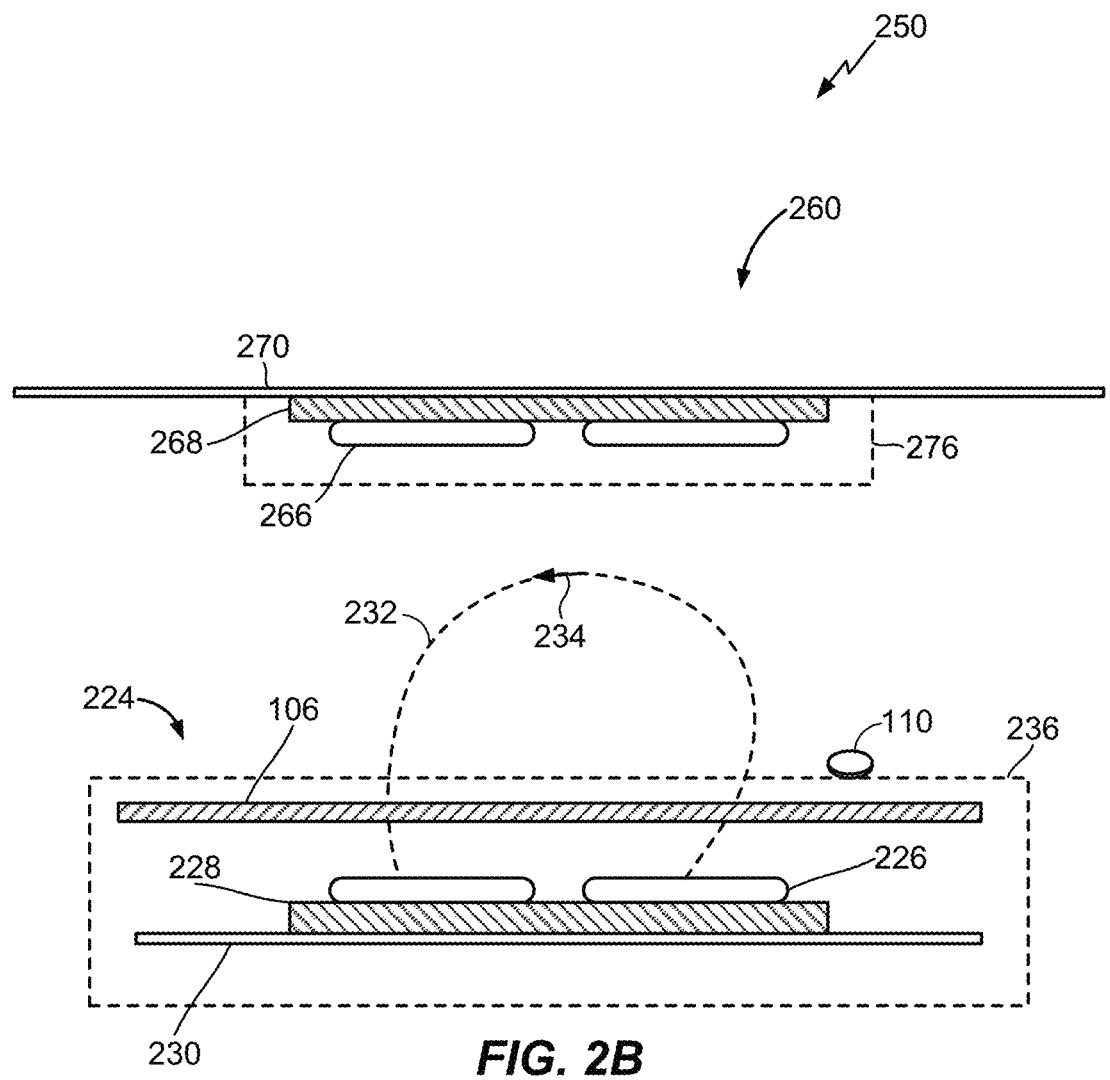
FIG. 2B is a vertical cut view illustrating a portion of the wireless power transfer system of FIG. 2A including a portion of the object detection circuit of FIG. 1.

FIG. 2B illustrates a vertical cut view of a portion 250 of a wireless power transfer system 200 with reference to FIG. 2A and applicable to a WEVC application. This portion 250 includes the base-side (e.g., transmit) wireless power transfer structure 224 and the vehicle-side (e.g., receive) wireless power transfer structure 260. The base-side wireless power transfer structure 224 includes a shield (back plate) 230 made of an electrically conductive material, a layer of ferrite 228 and a wireless power transfer coil 226. It also includes a housing 236 configured to house the wireless power transfer coil 226, ferrite 228, and shield 230. In addition, the housing 236 is configured to house a sense element array 106 as part of the object detection circuit 100 as illustrated in FIG. 2A. In some implementations, the shield 230 may form a portion of the housing 236. The power conversion circuit 222 is not shown but may be electrically connected to the wireless power transfer coil 226 or a portion or all may also be housed in the housing 236.

The vehicle-side wireless power receive structure 260 includes a wireless power transfer coil 266, a layer of ferrite 268, and a shield 270 made of an electrically conductive material. In some implementations, the shield 270 may be formed from a portion of the apparatus that the ferrite 268 and the wireless power transfer coil 266 are affixed to (e.g., the metallic underbody of a vehicle). In this case, a housing 276 configured to house the wireless power transfer coil 266 and ferrite 268 is provided but that would not house the shield 270. However other implementations are possible where a shield 270 (e.g., a back plate) is included in the housing 276. A power conversion circuit 222 is not shown but may be electrically connected to the receive coil 268 or a portion or all may also be housed in the housing 276.

The base-side wireless power transfer structure 224 may be configured to generate a magnetic field 232. The vehicle-side wireless power structure 260 may be configured to inductively receive power via the magnetic field 232. Magnetic flux 232 may be at a particular level (flux density) at the surface of the housing 236. In some cases, flux density may be somewhat higher at or in proximity to the top surface of the housing 236 relative to surrounding areas as the surface of the housing 236 is closer to the wireless power transfer structure 226. Furthermore, as the wireless power transfer structure 224 may be positioned on a ground or other top facing surface, an object 110 may come to rest at the top surface of the housing 236 as illustrated in FIG. 2B. The object 110 may thereby be potentially exposed to high levels of magnetic flux density if power is being transferred. The object detection circuit 100 is configured to detect the object 110 using the sense element array 106.

Inductive Object Detection Techniques

FIGS. 3 to 8 illustrate examples of different techniques based on measuring at least one electrical characteristic that may be used in conjunction with the object detection circuit 100 of FIG. 1. These examples are to illustrate the principle of the sensing and measurement technique and do not show all the details of an object detection circuit 100. Particularly, they do not show the further signal processing and evaluation circuit as it may be required e.g., for detecting an object based on a change in a measured electrical characteristic. For illustrative purposes and simplicity, these techniques are illustrated by means of a single sense element though applicable to a plurality of sense elements (e.g., sense elements 106a, 106b, . . . , 106n) as described below with reference to FIGS. 10 to 14.

Figure 3A:
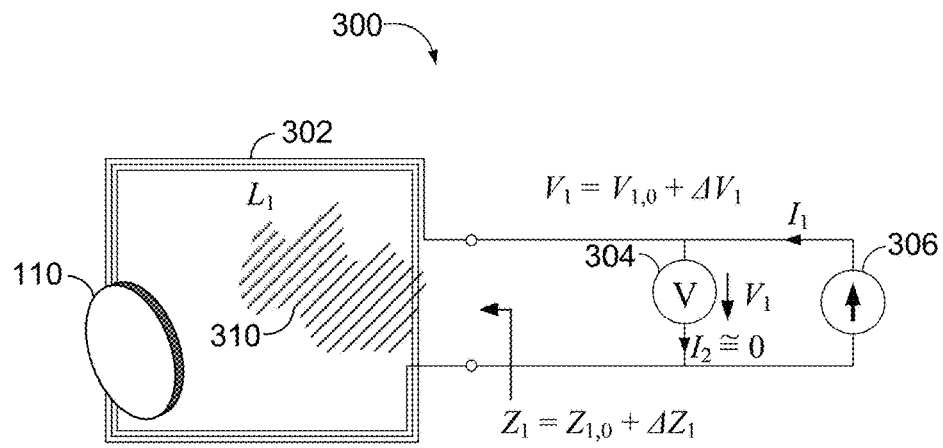
FIG. 3A is a schematic view illustrating an example of a sense coil, an object and an associated technique based on an impedance sensing approach that may be used in conjunction with the object detection circuit of FIG. 1.

FIG. 3A shows a circuit 300 to illustrate a technique for inductively sensing a presence of an object 110 based on a change in a complex impedance $Z_1$ as measured at the terminals of sense coil 302 (e.g., a planar a multi-turn coil) with inductance $L_1$ that may represent e.g., sense element 106a. This technique is also referred herein as to the impedance sensing approach. A change $\Delta Z_1$ of the impedance $Z_1$ relative to the impedance $Z_{1,0}$ in the absence of the object 110 may indicate a presence of the object 110. A change of impedance may be also produced when the sense coil 302 is integrated into the wireless power transfer structure 224 as shown in FIG. 2A due to e.g., electrically conductive materials, ferromagnetic materials, but also due to dielectric materials (e.g., plastic housing 236) that may be located in the proximity of the sense coil 302. Presence of such materials is indicated in FIG. 3A by materials 310 (shaded area). Materials 310 may also include a dielectric substrate that carries the sense coil 302 or a dielectric medium the sense coil is embedded in (e.g., in case of a printed circuit board (PCB) design). The effects of materials 310 may generally produce a change of the sense coil's 302 inductance, resistance, but also of its self-capacitance relative to its inductance, resistance, and self-capacitance as measured in free space. The effects of materials 310 are considered already included in the impedance $Z_{1,0}$.

The circuit 300 of FIG. 3A illustrates a technique for measuring an impedance $Z_1$ where a sinusoidal current $I_1$ with a defined frequency, amplitude, and phase provided by a current source 306 is applied to the sense coil 302 and where the open-circuit voltage $V_1$ across the terminals of the sense coil 302 is measured. The open-circuit voltage $V_1$ is measured using a sensitive high impedance voltage measurement circuit 304 so that there is virtually zero current at the terminals of the voltage measurement circuit 304 ($I_2 \cong 0$). This impedance measurement technique is also referred herein as to the current source voltage measurement approach. In some implementations, the current source 306 and the voltage measurement circuit 304 may be part of the measurement and detection circuit 108 with reference to FIG. 1. The voltage measurement circuit 304 may be frequency selective (narrowband) tuned to the sense frequency $f_s$ (frequency of the current source) which may be e.g., in the MHz range. The impedance $Z_1 = Z_{1,0} + \Delta Z_1$ of the sense coil 302 may be determined by dividing the measured voltage $V_{1,0} + \Delta V_1$ by the defined (known) current $I_1$, which may be expressed more formally as $$Z_1 = Z_{1,0} + \Delta Z_1 = \frac{V_{1,0} + \Delta V_1}{I_1}. \tag{1}$$

Using an ideal current source 306, a change $\Delta Z_1$ in the impedance $Z_1$ e.g., due to presence of the object 110 manifests in a change $\Delta V_1$ in the voltage $V_1$ while the current $I_1$ remains unaffected. Therefore, measuring a change $\Delta V_1$ in the voltage $V_1$ may be equivalent to measuring a change $\Delta Z_1$ in the impedance $Z_1$. In other words, the voltage $V_1$ may be indicative of the impedance $Z_1$.

Though not shown herein, other impedance measurement techniques are also contemplated e.g., by applying a sinusoidal voltage source with a defined voltage $V_1$ (amplitude and phase) and measuring the current $I_{1,0} + \Delta I_1$ at the sense coil 302 using a sensitive (e.g., frequency selective) low impedance current measurement circuit. This impedance measurement technique is also referred herein as to the voltage source current measurement approach.

The current source 306 used in an implementation of the current source voltage measurement approach may be characterized by a quasi-ideal current source. A quasi-ideal sinusoidal current source may be defined as a sinusoidal signal source with a sufficiently large (but finite) source impedance so that the magnitude of the fractional change in its output current $|\Delta I_1/I_{1,0}|$ is at least a factor of 10 smaller than the magnitude of the fractional change in the voltage $|\Delta V_1/V_{1,0}|$, where $\Delta I_1$ and $\Delta V_1$ denote the change in the complex amplitude (magnitude and phase) in its output current $I_{1,0}$ and in the voltage $V_{1,0}$, respectively, due to presence of the object 110, where $I_{1,0}$ and $V_{1,0}$ refer to the complex amplitude of its output current and the voltage, respectively, in absence of the object 110. More formally, this definition may be expressed by the following inequality $$\left|\frac{\Delta V_1}{V_{1,0}}\right|\left|\frac{I_{1,0}}{\Delta I_1}\right| \geq 10, \tag{2}$$

This definition (Equation (3)) may apply to the current source (e.g., current source 306) as it may be used in implementations based on any of the impedance or mutual impedance sensing techniques described herein. In any case, the voltages $V_{1,0}$ and $\Delta V_1$ in Equation (3) refer to the respective voltages across the output of the current source (e.g., current source 306) and the currents $I_{1,0}$ and $\Delta I_1$ to the respective currents at the output of the current source.

Likewise, the voltage source in an implementation of the voltage source current measurement approach may be characterized by a quasi-ideal voltage source. A quasi-ideal sinusoidal voltage source may be defined as a sinusoidal signal source with a sufficiently small (but non-zero) source impedance so that the magnitude of the fractional change of its output voltage $|\Delta V_1/V_{1,0}|$ is at least a factor of 10 smaller than the magnitude of the fractional change of its output current $|\Delta I_1/I_{1,0}|$, where $\Delta V_1$ and $\Delta I_1$ denote the change in complex amplitude (magnitude and phase) of its output voltage and current, respectively, due to presence of an object 110 and $V_{1,0}$ and $I_{1,0}$ the complex amplitude of its output voltage and current, respectively, in absence of the object 110.

Above definitions may be generalized to non-sinusoidal signal (arbitrary waveform) sources, where the notions of complex impedance and complex amplitude may not directly apply. This may be accomplished by approximating the signal by a complex Fourier series and applying above definitions to the individual frequency components of the complex Fourier series.

The voltage measurement circuit 304 used in an implementation may be characterized by a quasi-ideal voltage measurement circuit 304 whose input impedance magnitude is sufficiently large such that the magnitude of the measurement error E (complex value) as produced by the quasi-ideal voltage measurement circuit 304 is less than 10% of the magnitude of the voltage $V_{1,\infty}$ as measured with an ideal voltage measurement circuit 304 (infinite input impedance). More formally, this definition may be expressed as $$\frac{|\varepsilon|}{|V_{1,\infty}|} = \frac{|V_1 - V_{1,\infty}|}{|V_{1,\infty}|} < 0.1, \tag{3}$$

where $V_1$ refers to the voltage as measured with the quasi-ideal voltage measurement circuit 304 (finite input impedance). This definition (Equation (5)) may apply to the voltage measurement circuit (e.g., voltage measurement circuit 304) as it may be used in implementations based on any of the impedance and mutual impedance sensing techniques described herein. In any case, the voltages $V_1$ and $V_{1,\infty}$ in Equation (5) refer to the respective voltages across the input of the voltage measurement circuit (e.g., voltage measurement circuit 304).

Figure 3B:
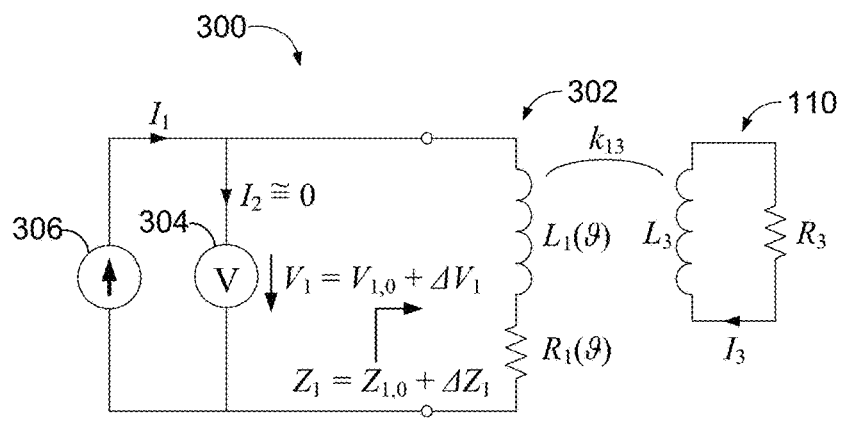
FIG. 3B shows an equivalent circuit of the circuit of FIG. 3A including a circuit model of the object.

An equivalent circuit of the circuit 300 of FIG. 3A including a circuit model of the object 110 is shown in FIG. 3B. In this equivalent circuit, the sense coil 302 is represented by an equivalent inductance $L_1(\vartheta)$ and an equivalent loss resistance $R_1(\vartheta)$ both shown as a function of temperature $\vartheta$. As previously stated, inductance $L_1(\vartheta)$ may include a change of an inductance due to the presence of materials 310. Depending on the electromagnetic properties of materials 310, this may be a decrease or increase of the inductance $L_1(\vartheta)$ as measured in free space.

The loss resistance $R_1(\vartheta)$ may include two resistance components. A first resistance component may be attributed to the resistance of the sense coil's conductive structure (e.g., copper wires or PCB traces) as experienced at the sense frequency f (subject of skin and proximity effects). A second resistance component may be due to loss effects in materials 310 (e.g., eddy current and/or hysteresis losses). It may be appreciated that both resistance components may be subject of thermal effects, e.g., they may increase if the temperature inside the housing 236 of the wireless power transfer structure 224 rises. As an example, the DC resistance of a sense coil's 302 copper winding may vary by 40% for a temperature variation over the range from −20° C. to +80° C. as it might be specified for an installation in an outdoor environment and assuming a temperature coefficient of 0.004 Ω/K for copper and a linear relationship. This resistance variation may be smaller (in the order of 20%) at sense frequency f (e.g., in the MHz range), taking skin and proximity effects into account, since current distribution inside the sense coil's 302 conductive structure (e.g., wire) also changes with the electrical conductivity and thus with temperature. A similar variation may be expected in the second resistance component if eddy current losses in the materials 310 are the predominant loss effect. For comparison, the percental change $|\Delta Z_1|/R_1(\vartheta)$ produced by a small object 110 (e.g., a paper clip) may be in the order of only 0.1% assuming a cost optimized implementation of the object detection circuit 100 of FIG. 1 providing a plurality of sense coils 106a, 106b, and 106n each with a form factor in the order of 60×80 mm. This example demonstrates that significant changes in impedance Z over time may occur if the object detection circuit 100 is operated in an outdoor environment. Given such magnitudes of thermal effects, object detection may require a differential detection approach (e.g., a time differential detection scheme) rather than detection on an absolute basis (absolute detection) e.g., by comparing the measured impedance $Z_1$ against a reference value $Z_{1,ref}$ that has been determined in a process of calibration e.g., at time of installation or commissioning of the wireless power transfer structure 224 as further discussed below.

While significant thermal drift may be expected in the equivalent loss resistance $R_1(\vartheta)$ (real part of impedance $Z_1$), there may be also thermal effects in the equivalent inductance $L_1(\vartheta)$ (imaginary part of impedance $Z_1$ divided by $2\pi f_s$) of the sense coil 302 as measured at sense frequency $f_s$. Variations in the equivalent inductance $L_1(\vartheta)$ may be due to a change of the sense coil's inner inductance that may also change with temperature $\vartheta$ since electrical conductivity (e.g., the conductivity of copper) and consequently the current distribution (skin and proximity effects) inside the sense coil's 302 wire may change with temperature. Thermal variations of the equivalent inductance $L_1(\vartheta)$ may also emanate from thermal expansion e.g., of the PCB carrying sense coil array 106 and also due to micro-mechanical movements of the sense coil array 106 relative to materials 310 due to thermal expansion. Further, they may be produced by a temperature dependent permeability if materials 310 include a ferromagnetic material (e.g., ferrite) and also by a temperature dependent permittivity if materials 310 include a dielectric material (e.g., FR4 PCB substrate) affecting the sense coil's 302 self-capacitance. Such thermal capacitive effects may become significant in certain implementations of the object detection circuit 100 of FIG. 1 operating at frequencies $f_s$ in the MHz range.

In FIG. 3B, the object 110 is modelled by an equivalent inductance $L_3$ and an equivalent loss resistance $R_3$ justified by the fact that an object 110 in general can store and dissipate electrical energy. An LR-model may apply to a metallic object 110 that appears electrically conductive but non-ferromagnetic at sense frequency $f_s$. It may not apply to an object 110 that appears ferromagnetic or dielectric at sense frequency $f_s$ as further discussed below. An object 110 not exhibiting a noticeable ferromagnetic effect (e.g., a magnetic relative permeability $\mu_r>1$) at sense frequency $f_s$ may be referred to as a non-ferromagnetic object. Conversely, an electrically conductive object 110 that appears ferromagnetic at sense frequency $f_s$ is referred to as a ferromagnetic conductive object 110. Modelling of a ferromagnetic conductive object 110 may be more complex than shown in FIG. 3B by an equivalent LR circuit model. Magnetic coupling between object 110 and sense coil 302 (between inductance $L_3$ and inductance $L_1$) is modelled by coupling factor $k_{13}$. Practical experience with many different types of non-ferromagnetic objects 110 shows that variations of position and orientation of the object 110 relative to sense coil 302 mainly affect the coupling factor $k_{13}$ but generally have a minor impact on the parameters of its LR model. Therefore, as a first approximation, a non-ferromagnetic object 110 may be modelled with fixed parameters for $L_3$ and $R_3$ regardless of its position and orientation. Both resistance $R_3$ and inductance $L_3$ may also be functions of the object's 110 temperature though not indicated in FIG. 3B. Thermal effects in the object 110 may be less relevant, except in certain implementations of the object detection circuit 100 of FIG. 1 capitalizing on a temperature dependence in $R_3$ and $L_3$ e.g., by detecting objects based on a correlation with the level of magnetic field of the wireless power transfer (e.g., at $f_{wpt}=85$ kHz) that inductively heats the object 110 as described further below in more detail.

Defining the angular sense frequency $$\omega_s = 2\pi f_s, \quad (4)$$

the impedance of the sense coil 302 at sense frequency f in absence of the object 110

$$Z_{1,0} = R_1 + j\omega_s L_1, \quad (5)$$

the impedance of the object 110

$$Z_3 = R_3 + j\omega_s L_3, \quad (6)$$

and the mutual inductance between object 110 and sense coil 302

$$M_{13} = k_{13}\sqrt{L_1 L_3}, \quad (7)$$

the impedance $Z_3$ as measured at the terminals of the sense coil 302 in presence of object 110 may be expressed as $$Z_1 = Z_{1,0} + \Delta Z_1 = Z_{1,0} + \alpha_{13}^2 Z_3^*, \quad (8)$$

$$\alpha_{13} = \frac{\omega_s M_{13}}{|Z_3|}, \quad (9)$$

with where $\alpha_{13}$ denotes a transformation factor and $Z_3^*$ the conjugate complex of $Z_3$.

Figure 3C:
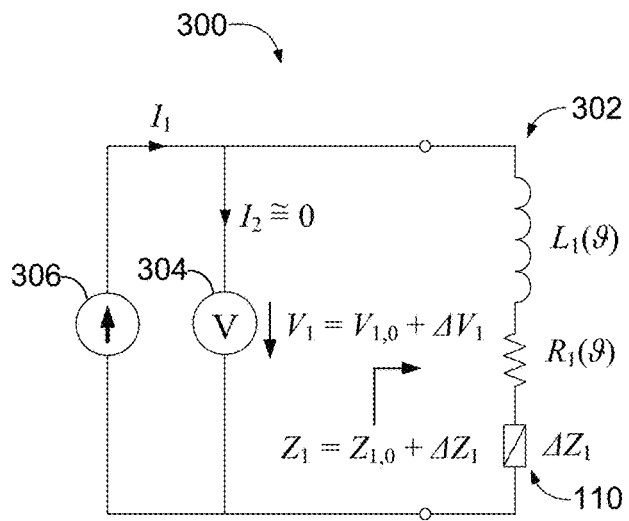
FIG. 3C shows another equivalent circuit of the circuit of FIG. 3A including the influence of the object model abstracted away.

Equations (8) and (9) show that the equivalent circuit model of the object 110 in FIG. 3B may be abstracted away as an impedance (impedance change)

$$\Delta Z_1 = \alpha_{13}^2 Z_3^*, \quad (10)$$

in series to the sense coil's equivalent circuit ($L_1(\vartheta)$, $R_1(\vartheta)$) as illustrated in FIG. 3C. Assuming a scalar (non-complex) coupling factor $k_{13}$, the transformation factor $\alpha_{13}$ is also a scalar and the change in impedance $\Delta Z_1$ reflects the conjugate complex of the impedance of the object 110 with respect to the Q-factor or the angle (argument) of the impedance $Z_3$. A Q-factor may be attributed to the object 110 since the object 110 in general can store and dissipate energy. Eddy currents are induced into a metallic object 110 when subjected to the magnetic sense field as generated by sense coil 302. Energy is stored in the secondary magnetic field produced by the induced eddy currents in the object 110 (inductance $L_3$) and dissipated in its resistance $R_3$. The Q-factor of the object 110 may be defined as $$Q_3 = \frac{\omega_s L_3}{R_3}. \tag{11}$$

Likewise, a Q-factor may be attributed the impedance change $\Delta Z_1$ (reflected impedance of the object 110) defined as $$Q_{\Delta Z_1} = \frac{\text{Im}\{\Delta Z_1\}}{\text{Re}\{\Delta Z_1\}} \tag{12}$$

where Re{•} and Im{•} denote the real and imaginary part. The relation between $Q_{\Delta Z_1}$ and $Q_3$ may be expressed as $$Q_{\Delta Z_1} = -Q_3. \tag{13}$$

The Q-factor of $\Delta Z_1$ equals the sign inverted Q-factor of the object 110. Alternatively, using the angles arg{•} of the impedances, this relation may be expressed as $$\arg\{\Delta Z_1\} = -\arg\{Z_3\}. \tag{14}$$

Equation (10) indicates that presence of a non-ferromagnetic metallic object 110 with finite electrical conductivity, which can be modelled with resistance $R_3 > 0$ and inductance $L_3 > 0$, produces a positive Re{$\Delta Z_1$} and a negative Im{$\Delta Z_1$}. Otherwise stated, it produces an increase of equivalent resistance and a decrease (destruction) of equivalent inductance in the circuit 300.

Figure 3D:
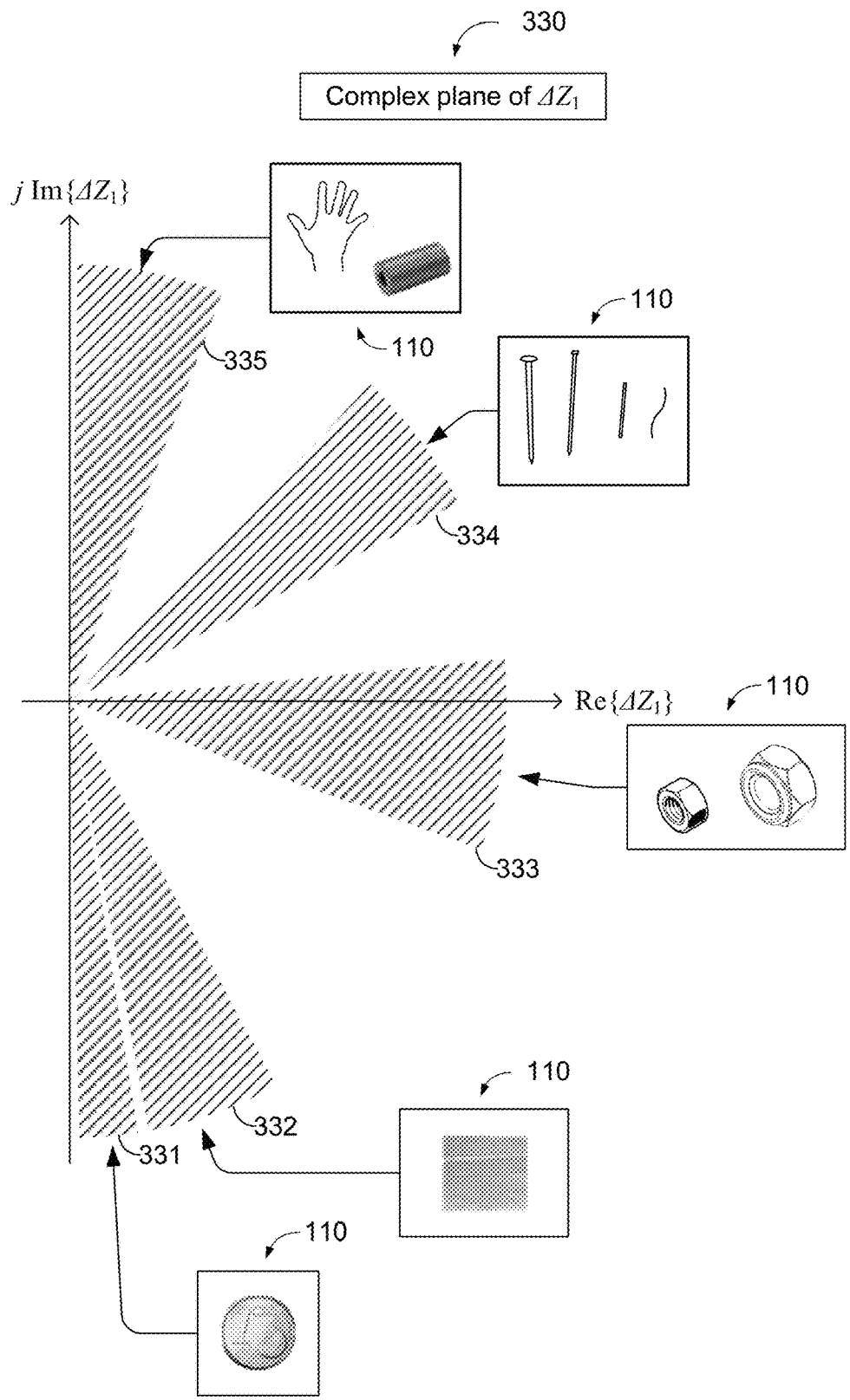
FIG. 3D illustrates a complex impedance plane, different types of objects, and corresponding areas where changes of impedance may occur.

FIG. 3D illustrates a complex plane 330 or more precisely a complex half plane comprising quadrant 1 and 4 where the impedance changes $\Delta Z_1$ (responses) of different types (categories) of objects 110 may occur. More particular, FIG. 3D shows shaded areas (angle ranges) corresponding to different categories of objects 110 where $\Delta Z_1$ may be measured at a sense frequency $f_s$ (e.g., in the MHz range) if the object 110 is placed in proximity of the sense coil 302. To emphasize the characteristics of the different categories of objects 110, the angle ranges indicated in FIG. 3D may be not drawn to scale and should be considered qualitative rather than quantitative. The actual angle ranges may also depend on the particular sense frequency $f_s$. Since the Q-factor of some categories of object 110 generally increases with frequency, some areas will move closer to the imaginary axis when the sense frequency f is increased.

A non-ferromagnetic object 110 with a well conducting surface (e.g., a copper coated coin with a coating equal or thicker than the eddy current penetration (skin) depth $\delta$) may produce a $\Delta Z_1$ in the angle range 331 close to the negative imaginary axis in the 4$^{th}$ quadrant of the complex plane 330 indicating an object 110 with a relatively high Q-factor $Q_3$.

The angle range 332 that is also in the 4$^{th}$ quadrant may be characteristic for apiece of thin foil or a metallized (aluminum coated) paper. Such non-ferromagnetic objects 110 may exhibit a lower Q-factor $Q_3$ than e.g., a copper coated coin. This may be particularly true, if the electrical conductivity $\sigma$ of the metal (e.g., aluminum) coating is lower than that of copper and if the thickness of the coating is smaller than the theoretical skin depth $$\delta = \sqrt{\frac{1}{\mu_0 \mu_r \sigma f_s}} \tag{15}$$

where $\mu_0$ denotes the magnetic permeability constant and $\mu_r$ the relative permeability that is one.

The angle range 333 may be typical for the response $\Delta Z_1$ of some ferromagnetic steel objects (e.g., nuts). These objects 110 are electrically conductive but also exhibit a relative permeability $\mu_r > 1$. The effect of ferromagnetism in these objects 110 may be threefold. First, it may increase the reactance Im{$Z_1$} of the sense coil 302. Second, it may increase the loss resistance Re{$Z_1$} compared to an equal but non-ferromagnetic object with the same conductivity $\sigma$ since skin depth $\delta$ reduces thus resistance $R_3$ increases with increasing permeability $\mu_r$ as evident from equation (15). Third, since the object 110 is conductive, it may also destroy reactance of the sense coil 302 at the same time. Therefore, the net response produced by some ferromagnetic steel objects 110 (e.g., nuts) may be found close to the real axis in the angle range 333 (e.g., Im{$\Delta Z_1$}≅0) in the 4$^{th}$ or in the 1$^{st}$ quadrant of the complex plane 330. With an implementation that detects objects 110 e.g., solely based on a change of reactance Im{$\Delta Z_1$}, such objects 110 may appear as stealth objects 110.

Ferromagnetic steel objects 110 with a cylindrical shape of diameter d much smaller than its length l (e.g., nails, pins, pieces of steel wire) may produce a response $\Delta Z_1$ in the angle range 334 around 45° in the 1$^{st}$ quadrant somewhat depending on its orientation relative to the magnetic sense field. For this category of objects 110, the ferromagnetic effect increasing a reactance Im{$Z_1$} may be much larger than the reactance destroying effect of its conductivity. These objects 110 may produce an impedance change $\Delta Z_1$ with a positive Q-factor $Q_{\Delta Z_1}$ close to unity.

Ferromagnetic non-conductive objects 110 with low resistive losses (e.g., a piece of ferrite) may produce a response $\Delta Z_1$ in the angle range 335 close to the positive imaginary axis corresponding to a high positive Q-factor $Q_{\Delta Z_1}$.

A similar response $\Delta Z_1$ in the angle range 335 may be also produced by dielectric non-conductive objects 110 with low resistive losses (e.g., a human hand, a plastic bottle filled with water). Dielectric objects 110 may interact with the sense coil 302 via the electric field generated by the sense coil's 302 self-capacitance that may be modelled by a capacitance $C_{1,self}$ in parallel to the equivalent circuit of the sense coil 302 (not shown in FIG. 3B but considered merged into the equivalent inductance $L_1$). A dielectric non-conductive object 110 with low resistive losses in proximity of the sense coil 302 may generally increase self-capacitance $C_{1,self}$ resulting in an increase of reactance (Im{$\Delta Z_1$}>0) as evident from the following equation:

$$L_1 \cong L_{1,ex} + \omega_s^2 L_{1,ex}^2 C_{1,self}, \tag{16}$$

where $L_{1,ex}$ denotes the sense coil's 302 inductance excluding self-capacitance.

In some aspects of an object detection circuit 100, the sense coil 302 may be used for capacitive sensing of living objects e.g., a human hand, a cat, or any other animal that are predominantly dielectric and that may be located in proximity of sense coil 302. Such use case may require the object detection circuit 100 to discriminate dielectric objects from metallic objects e.g., if rules and procedures for living object detection would differ from those applied to metal object detection.

Objects 110 producing a response $\Delta Z_1$ in angle ranges 332, 333, and 334 may be subject of significant induction heating if exposed to the strong magnetic field of the wireless power transfer (e.g., at $f_{wpt}$=85 kHz) due to their losses (low Q-factor). This may be particularly true, for the cylindrical ferromagnetic objects 110 that may produce an impedance change in the angle range 334. Ferromagnetism of steel objects 110 may saturate e.g., at a r.m.s. magnetic flux density level of 1 mT. For flux densities above that level, excessive hysteresis losses and consequent heating effects may occur. This object category may be characterized by the highest loss power density (e.g., Watt per unit surface area) and thus highest temperature. Therefore, in some aspects of an object detection circuit 100, it may be desirable to selectively increase a sensitivity to objects 110 of this category.

To discriminate between certain categories objects 110 and/or increase a sensitivity for certain categories of objects 110, in an aspect the object detection circuit 100 may be configured to measure an impedance change $\Delta Z_1$ with sufficient accuracy at least with respect to its angle $\arg\{\Delta Z_1\}$. Even higher accuracy (e.g., angle fidelity) may be required if an object detection circuit 100 employs a time-differential detection scheme as further described in connection with FIG. 9. A fast (e.g., abrupt) change $\Delta Z_1$ in a sequence (time-series) of consecutively measured impedances $Z_1$ due to the object 110 brought to proximity of sense coil 302 may cause a time-differential detector to temporarily produce an output indicative for $\Delta Z_1$. In contrast, a fast (e.g., abrupt) change $\Delta Z_1$ due to the object 110 removed from the proximity of sense coil 302 may cause the time-differential detector to temporarily produce an output indicative for $-\Delta Z_1$ (opposite sign). Therefore, outputs of a time-differential detector may fall in all four quadrants of the complex plane 330, depending on the characteristics (e.g., impedance) of the object 110 and whether it is brought to or removed from the proximity of the sense coil 302. In some aspects of an object detection circuit 100, it may be desirable to discriminate between an object 110 entering the predetermined space and an object 110 leaving this space. Therefore, some implementations of an object detection circuit 100 of FIG. 1 may be configured to provide accurate calibration of the impedance measurement at least with respect to its angle $\arg\{\Delta Z_1\}$. This may be particularly true for implementations of the object detection circuit 100 of FIG. 1 relying on an impedance measurement circuit (e.g., including a quasi-ideal current source 306 and a quasi-ideal voltage measurement circuit 304) that is subjected to measurement errors.

In some other aspects of the object detection circuit 100 of FIG. 1, the object detection sensitivity may be defined as the impedance change $\Delta Z_1$ as produced in presence of an object 110 normalized to $|Z_{1,0}|$ that is the magnitude of the impedance as measured in absence of the object 110. This normalized impedance change (sensitivity) is herein also referred to as the fractional change $\Delta Z_1/|Z_{1,0}|$. For a non-ferromagnetic object 110, the fractional change may be expressed as $$\frac{\Delta Z_1}{|Z_{1,0}|} = \frac{\alpha_{13}^2 Z_3^*}{|Z_{1,0}|}. \tag{17}$$

For a sense coil 302 with high enough (native) Q-factor $$Q_1 = \frac{\omega_s L_1}{R_1} \gg 1, \tag{18}$$

the magnitude impedance $|Z_{1,0}|$ is approximately the sense coil's 302 reactance $\omega_s L_1$ so that equation (17) may be rewritten as $$\frac{\Delta Z_1}{|Z_{1,0}|} \cong \frac{\alpha_{13}^2 Z_3^*}{\omega_s L_1}. \tag{19}$$

Substituting $\alpha_{13}$ and $Z_3$ using equations (6), (7), (9), and (11), equation (19) may be expressed solely in terms of coupling factor $k_{13}$ and the object's 110 Q-factor $Q_3$ as follows:

$$\frac{\Delta Z_1}{|Z_{1,0}|} \cong k_{13}^2 \frac{Q_3}{1+Q_3^2}(1-jQ_3), \tag{20}$$

For objects 110 with high enough Q-factor $Q_3 \gg 1$, equation (20) may be rewritten as $$\frac{\Delta Z_1}{|Z_{1,0}|} \cong k_{13}^2 \left(\frac{1}{Q_3} - j\right) \tag{21}$$

Equation (21) shows that the imaginary part of the fractional change $\Delta Z_1/|Z_{1,0}|$ is approximately the squared coupling factor $k_{13}$ while the real part is $Q_3$-times lower.

In some aspects of an object detection circuit 100, the fractional change $|\Delta Z_1|/|Z_{1,0}|$ may determine the required dynamic range of the voltage measurement circuit 304. It may be appreciated that detection of objects 110 with a low fractional change $|\Delta Z_1|/|Z_{1,0}|$ requires a high dynamic range demanding components with higher performance in terms of intrinsic thermal noise and quantization noise (e.g., if the voltage measurement circuit 304 includes an amplifier and/or an analog-to-digital converter). Therefore, the fractional change $|\Delta Z_1|/|Z_{1,0}|$ may indirectly impact cost of an object detection circuit 100. Therefore, it may be desirable to increase a fractional change $|\Delta Z_1|/|Z_{1,0}|$ as produced by an object 110 at a given position and orientation relative to the sense coil 302.

In another aspect, the fractional change $|\Delta Z_1|/|Z_{1,0}|$ may also at least partially determine temperature sensitivity of the object detection circuit 100 as a consequence of a temperature dependent impedance $Z_{1,0}$ as previously discussed in connection with FIG. 3B. In some aspects of an object detection circuit 100, it may be desirable to reduce a temperature sensitivity. Temperature sensitivity may be defined e.g., with respect to the real part as the ratio of an impedance change $\text{Re}\{\delta Z_{1,0}\}$ due to a temperature change $\Delta\vartheta$ to an impedance change $\text{Re}\{\Delta Z_1\}$ produced by the object 110. This ratio e.g., with respect to the real part may be also expressed as the ratio of the fractional changes $\text{Re}\{\delta Z_{1,0}\}/|Z_{1,0}|$ and $\text{Re}\{\Delta Z_1\}/|Z_{1,0}|$ $$\frac{\text{Re}\{\delta Z_{1,0}\}}{\text{Re}\{\Delta Z_1\}} = \frac{\text{Re}\{\delta Z_{1,0}\}}{|Z_{1,0}|} \cdot \frac{|Z_{1,0}|}{\text{Re}\{\Delta Z_1\}}, \tag{22}$$

and for the imaginary part accordingly $$\frac{\text{Im}\{\delta Z_0\}}{\text{Im}\{\Delta Z_1\}} = \frac{\text{Im}\{\delta Z_{1,0}\}}{|Z_{1,0}|} \cdot \frac{|Z_{1,0}|}{\text{Im}\{\Delta Z_1\}}. \quad (23)$$

Equation (22) shows that temperature sensitivity with respect to the real part may reduce if the fractional change $\text{Re}\{Z_1\}/|Z_{1,0}|$ is increased, provided that the fractional change $\text{Re}\{\delta Z_{1,0}\}/|Z_{1,0}|$ does not increase likewise by this improvement. This may be also valid for the imaginary part as shown by Equation (23).

For an object 110 at a position close enough to the sense coil 302, the fractional change $|\Delta Z_1|/|Z_{1,0}|$ may be increased by reducing the size of the sense coil 302. In some implementations of the object detection circuit 100 of FIG. 1 based on a plurality of sense coils 106a, 106b, . . . , 106n, a smaller sense coil size may be used which may result in a larger number of sense coils.

An increase of the fractional change $|\Delta Z_1|/|Z_{1,0}|$ for objects 110 at certain positions and orientations may be also achieved with an optimized design of sense coil 302. For example, a sense coil 302 may be implemented with a spread (spiral) winding (as opposed to a more concentrated winding as illustrated in FIG. 3A) which may provide a larger fractional change $|\Delta Z_1|/|Z_{1,0}|$ for objects 110 placed near the center of the sense coil 302.

In some other aspects of the object detection circuit 100 of FIG. 1, object detection sensitivity may be also defined with respect to noise e.g., in terms of the signal-to-noise ratio (SNR) as follows:

$$SNR = \frac{|\Delta V_1|^2}{V_{1,n}^2} = \frac{I_1^2 \cdot |\Delta Z_1|^2}{V_{1,n}^2}. \quad (24)$$

where $V_{1,n}$ denotes an equivalent r.m.s. noise voltage at sense frequency $f_s$ in the bandwidth $B_m$ of the voltage measurement circuit 304. An equivalent noise voltage source $V_{1,n}$ (not shown in FIG. 3C) may be considered in series to the impedance $Z_1$ in the equivalent circuit of FIG. 3C. This equivalent noise voltage source may generally include the effect of various circuit intrinsic and extrinsic noise sources.

Circuit intrinsic noise may include thermal noise generated by the resistance $R_1$ and in the voltage measurement circuit 304. Noise produced in the voltage measurement circuit 304 may include thermal noise and quantization noise e.g., if the voltage measurement circuit 304 involves an analog-to-digital converter (ADC). The circuit intrinsic noise may also include noise generated in the current source 306 e.g., a noise current component producing a noise voltage across impedance $Z_1$. In some implementations of a current source 306, this noise current may include additive noise, phase noise and amplitude modulated (AM) noise. Additive noise may include thermal noise as generated in the circuit of the current source 306. It may also include quantization noise if the current source involves a digital signal synthesizes and a digital-to-analog converter (DAC). In some implementations, the effect of DAC quantization noise may appear as a deterministic error on the current amplitude rather than a stochastic noise component. In some implementations, the amplitude of current $I_1$ may be modulated by a low frequency noise component with a 1/f- characteristics, e.g., if the current source 306 involves a DC supply voltage regulator that generates low frequency noise.

Therefore, some implementations of the object detection circuit 100 of FIG. 1 use a current source 306 and a voltage measurement circuit 304 optimized with respect to all sort of noise components to maximize a sensitivity (e.g., the SNR as defined by Equation (24)) with respect to circuit intrinsic noise.

In some implementations of the object detection circuit 100 of FIG. 1 using a sense element array 106 integrated together with the wireless power transfer structure 224 into housing 236 as shown in FIG. 2A. Switching noise in the wireless power electromagnetic field produced by the power conversion circuit 222 may be inductively and/or capacitively coupled into sense coil 302 when the wireless power transfer system is active. This circuit extrinsic noise component may include wideband and narrowband noise (e.g., harmonics noise). Therefore, in some implementations of a wireless power transfer system 200 including an object detection circuit 100, the power conversion circuit 222 is optimized with respect to noise e.g., by using extra filtering to suppress noise in a sense frequency band. Moreover, the voltage measurement circuit 304 may be configured to minimize the effect of circuit extrinsic noise sources. In some implementations of an object detection circuit 100, the noise spectrum is monitored with a spectral resolution corresponding to the bandwidth $B_m$ of the voltage measurement circuit 304 to identify potential sense frequencies $f_s$ with lowest noise level and within some operational frequency limits determined by the object detection circuit 100. As part of an optimization, the object detection circuit 100 may select a sense frequency $f_s$ at a frequency providing lowest noise level. Such procedure may be used to maximize the SNR as defined by Equation (24)) with respect to circuit extrinsic noise and thus to maximize sensitivity of the object detection circuit 100 e.g., in presence of switching noise.

Figure 4A:
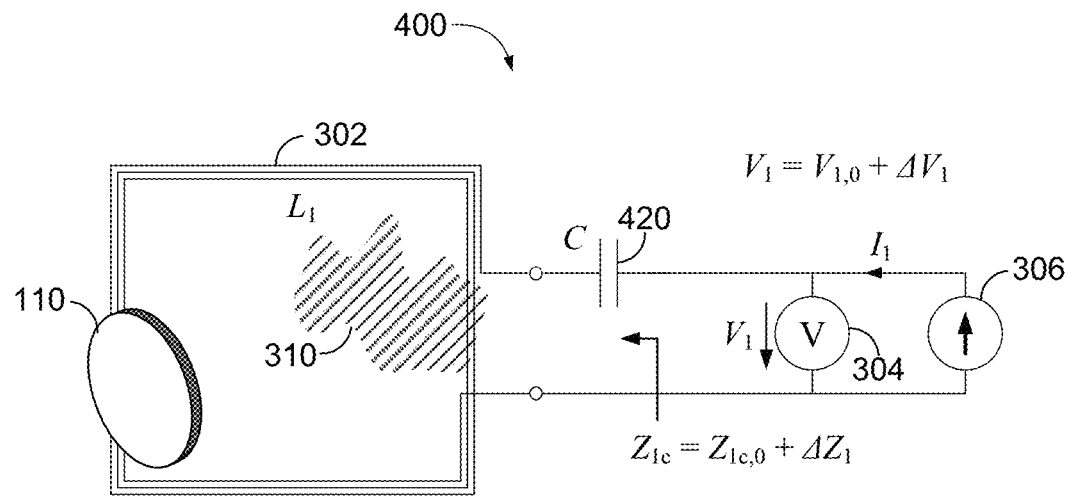
FIG. 4A is a schematic view illustrating an example of a sense coil, an object, and an associated technique based on a capacitively compensated impedance sensing approach that may be used in conjunction with the object detection circuit of FIG. 1.

FIG. 4A shows a circuit 400 illustrating another technique for inductively detecting a presence of an object 110. Circuit 400 uses a capacitor 420 having capacitance C to compensate for the reactance $\omega_s L_1$ of the sense coil 302 having an inductance $L_1$. The circuit 400 uses the same current source voltage measurement technique for as described in connection with circuit 300 of FIG. 3A for measuring an impedance $Z_{1c} = Z_{1c,0} + \Delta Z_1$ that now includes the reactance of compensation (tuning) capacitor 420. In some implementations of an object detection circuit 100, capacitor 420 may not fully compensate for the sense coil's 302 reactance at a specified sense frequency $f_s$ (e.g., in the MHz range). However, the frequency of the current source defining the sense frequency $f_s$ may be adjustable so that the LC-circuit may be tuned for improved compensation (resonance) in the absence of an object 110.

Figure 4B:
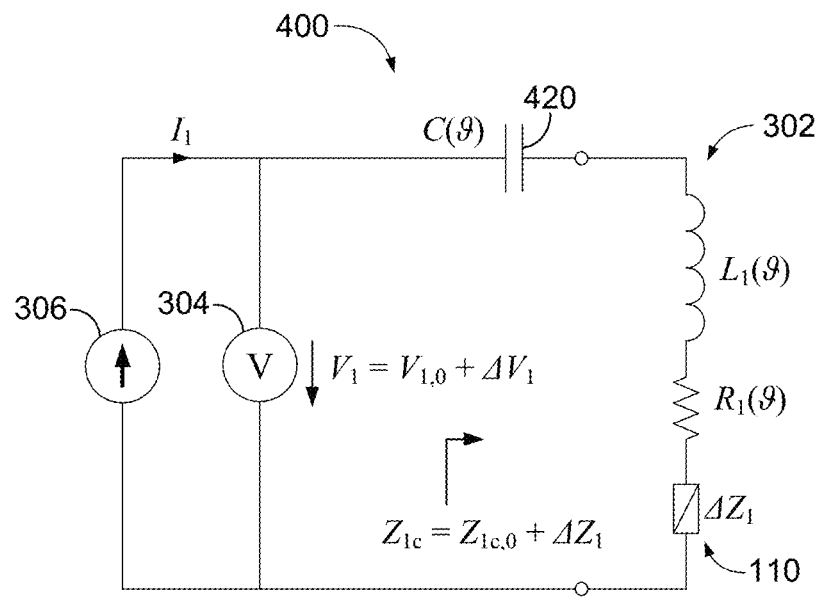
FIG. 4B shows an equivalent circuit of the circuit of FIG. 4A including the influence of the object model abstracted away.

An equivalent circuit of the circuit 400 of FIG. 4A is illustrated in FIG. 4B. The sense coil 302 is represented by an equivalent inductance $L_1(\vartheta)$ and an equivalent loss resistance $R_1(\vartheta)$, and the compensation capacitor 420 by its equivalent capacitance $C(\vartheta)$, all three shown as a function of temperature $\vartheta$. As previously stated, inductance $L_1(\vartheta)$ and resistance $R_1(\vartheta)$ may include a change of an inductance and resistance, respectively, due to the presence of materials 310. Depending on the electromagnetic properties of materials 310, this may be a decrease or increase of the inductance $L_1(\vartheta)$ and resistance $R_1(\vartheta)$ as measured in free space. The object 110 is abstracted away by impedance change $\Delta Z_1$ as previously discussed.

In case of perfect reactance compensation (tuning), the impedance $Z_{1c,0}$ as measured in absence of object 110 may only include the equivalent resistance $R_1(\vartheta)$. Assuming perfect compensation, the detection sensitivity as defined by the fractional impedance change may be expressed as $$\frac{\Delta Z_1}{|Z_{1c,0}|} = \frac{\alpha_{13}^2 Z_3^*}{R_1}, \qquad (25)$$

and in terms of the sense coil's 302 Q-factor $Q_1$, coupling factor $k_{13}$, and the object's 110 Q-factor $Q_3$ as $$\frac{\Delta Z_1}{|Z_{1c,0}|} \cong k_{13}^2 \frac{Q_1 Q_3}{1+Q_3^2}(1-jQ_3), \qquad (26)$$

For non-ferromagnetic objects 110 with high enough Q-factor $Q_3 \gg 1$, equation (26) may be rewritten as $$\frac{\Delta Z_1}{|Z_{1c,0}|} \cong k_{13}^2 Q_1 \left(\frac{1}{Q_3} - j\right). \qquad (27)$$

showing that the fractional change $|\Delta Z_1|/|Z_{1c,0}|$ that may be achievable with the circuit 400 using reactance compensation is $Q_1$-times higher than the fractional change $|\Delta Z_1|/|Z_{1,0}|$ obtained with the circuit 300 of FIG. 3A. Therefore, in some aspects of an object detection circuit 100, reactance compensation as illustrated by circuit 400 of FIG. 4A may increase sensitivity for various objects.

In some implementations of the object detection circuit 100 of FIG. 1 based on capacitively compensated impedance sensing, impedance measurement may be subjected to measurement errors. Reactance compensation may provide a mean for accurate calibration of the impedance measurement e.g., with respect to the angle $\arg\{Z_{12c}\}$ for purposes as previously discussed in connection with the circuit 300 of FIG. 3A. In some exemplary implementations of an object detection circuit 100, the frequency $f_s$ of the current source 306 is tuned such that the magnitude impedance $|Z_{1c,0}|$ becomes substantially a minimum in absence of the object 110, meaning that $|Z_{1c,0}| \cong R_1$. Knowing that in absence of the object 110, the minimum $|Z_{1c,0}|$ ideally corresponds to a zero angle ($\arg\{Z_{1c,0}\}=0$), the object detection circuit 100 may correct as part of a calibration procedure the actually measured impedance measurement by rotating the impedance plane so that the $\text{Im}\{Z_{1c,0}\}$ vanishes.

In certain implementations of an object detection circuit 100, reactance compensation may allow the dynamic range requirements of the voltage measurement circuit 304 to be reduced by a factor corresponding to the Q-factor $Q_1$ of the sense coil 302, neglecting any margin for temperature drift. For example, assuming a Q-factor of $Q_1=40$, the required dynamic range may reduce by 32 dB. This may result in a general increase of the robustness of the voltage measurement circuit 304 against effects such as temperature drift, moisture, thermal and quantization noise, noise and instability on DC power supplies, and eventually in reduced circuit complexity and cost savings in some components (e.g., low noise amplifier, analog-to-digital converter, power supplies).

In some implementations of the object detection circuit 100 of FIG. 1 using a voltage measurement circuit 304 with an input voltage limitation, reactance compensation may also allow a sense current $I_1$ to be increased by a factor of $Q_1$, which may in turn result in an increase of the signal-to-noise ratio (SNR) with respect to external noise (e.g., high frequency noise and harmonics in the electromagnetic fields as generated for the wireless power transfer) that is coupled into the sense coil 302.

Moreover, in some implementations of an object detection circuit 100, reactance compensation using a series capacitor 420 together with a voltage measurement circuit 304 that presents a high input impedance at sense frequency $f_s$ and a low impedance at low frequencies may form a high pass filter to attenuate low frequency signal components e.g., at the wireless power transfer frequency $f_{wpt}$ (e.g., 85 kHz) as described in more detail in connection with FIG. 10. Note that relatively strong low frequency components may be induced into the sense coil 302 during wireless power transfer. This may result in relaxed requirements for the current source 306 and the voltage measurement circuit 304 with respect to the dynamic range, overvoltage capability, etc.

However, in certain aspects reactance compensation may not reduce a temperature sensitivity of the object detection circuit 100 as it may be defined in analogy to equations (22) and (23) respectively, since reactance compensation may not reduce a change $\delta Z_{1c,0}$ due to a change in temperature $\Delta \vartheta$. In contrast, the change of $\text{Im}\{\delta Z_{1c,0}\}$ may be generally larger than $\text{Im}\{\delta Z_{1,0}\}$ if compensation capacitor 420 is also a function of temperature 19. Therefore, in some implementations of an object detection circuit 100, temperature sensitivity is reduced by either using a capacitor with a low temperature coefficient (e.g., NP0-type) or with a temperature coefficient that compensates or partially compensates for the temperature drift of the sense coil's impedance $Z_{1,0}$.

Figure 5A:
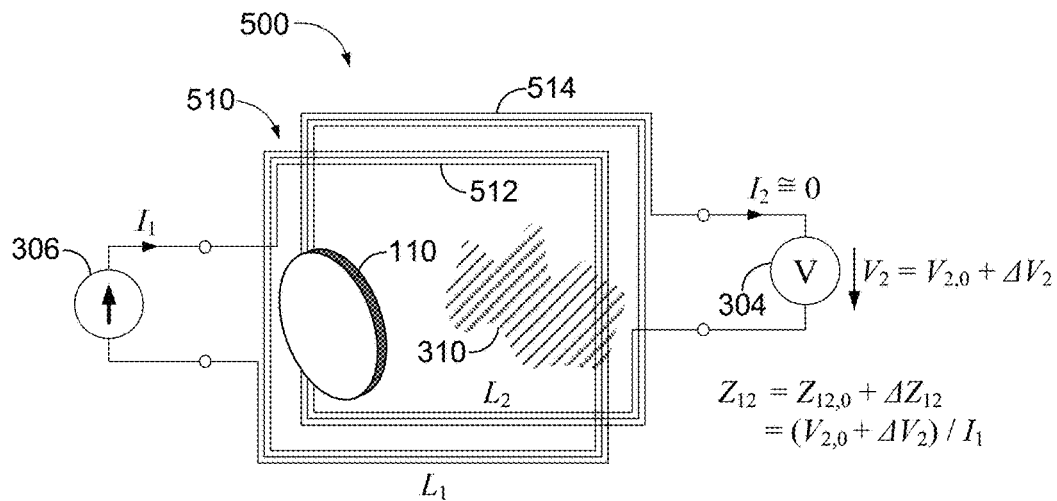
FIG. 5A is a schematic view illustrating an example of a double sense coil arrangement, an object, and an associated technique based on a mutual impedance sensing approach that may be used in conjunction with the object detection circuit of FIG. 1.

While circuits 300 and 400 of FIGS. 3A and 4A illustrate a technique for detecting an object 110 based on measuring a self-impedance $Z_1$ or a capacitively compensated self-impedance $Z_{1c}$ of a sense coil 302, respectively, the circuit 500 of FIG. 5A illustrates another technique for detecting an object 110 based on measuring a transimpedance $Z_{12}$ between a first (primary) sense coil 512 with inductance $L_1$ and a second (secondary) sense coil 514 with inductance $L_2$ of a sense coil arrangement 510. As for the self-impedance technique, a change $\Delta Z_{12}$ of the transimpedance $Z_{12}$ relative to the transimpedance $Z_{12,0}$ in the absence of the object 110 may indicate a presence of the object 110 in proximity of at least one of the two sense coils 512 and 514.

In some implementations, primary sense coil 512 and secondary sense coil 514 of the sense coil arrangement 510 are planar multi-turn coils and are disposed such that there is magnetic coupling between the two sense coils (e.g., sense coils may be overlapping as shown in FIG. 5A). A change of transimpedance $\Delta Z_{12}$ may be also experienced when the two sense coils 512 and 514 are integrated together with the wireless power transfer structure 224 into housing 236 as shown in FIG. 2A due to presence of materials 310 as previously discussed. Presence of materials 310 is indicated in FIG. 5A by the shaded area. Materials 310 may also include a dielectric substrate that carries the two sense coils 512 and 516 or a dielectric medium the sense coils are embedded in (e.g., in case of a printed circuit board (PCB) design). The effects of materials 310 may generally produce a change in the sense coils' 512 and 514 self-impedance $Z_{1,0}$ and $Z_{2,0}$, respectively, and in the transimpedance $Z_{12,0}$ relative to these impedances as measured in free space. The effects of materials 310 are considered already included in $Z_{1,0}$, $Z_{2,0}$ and $Z_{12,0}$.

The circuit 500 of FIG. 5A illustrates a technique for measuring a transimpedance $Z_{12}$ based on the current source voltage measurement approach. A sinusoidal current $I_1$ with a defined frequency, amplitude, and phase provided by a current source 306 is applied to the primary sense coil 512 and the open-circuit voltage $V_2$ is measured across the terminals of the secondary sense coil 514. The open-circuit voltage $V_1$ is measured using a sensitive high impedance voltage measurement circuit 304 so that there is virtually zero current at the terminals of the secondary sense coil 514 ($I_2 \cong 0$). The current source 306 and the voltage measurement circuit 304 may be part of the measurement and detection circuit 108 with reference to FIG. 1. The voltage measurement circuit 304 may be frequency selective (narrowband) tuned to the sense frequency $f_s$ (frequency of the current source) as previously discussed in connection with the circuit 300 of FIG. 3A. The transimpedance $Z_{12} = Z_{12,0} + \Delta Z_{12}$ between the two sense coils 512 and 514 may be determined by dividing the measured voltage $V_{2,0} + \Delta V_2$ by the defined (known) current $I_1$, which may be expressed more formally as $$Z_{12} = Z_{12,0} + \Delta Z_{12} = \frac{V_{2,0} + \Delta V_2}{I_1}, \tag{28}$$

Using an ideal current source 306, a change $\Delta Z_{12}$ in the transimpedance $Z_{12}$ e.g., due to presence of the object 110 manifests in a change $\Delta V_2$ in the voltage $V_2$ while the current $I_1$ remains unaffected. Therefore, measuring a change $\Delta V_2$ in the voltage $V_2$ may be equivalent to measuring a change $\Delta Z_{12}$ in the transimpedance $Z_{12}$. In other words, the voltage $V_2$ may be indicative of the transimpedance $Z_{12}$. The current source 306 and the voltage measurement circuit 304 used in an implementation of the circuit 500 of FIG. 5A may be characterized by a quasi-ideal current source and a quasi-ideal voltage measurement circuit, respectively, as defined in connection with the circuit 300 of FIG. 3A.

As opposed to the self-impedance as measured at a single sense coil 302, the transimpedance as measured between a pair of sense coils (e.g., 512 and 514) depends on the measurement technique (e.g., on loading conditions of sense coils 512 and 514). The transimpedance as measured with the current source voltage measurement approach illustrated by the circuit 500 of FIG. 5A may be also referred to as the mutual impedance. Other measurement techniques (not illustrated herein) e.g., by applying a sinusoidal voltage $V_1$ with a defined frequency, amplitude, and phase provided by a voltage source to the primary sense coil 512 and measuring the short circuit current $I_2 = I_{2,0} + \Delta I_2$ at the secondary sense coil 514 using a sensitive (e.g., frequency selective) low impedance current measurement circuit generally measure a different transimpedance as further discussed below in connection with FIG. 5C.

Figure 5B:
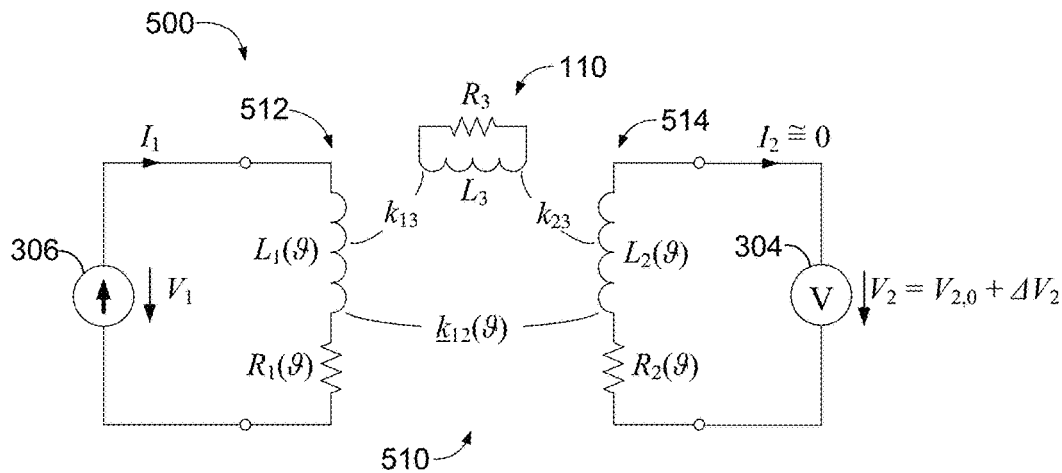
FIG. 5B shows an equivalent circuit of the circuit of FIG. 5A including a circuit model of the object.

An equivalent circuit of the circuit 500 of FIG. 5A including a circuit model of the object 110 is shown in FIG. 5B. In this equivalent circuit, the primary sense coil 512 and secondary sense coil 514 are each represented by an equivalent inductance $L_1(\vartheta)$ and $L_2(\vartheta)$, respectively, and by an equivalent loss resistance $R_1(\vartheta)$ and $R_2(\vartheta)$, all shown as a function of temperature $\vartheta$. The equivalent loss resistances $R_1(\vartheta)$ and $R_2(\vartheta)$ may each include a first resistance component due to losses in the sense coil's conductive structure (e.g., copper wires or PCB traces) and a second resistance component due to loss effects in materials 310 as previously discussed in connection with FIG. 3B. Magnetic coupling between sense coils 512 and 514 is represented by a complex coupling factor $\underline{k}_{12}(\vartheta)$, also shown as a function of temperature $\vartheta$ as further explained below. As previously stated, the equivalent inductances and resistance $L_1(\vartheta)$, $L_2(\vartheta)$, $R_1(\vartheta)$ and $R_2(\vartheta)$, respectively, as well as the coupling factor $\underline{k}_{12}(\vartheta)$ may include a change due to the presence of materials 310. Since the electromagnetic properties of materials 310 may generally be temperature dependent, some temperature dependence may be expected for the coupling factor $\underline{k}_{12}(\vartheta)$. The change in $\underline{k}_{12}(\vartheta)$ due to materials 310 may include a real and imaginary component due to reactive and resistive (loss) effects, respectively, in materials 310 but also due to mutual loss effects e.g., an eddy current loss effect in the secondary sense coil 514 produced by the magnetic field of the primary sense coil 512. The real component relates to the mutual inductance $M_{12}$ expressed as $$M_{12}(\vartheta) = \mathrm{Re}\{\underline{k}_{12}(\vartheta)\}\sqrt{L_1(\vartheta)L_2(\vartheta)}, \tag{29}$$

while the imaginary component may be considered related to a mutual resistance expressed as $$R_{12}(\vartheta) = \omega_s \mathrm{Im}\{\underline{k}_{12}(\vartheta)\}\sqrt{L_1(\vartheta)L_2(\vartheta)}. \tag{30}$$

FIG. 5B shows each of the primary sense coil 512 and the secondary sense coil 514 magnetically coupled with coupling factor $k_{13}$ and $k_{23}$, respectively, to the object 110 represented by an LR-Model ($L_3$, $R_3$) as previously discussed e.g., with reference to FIG. 3B. The effect of presence of the object 110 in proximity of coil arrangement 510 may be threefold. First, it produces a change $\Delta Z_1$ in the impedance $Z_1$ as it would be measured at the terminals of sense coil 512. Second, it produces a change $\Delta Z_2$ in the impedance $Z_2$ as it would be measured at the terminals of sense coil 514. Third, it produces a change $\Delta Z_{12}$ in the mutual impedance $Z_{12}$ as measured between sense coil 512 and sense coil 514. Equations for these changes may be obtained from circuit analysis of the equivalent circuit model depicted in FIG. 5B. Defining the impedance of the primary sense coil 512 in absence of the object 110

$$Z_{1,0} = R_1 + j\omega L_1, \tag{31}$$

the impedance of the secondary sense coil 514 in absence of the object 110

$$Z_{2,0} = R_2 + j\omega_s L_2, \tag{32}$$

the impedance of the object 110

$$Z_3 = R_3 + j\omega_s L_3, \tag{33}$$

the mutual impedance between sense coil 512 and 514 in absence of the object 514

$$Z_{12,0} = R_{12} + j\omega_s M_{12} = \omega_s \underline{k}_{12}\sqrt{L_1 L_2}, \tag{34}$$

the mutual impedance between primary sense coil 512 and the model of the object 110

$$Z_{13} = j\omega_s M_{13} = \omega_s k_{13}\sqrt{L_1 L_3}, \tag{35}$$

the mutual impedance between secondary sense coil 514 and the model of the object 110

$$Z_{23} = j\omega_s M_{23} = \omega_s k_{23}\sqrt{L_2 L_3}, \tag{36}$$

and applying Kirchhoff's current and voltage laws provides the following system of equations:

$$Z_{1,0}I_1 - Z_{12}I_2 - Z_{13}I_3 - V_1 = 0, \tag{37}$$

$$Z_{12}I_1 - Z_{2,0}I_2 - Z_{23}I_3 - V_2 = 0, \tag{38}$$

$$Z_{13}I_1 - Z_{23}I_2 - Z_3 I_3 = 0. \tag{39}$$

Equations for the changes in $Z_1$, $Z_2$, and $Z_{12}$ may be obtained by eliminating the variable $I_3$ in equations (37) and (38) by substituting $$I_3 = \frac{Z_{13}}{Z_3}I_1 - \frac{Z_{23}}{Z_3}I_2 \quad (40)$$

yielding the following equation pair $$\left(Z_{1,0} - \frac{Z_{13}^2}{Z_3}\right)I_1 - \left(Z_{12,0} - \frac{Z_{13}Z_{23}}{Z_3}\right)I_2 - V_1 = 0 \quad (41)$$

$$\left(Z_{12,0} - \frac{Z_{13}Z_{23}}{Z_3}\right)I_1 - \left(Z_{2,0} - \frac{Z_{23}^2}{Z_3}\right)I_2 - V_2 = 0 \quad (42)$$

The second term of the expressions in brackets may be considered the change in impedance produced by the object 110 which may now be expressed as $$\Delta Z_1 = -\frac{Z_{13}^2}{Z_3} = -\frac{Z_{13}^2}{|Z_3|^2}Z_3^* = \alpha_{13}^2 Z_3^* \quad (43)$$

$$\Delta Z_2 = -\frac{Z_{23}^2}{Z_3} = -\frac{Z_{23}^2}{|Z_3|^2}Z_3^* = \alpha_{23}^2 Z_3^* \quad (44)$$

$$\Delta Z_{12} = -\frac{Z_{13}Z_{23}}{Z_3} = -\frac{Z_{13}Z_{23}}{|Z_3|^2}Z_3^* = \alpha_{13}\alpha_{23} Z_3^* \quad (45)$$

using the scalar transformation factors $$\alpha_{13} = \frac{\omega_s M_{13}}{|Z_3|} \quad (46)$$

$$\alpha_{23} = \frac{\omega_s M_{23}}{|Z_3|} \quad (47)$$

Equations (40), (41), and (45) show that each of the three impedance changes are proportional to $Z_3^*$ thus reflecting the characteristics of the object 110 in terms of its Q-factor $Q_3$ as previously discussed in connection with FIG. 3B.

Figure 5C:
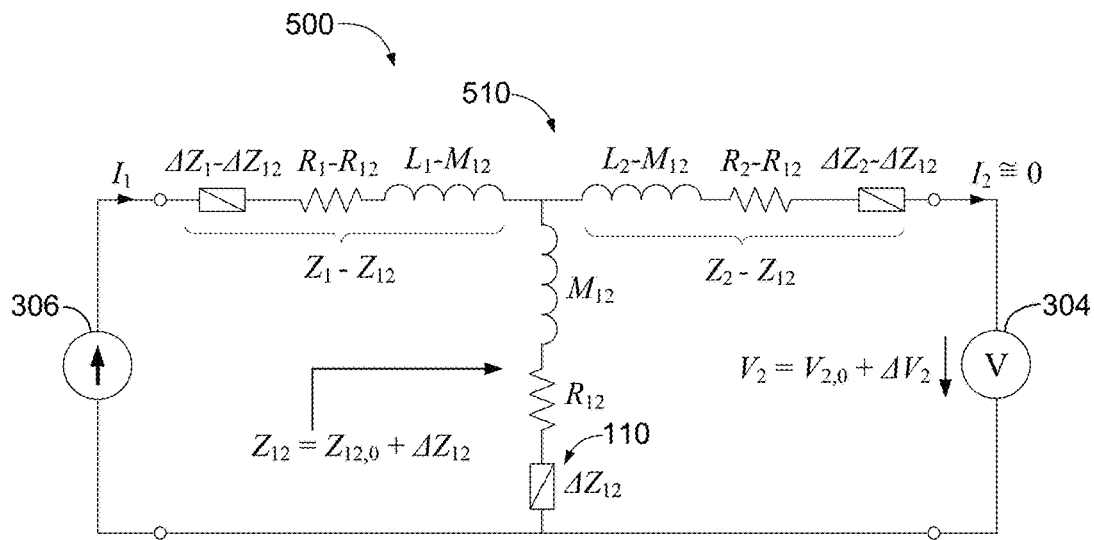
FIG. 5C shows a 'T'-equivalent circuit of the circuit of FIG. 5B including the influence of the object model abstracted away.

FIG. 5C shows an equivalent circuit of the circuit 500 of FIG. 5A. The sense coil arrangement 512 is represented by a 'T'-equivalent circuit model (transformer model) comprised of a first series branch impedance $$Z_1 - Z_{12} = R_1 - R_{12} + j\omega_s(L_1 - M_{12}) + \Delta Z_1 - \Delta Z_{12}, \quad (48)$$

a second series branch impedance $$Z_2 - Z_{12} = R_2 - R_{12} + j\omega_s(L_2 - M_{12}) + \Delta Z_2 - \Delta Z_{12}, \quad (49)$$

and a shunt branch impedance $$Z_{12} = R_{12} + j\omega_s M_{12} + \Delta Z_{12}. \quad (50)$$

Each of the three branch impedances is composed of an inductance, resistance and an impedance change due to presence of the object 110. More precisely, the equivalent circuit of FIG. 5B shows the model of the object 110 abstracted away by impedance change $\Delta Z_1 - \Delta Z_{12}$ and $\Delta Z_2 - \Delta Z_{12}$ in the first and second series branch impedance $Z_1 - Z_{12}$ and $Z_2 - Z_{12}$, respectively, and by a change of mutual impedance $\Delta Z_{12}$ in the shunt branch impedance $Z_{12}$. Though not shown in FIG. 5C for illustrative purposes and simplicity, each of the equivalent circuit elements may be temperature dependent.

Given the current source voltage measurement approach dictating a current $I_1$ in the primary sense coil 512 and measuring the open-circuit voltage $V_2$ ($I_2 \cong 0$) at the terminals of the secondary sense coil 514, it may be appreciated that leakage inductances $L_1 - M_{12}$ and $L_2 - M_{12}$, equivalent series resistances $R_1 - R_{12}$ and $R_2 - R_{12}$, and impedance changes $\Delta Z_1 - \Delta Z_{12}$ and $\Delta Z_2 - \Delta Z_{12}$ have ideally no effect in the transimpedance measurement. Transimpedance as measured with the current source voltage measurement approach ideally is determined by the shunt branch impedance that is referred to as the mutual impedance $$Z_{12} = Z_{12,0} + \Delta Z_{12} = R_{12} + j\omega_s M_{12} + \Delta Z_{12} = \frac{V_{2,0} + \Delta V_2}{I_1}. \quad (51)$$

Analogously to equation (16), the sensitivity of the object detection circuit 100 of FIG. 1 based on the mutual impedance sensing technique may be defined as the mutual impedance change $\Delta Z_{12}$ as produced in presence of an object 110 normalized to $|Z_{12,0}|$ that is the magnitude of the mutual impedance as measured in absence of the object 110. This normalized mutual impedance change (sensitivity) may be also referred to as the fractional change $\Delta Z_{12}/|Z_{1,0}|$. Using equation (45), the fractional change due to presence of a non-ferromagnetic object 110 may be expressed as $$\frac{\Delta Z_{12}}{|Z_{12,0}|} = \frac{\alpha_{13}\alpha_{23} Z_3^*}{|Z_{12,0}|}. \quad (52)$$

For a sense coil arrangement 510 with high enough mutual inductance $$\omega_s M_{12} >> R_1, \quad (53)$$

the magnitude mutual impedance $|Z_{12,0}|$ is approximately the mutual reactance $\omega_s M_{12}$ so that equation (52) may be rewritten as $$\frac{\Delta Z_{12}}{|Z_{12,0}|} \cong \frac{\alpha_{13}\alpha_{23} Z_3^*}{|R_{12} + j\omega_s M_{12}|}. \quad (54)$$

Substituting $\alpha_{13}$, $\alpha_{23}$ and $Z_3$ using equations (46), (47), (9), and (11), equation (54) may be expressed analogously to equation (20) solely in terms of coupling factors $k_{13}$, $k_{23}$, $k_{12}$ and the object's 110 Q-factor $Q_3$ as follows:

$$\frac{\Delta Z_{12}}{|Z_{12,0}|} \cong \frac{k_{13}k_{23}}{|k_{12}|} \frac{Q_3}{1+Q_3^2}(1-jQ_3), \quad (55)$$

For objects 110 with high enough Q-factor $Q_3 >> 1$, equation (55) may be rewritten as $$\frac{\Delta Z_{12}}{|Z_{12,0}|} \cong \frac{k_{13}k_{23}}{|k_{12}|}\left(\frac{1}{Q_3} - j\right) \quad (56)$$

Figure 5D:
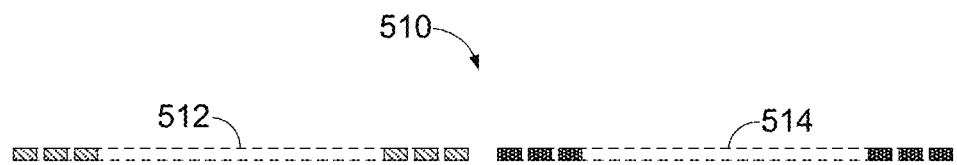
FIGS. 5D to 5H are schematic cut views illustrating different example implementations of the double sense coil arrangement of FIG. 5A using planar sense coils.
Figure 5E:
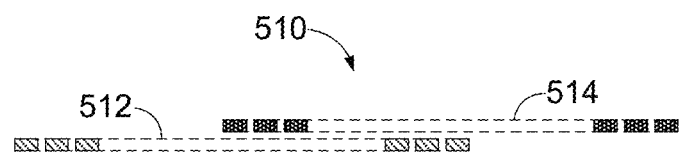
Figure 5F:
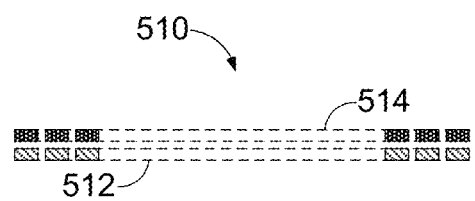

For the special case of a tightly coupled sense coil arrangement 510 with $|k_{12}| \cong <1$ (e.g., using two identical sense coils on top of each other and with zero displacement as shown by FIG. 5F, it may be a consequence that both sense coils 512 and 514 provide about equal coupling to the object 110 ($k_{13} \cong k_{23}$). In this special case, equation (56) may be rewritten as $$\frac{\Delta Z_{12}}{|Z_{12,0}|} \cong k_{13}^2\left(\frac{1}{Q_3} - j\right) \quad (57)$$

Equation (57) indicates that the mutual impedance sensing technique has the potential to provide a sensitivity (fractional change) equal to that of self-impedance sensing (Equation (21)) assuming equal coupling to the object 110 for both sensing methods (circuit 300 of FIG. 3A and circuit 500 of FIG. 5A).

Potentially equal sensitivity may be also expected with respect to noise as previously discussed in connection with FIG. 3C. An equal equivalent noise voltage level ($V_{1,n}=V_{2,n}$) may be assumed for both circuit 300 and 500 if circuit extrinsic noise is the predominant noise source and if sense coils 302 and 514 are identical. Furthermore, assuming an equal current level $I_1$ and approximately equal coupling to the object 110 in both circuits 300 and 500, and for primary 512 and secondary sense coil 514 ($k_{13} \cong k_{23}$), equal SNR may be expected from both sensing methods (circuits 300 and 500)

$$SNR = \frac{I_1^2 \cdot |\Delta Z_1|^2}{V_{1,n}^2} \cong \frac{I_1^2 \cdot |\Delta Z_{12}|^2}{V_{2,n}^2}. \qquad (58)$$

However, in case $k_{13} \neq k_{23}$ (e.g., primary and secondary sense coil are physically displaced e.g., as illustrated by FIG. 5D), a lower SNR may be expected from mutual impedance sensing (circuit 500).

As previously stated, the change in mutual impedance $\Delta Z_{12}$ is angle-true ($\arg\{\Delta Z_1\}=-\arg\{Z_3\}$), meaning that it reflects the electromagnetic characteristics (impedance $Z_3$) of the object 110. This feature may allow the object detection circuit 100 to discriminate certain categories of objects and/or increase a sensitivity for certain categories of objects as previously discussed in connection with the self-impedance sensing technique (circuit 300) as illustrated by FIG. 3A.

In some aspect, other transimpedance measurement techniques may be used e.g., the voltage source current measurement approach as previously described in connection with the circuit 300 of FIG. 3A. An expression for the change $\Delta Z_{12}$ in transimpedance $Z_{12}$ as resulting with the voltage source current measurement approach may be also obtained from the system of equations (41) and (42). Setting $V_2=0$ (the voltage across the current measurement circuit) and solving for the current $I_2$ yields for the change in transimpedance due to proximity of the object 110

$$\Delta Z_{12} = \left( \frac{Z_{1,0}}{Z_{12,0}} \alpha_{13}^2 + \frac{Z_{2,0}}{Z_{12,0}} \alpha_{23}^2 - \alpha_{13}\alpha_{23} \right) Z_3^*. \qquad (59)$$

It may be appreciated that the expression in brackets generally is a non-scalar (complex) transformation factor. Therefore, the change $\Delta Z_{12}$ in transimpedance may be no more proportional to the object's 110 sign-inverted impedance $-Z_3$, hence $\arg\{\Delta Z_{12}\} \neq -\arg\{Z_3\}$). Moreover, the resulting angle $\arg\{\Delta Z_{12}\}$ may vary with position and orientation of the object 110 relative to the sense coil arrangement 510. In some aspects of transimpedance sensing, this finding may be considered as a difficulty of the voltage source current measurement approach.

In some implementations of the object detection circuit 100 of FIG. 1 based on the mutual impedance sensing technique, the object detection circuit 100 is configured to calibrate the mutual impedance measurements for purposes as previously described in connection with FIGS. 3A to 3D. However, implementation of the calibration may result in higher circuit complexity and cost in certain aspects, e.g., if compared to aspects of capacitively compensated self-impedance sensing using sense frequency tuning as discussed in connection with FIG. 4A.

FIGS. 5D to 5H are cut views illustrating various exemplary implementations of planar sense coil arrangements 510 as they may be used for transimpedance (e.g., mutual impedance) sensing.

FIG. 5D illustrates an implementation of a sense coil arrangement 510 where sense coils 512 and 514 are coplanar and adjacent. This sense coil arrangement 510 may apply to an implementation using a plurality of substantially equal sense elements 106a, 106b, . . . , 106n each including a single planar sense coil arranged in an array 106 with reference to FIG. 2A. Pairs of neighboring sense coils (e.g., sense coil 106a and 106b) may be temporarily configured using a multiplexer circuitry as further discussed with reference to FIG. 10. A first pair may be configured by sense coils 106a and 106b, a second pair may be configured by sense coils 106b and 106c, a third pair may be configured by sense coils 106c and 106d etc. Sense coils pairs that are temporarily (e.g., sequentially) configured may be overlapping. It may be also appreciated that in such implementation or operation, the number of double sense coil arrangements 510 that can be potentially configured is larger than the number N of sense elements of the array 106.

FIG. 5E illustrates another implementation of a sense coil arrangement 510 where sense coils 512 and 514 are partially overlapping. This sense coil arrangement 510 may apply to an implementation using a plurality of substantially equal sense elements 106a, 106b, . . . , 106n each including a single planar sense coil arranged in an array 106 having a first and second plane. Sense coils in the first plane are offset relative to the sense coils in the second plane by half of the width of the sense coil. Pairs of overlapping sense coils e.g., with a primary sense coil 512 in a first plane and a secondary sense coil 514 in a second plane may be temporally (e.g., sequentially) configured using a multiplexer circuitry as further discussed with reference to FIG. 10. A first pair may be configured by sense coil 106a in the first plane and sense coil 106b in the second plane, a second pair may be configured by sense coil 106b in the second plane and sense coil 106c in the first plane, a third pair may be configured by sense coils 106c in the first plane and sense coil 106d in the second plane, etc. Sense coil pairs temporarily configured in this way may be overlapping.

FIG. 5F illustrates a further implementation of a sense coil arrangement 510 where sense coils 512 and 514 are fully overlapping (on top of each other). This sense coil arrangement 510 may apply to an implementation using a plurality of sense elements 106a, 106b, . . . , 106n arranged in an array 106. Each of the plurality sense elements 106a, 106b, . . . , 106n includes a pair of planar sense coils stacked on top of each other. This sense coil arrangement 510 may be also considered as a bifilar winding structure with a first winding disposed in a first plane and a second winding disposed in a second plane.

Figure 5G:
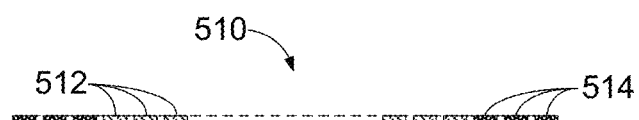

FIG. 5G illustrates yet another exemplary implementation of a sense coil arrangement 510 where sense coils 512 and 514 are coplanar and arranged inside of each other. This sense coil arrangement 510 may apply to an implementation using a plurality of sense elements 106a, 106b, . . . , 106n arranged in an array 106. Each sense element includes a pair of coplanar sense coils arranged inside each other.

Figure 5H:
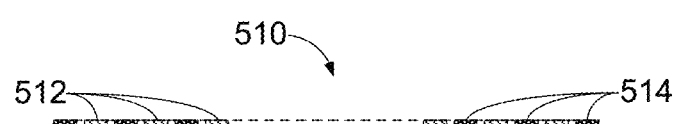

FIG. 5H illustrates yet a further implementation of a sense coil arrangement 510 where sense coils 512 and 514 are coplanar and interleaved. This sense coil arrangement 510 may apply to an implementation using a plurality of sense elements 106a, 106b, ..., 106n arranged in an array 106 with reference to FIG. 2A. Each sense element includes a pair of interleaved coplanar sense coils. This sense coil arrangement 510 may be also considered as a bifilar winding structure with a first and a second winding in the same plane.

Figure 6A:
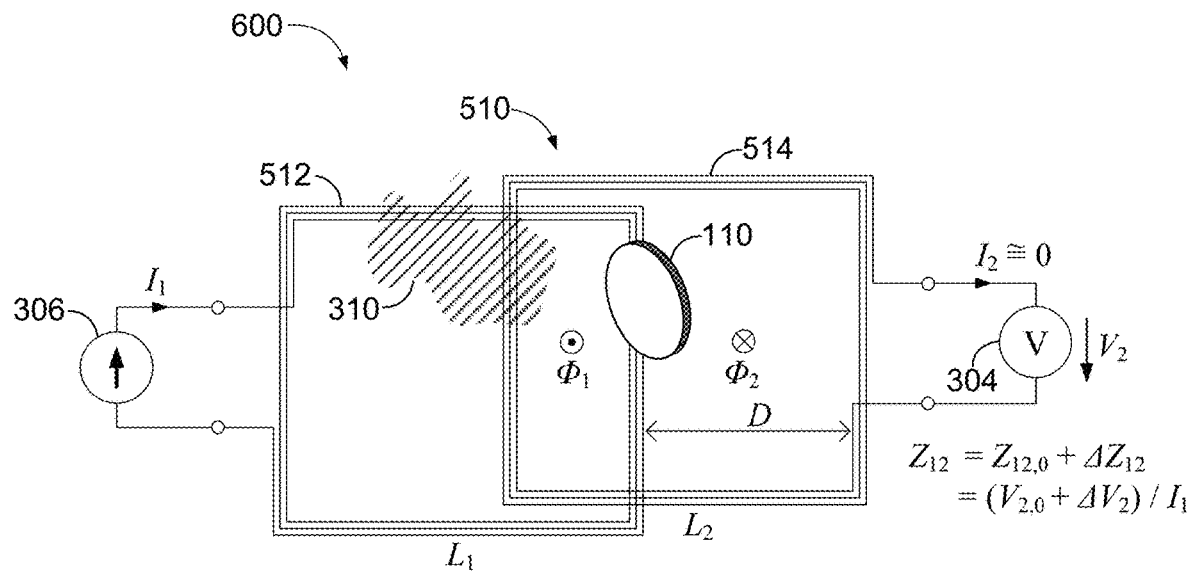
FIG. 6A is a schematic view illustrating another example of a double sense coil arrangement, an object, and an associated technique based on a flux balanced mutual impedance sensing approach that may be used in conjunction with the object detection circuit of FIG. 1.

FIG. 6A shows a circuit 600 to illustrate another technique based on the mutual impedance sensing approach as previously described with reference to FIGS. 5A to 5H. As in the circuit 500 of FIG. 5A, the mutual impedance $Z_{12}=Z_{12,0}+\Delta Z_{12}$ in presence of the object 110 is measured using the current source voltage measurement technique and a sense coil arrangement 510 (e.g., sense coil arrangement 510 of FIG. 5E) including primary sense coil 512 with inductance $L_1$ and secondary sense coil 514 with inductance $L_2$. FIG. 6A shows the sense coil 514 displaced relative to the sense coil 512 by an amount D. FIG. 6A also indicates a first magnetic flux $\Phi_1$ through the overlap area and a second flux $\Phi_2$ in the opposite direction through the non-overlap area of sense coil 514. There may be a displacement D where the net magnetic flux $\Delta\Phi=\Phi_1-\Phi_2$ generated by the primary sense coil 512 and passing through the secondary sense coil 514 is virtually zero (flux balance) resulting in virtually zero coupling ($|k_{12}|\cong 0$) in absence of the object 110. However, in presence of materials 310 as previously described in connection with FIG. 3A, perfect flux balance (zero coupling) may not be achievable. Losses in materials 310 may cause a small out-of-phase component in the flux $\Phi_2$ relative to flux $\Phi_1$ so that the net flux $\Delta\Phi$ may never vanish entirely for any displacement D within some limits. In an aspect, the displacement D between the primary sense coil 512 and secondary sense coil 514 may be adjusted to reduce coupling. In some implementations, the level of coupling may be negligible or at least reduced to below a threshold. In some aspects of an object detection circuit 100, the displacement D may be adjusted by design for minimum magnitude coupling $|\underline{k}_{12}|$ between sense coil 512 and 514 corresponding to minimum magnitude mutual impedance $|Z_{12,0}|=|R_{12}+j\omega_s M_{12}|$ in absence of the object 110. A mutual impedance sensing technique operating at or near flux balance may be referred to as flux balanced mutual impedance sensing.

In some implementations of an object detection circuit 100, flux balanced mutual impedance sensing is used to increase a sensitivity (fractional change $\Delta Z_{12}/|Z_{12,0}|$) as defined by Equation (54) for mutual impedance sensing. It may be appreciated that the maximum sensitivity as achievable with the circuit 600 of FIG. 6A by designing the sense coil arrangement 510 with an optimum displacement D providing minimum magnitude coupling $|\underline{k}_{12}|=|\underline{k}_{12}|_{min}$ results in a substantially higher sensitivity compared to the sensitivity of the circuit 500 of FIG. 5A e.g., designed for maximum coupling $|\underline{k}_{12}|\cong <1$. The sensitivity gain in this example may be quantified approximately by $1/|k_{12}|_{min}$.

Figure 6B:
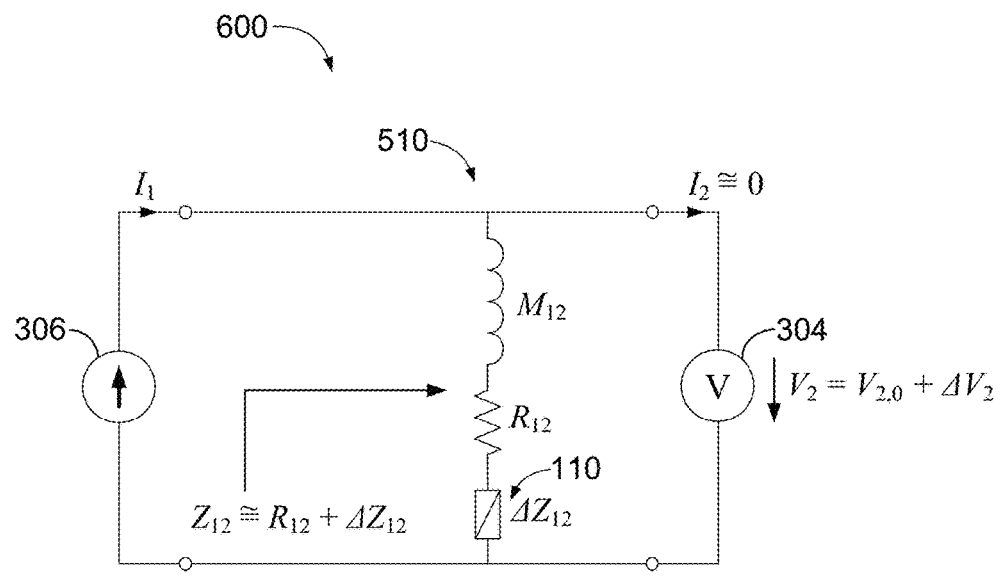
FIG. 6B shows a simplified 'T' equivalent circuit of the circuit of FIG. 6A including the influence of the object model abstracted away.
Figure 6C:
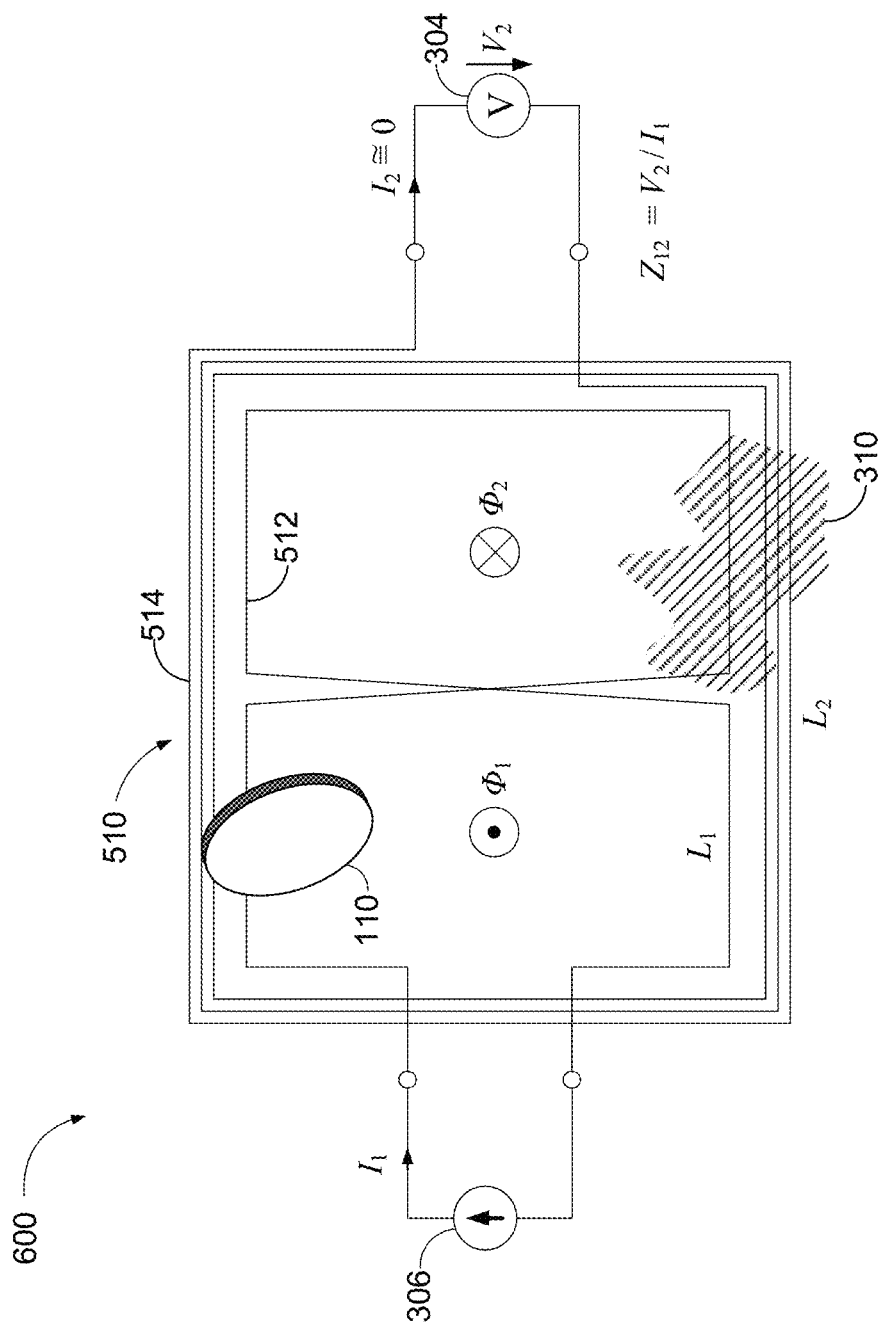
FIG. 6C is a schematic view illustrating a further example of a double sense coil arrangement, an object, and an associated technique based on a f a flux balanced mutual impedance sensing approach that may be used in conjunction with the object detection circuit of FIG. 1.

FIG. 6B shows a simplified equivalent circuit of the circuit 600 of FIG. 6A. The sense coil arrangement 512 is represented by a simplified 'T' equivalent circuit model neglecting first and second series branch impedance as previously described with reference to FIG. 5C. This simplification may be permissible for the current source voltage measurement approach, since first and second series branch impedance have virtually no impact in the mutual impedance measurement. This simplified equivalent circuit solely comprises the shunt branch impedance $Z_{12}$ including the residual mutual inductance $M_{12}$, a residual resistance $R_{12}$ and mutual impedance change $\Delta Z_{12}$ that represents the object 110 abstracted away.

Flux balanced impedance sensing may be also implemented using a special sense coil arrangement 510 as illustrated by circuit 600 in FIG. 6C. In this exemplary implementation, the primary sense coil 512 is of a different topology than the secondary sense coil 512 such that the net magnetic flux $\Delta\Phi=\Phi_1-\Phi_2$ through the secondary sense coil 514 and thus coupling $|\underline{k}_{12}|$ is virtually zero (or close thereto) in absence of the object 110. FIG. 6C shows the primary sense coil 512 as a "figure eight" or "DD"-type coil while the secondary sense coil 514 is shown as a "circular"-type coil. It may be appreciated that there exist other implementations or combinations providing flux balance in the secondary sense coil 514. In some example implementations, the primary sense coil 512 is a "circular"-type coil and the secondary 514 is a "DD"-type coil.

In some implementations of the object detection circuit 100 of FIG. 1 based on the flux balanced mutual impedance sensing technique, the sense element array 106 is integrated together with the wireless power transfer structure 224 into housing 236 as illustrated by FIG. 2B. For such implementations, the design of the sense elements of the plurality of sense elements 106a, 106b, ..., 106n (sense element array 106) may require some modifications to substantially compensate for the flux unbalancing effects of materials 310 as previously defined in connection with FIG. 3A. These design modifications may be individual for each sense element of the plurality of sense elements 106a, 106b, ..., 106n. However, even with such modifications, the minimum achievable coupling $|k_{12}|_{min}$ may not be achieved in each of the plurality of sense elements e.g., because the integration impact is difficult to predict or may vary over time due to mechanical changes, ageing, temperature variations, etc. resulting in some loss of sensitivity. Therefore, adjusting flux balance in situ may be desirable.

Regardless of the sense coil arrangement 510 used for flux balanced mutual impedance sensing, there may exist positions of the object 110 where flux remains virtually balanced even for an object 110 in close proximity to the sense coil arrangement 510, meaning reduced or virtually zero sensitivity ($\Delta Z_{12}\cong 0$). However, it shall be noticed that the blind spot (sum of all positions where sensitivity is below a threshold) may be extremely narrow. Therefore, the likelihood that an object 110 comes to a rest in a blind spot may be very low. These positions may also somewhat dependent on type, size, and orientation of the object 110. In some implementations based on the sense coil arrangement 510 of FIG. 6C, the blind spot e.g., for a coin may be found in a narrow area along its vertical symmetry axis (not shown in FIG. 6C) if the coin rests on one of its large surfaces in a plane in parallel to the planar sense coil arrangement 510 and if the center of the coin defines the coin's position. In some implementations using a sense coil array (e.g., sense coil array 106), blind spots are reduced or eliminated using overlapping sense coil arrangements 510.

Figure 7A:
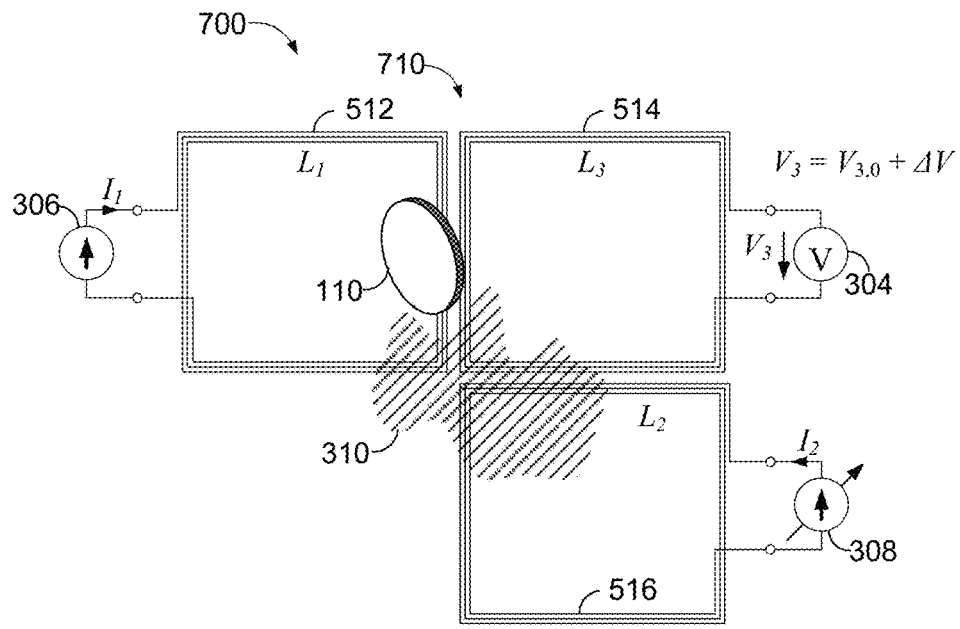
FIG. 7A is a schematic view illustrating an example of a triple sense coil arrangement, an object, and an associated technique based on a flux balanced mutual impedance sensing approach that may be used in conjunction with the object detection circuit of FIG. 1.

FIG. 7A shows a circuit 700 illustrating a further technique which may be also referred to as flux balanced mutual impedance sensing. The circuit 700 is also based on the current source voltage measurement approach. It includes a sense coil arrangement 710 of two primary sense coils 512 with inductance $L_1$ and 516 with inductance $L_3$ and a secondary sense coil 514 with inductance $L_2$. Each of the primary sense coils 512 and 516 is driven by a first and second current source 306 and 308 delivering currents $I_1$ and $I_2$, respectively, e.g., with a sinusoidal current in the MHz range. The secondary sense coil 514 is electrically connected to the voltage measurement circuit 504 for measuring the open-circuit output voltage $V_3$. The second current source 308 delivering current $I_2$ is controllable in amplitude and phase so that the circuit 700 may be operated such that the magnetic flux components as generated by sense coil 512 and 516 and passing through the secondary sense coil 514 cancel out (substantially zero flux or at least very low flux) resulting in substantially zero output voltage ($V_3 \cong 0$) in absence of the object 110. FIG. 7 also shows an object 110 at an exemplary position in proximity of the sense coil arrangement 710. Since the output voltage $V_3$ is a function of two primary currents $I_1$ and $I_2$, the definition of a transimpedance (e.g., Equation (28)) may generally not apply. Therefore, this technique may rely on measuring the output voltage $V_3$ and the object 110 is detected based on a change $\Delta V_3$ in the output voltage $V_3$ relative to the voltage $V_{3,0}$ as measured in absence of the object 110.

Figure 7B:
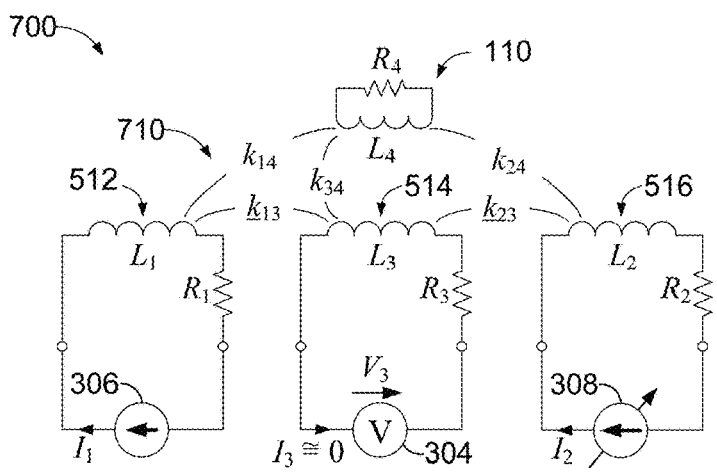
FIG. 7B shows an equivalent circuit of the circuit of FIG. 7A including a circuit model of the object.

FIG. 7B shows an equivalent circuit of the circuit 700 including equivalent loss resistances $R_1$, $R_2$, and $R_3$ of sense coils 512, 516, and 514, respectively. Coupling between the first primary sense coil 512 and secondary sense coil 514 and between the second primary sense coil 516 and secondary sense coil 514 is represented by complex coupling factors $\underline{k}_{13}$ and $\underline{k}_{23}$, respectively, as previously discussed in connection with FIG. 3B. Coupling between the two primary sense coils 512 and 516 may also exist but is omitted in FIG. 7B as it generally does not matter for the current source voltage measurement approach. It also includes an equivalent circuit model of the object 110 ($L_4$, $R_4$) and corresponding coupling to each sense coil (512, 514, and 516) represented by coupling factors $k_{14}$, $k_{34}$, and $k_{24}$, respectively.

Figure 7C:
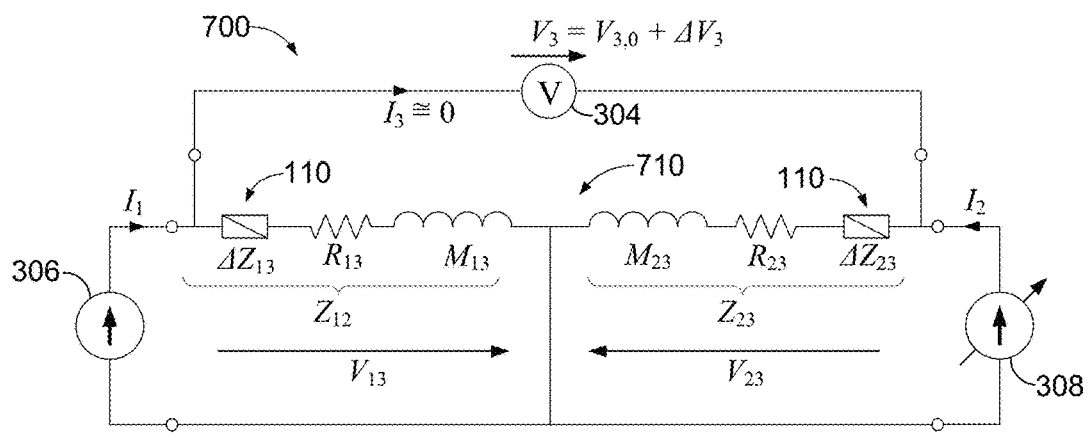
FIG. 7C shows a simplified 'T'-equivalent circuit of the equivalent circuit of FIG. 7B including the influence of the object model abstracted away.

FIG. 7C shows a simplified equivalent circuit of the circuit 700 to illustrate the voltage cancellation effect in output voltage $V_3$. This equivalent circuit includes a simplified 'T'-equivalent circuit (transformer) models reduced to the shunt branch (mutual) impedances $Z_{13}$ and $Z_{23}$, respectively, for each of the two transmission paths $I_1$ to $V_3$ and $I_2$ to $V_3$. Each shunt branch impedance $Z_{13}$ and $Z_{23}$ incudes a mutual inductance $M_{13}$ and $M_{23}$, an equivalent loss resistance $R_{12}$ and $R_{23}$ corresponding to the imaginary part of coupling factor $\underline{k}_{13}$ and $\underline{k}_{23}$, respectively. Each of the shunt branch impedances $Z_{13}$ and $Z_{23}$ also includes a mutual impedance change $\Delta Z_{13}$ and $\Delta Z_{23}$ representing the model of the object 110 abstracted away. FIG. 7C also indicates the two primary currents $I_1$ and $I_2$ and the resulting partial voltages $V_{13}$ and $V_{23}$ across shunt branch impedance $Z_{13}$ and $Z_{23}$, respectively. Using above definitions, the output voltage $V_3 = V_{3,0} + \Delta V_3$ may be expressed as $$V_3 = V_{3,0} + \Delta V_3 = (Z_{13} + \Delta Z_{13})I_1 + (Z_{23} + \Delta Z_{23})I_2, \quad (60)$$

using the definitions of the mutual impedances $$Z_{13} = j\omega_s \underline{k}_{13} \sqrt{L_1 L_3}, \quad (61)$$

$$Z_{23} = j\omega_s \underline{k}_{23} \sqrt{L_2 L_3}, \quad (62)$$

The changes in mutual impedance may be written in analogy e.g., to Equation (47)

$$\Delta Z_{13} = \alpha_{14} \alpha_{34} Z_4^*, \quad (63)$$

$$\Delta Z_{23} = \alpha_{24} \alpha_{34} Z_4^*, \quad (64)$$

where $Z_4^*$ denotes the conjugate complex impedance of the model of the object 110. The scalar transformation factors are obtained in analogy to Equations (48) and (49) as $$\alpha_{14} = \frac{\omega_s M_{14}}{|Z_4|}, \quad (65)$$

-continued $$\alpha_{34} = \frac{\omega_s M_{34}}{|Z_4|}, \quad (66)$$

$$\alpha_{24} = \frac{\omega_s M_{24}}{|Z_4|}, \quad (67)$$

$$\alpha_{34} = \frac{\omega_s M_{34}}{|Z_4|}. \quad (68)$$

Contemplating Equation (60) and following, it may be appreciated that there exists a current pair $I_1$ and $I_2$ providing virtually zero output voltage $V_{3,0} = V_{13,0} + V_{23,0} \cong 0$ in absence of the object 110. Provided that the second current source 308 can be precisely adjusted to the required value in terms of both amplitude and phase, perfect voltage cancellation may be achieved. Phase adjustment may be needed if materials 310 unequally affect the coupling factors $\underline{k}_{13}$ and $\underline{k}_{23}$ in terms of the loss angle so that $\arg\{\underline{k}_{13}\} \approx \arg\{\underline{k}_{23}\}$ results.

The voltage cancellation effect may generally not apply to the change in voltage as produced by the object 110, thus there may be a net output voltage $\Delta V_3 = \Delta V_{13} + \Delta V_{23} \neq 0$ in presence of the object 110. However, as for the flux balanced mutual impedance sensing technique of FIGS. 6A and 6C, there may exist an area (blind spot) for object positions where the net voltage response is below a threshold or even virtually zero, which may be formally expressed as $$\Delta V_3 = \Delta Z_{13} I_1 + \Delta Z_{23} I_2 \cong 0 \quad (69)$$

For certain objects (e.g., a coin) and for square-shaped sense coils 512, 514, and 516, the blind spot may be found along a diagonal line of sense coil 514 corresponding with the symmetry line (not shown in FIG. 7a) of the sense coil arrangement 710. Except of the blind spot, the sense coil arrangement 710 of FIG. 7A may provide sensitivity above the entire area spanned by the three sense coils 512, 514, and 516 and even outside this area to some extent.

In theory, the circuit 700 may provide an infinite sensitivity with respect to the fractional change $\Delta V_3/|V_{3,0}|$. In practice however, sensitivity may be limited by electrical and mechanical instability and noise.

Contemplating Equation (60) and following, it may be appreciated that the circuit 700 potentially allows for angle-true impedance measurement for purposes as previously discussed in connection with FIG. 3D, if the phase angle of the currents $I_1$ and $I_2$ are similar ($\arg\{I_1\} \cong \arg\{I_2\}$). This condition may be satisfied if materials 310 similarly affect the coupling factors $\underline{k}_{13}$ and $\underline{k}_{23}$ in terms of loss angle so that $\arg\{\underline{k}_{13}\} \cong \arg\{\underline{k}_{23}\}$ results. Assuming $\arg\{I_1\} \cong \arg\{I_2\}$, either the ratio $V_3/I_1$ or the ratio $V_3/I_2$ may be used for determining the angle $\arg\{Z_3\}$ of the object's 110 impedance $Z_3$. Alternatively, the voltage $V_3$ may be related to the average of the currents $I_1$ and $I_2$.

In some implementations of an object detection circuit 100, sense coils 512, 514, and 516 may correspond e.g., to sense elements 106a, 106b, 106c, respectively, of the sense element array 106 with reference to FIG. 2A. In some implementations, sense coil arrangement 710 are temporarily (e.g., sequentially) configured for flux compensated mutual impedance sensing by three neighboring sense elements (e.g., sense elements 106a, 106b, 106c) using a multiplexer circuitry as further discussed with reference to FIG. 11. A first sense coil arrangement 710 may comprise sense coil 106a as the secondary sense coil 514, sense coil 106b as the first primary sense coil 512, and the sense coil 106c as the second primary sense coils 516. A second sense coil arrangement 710 may comprise sense coil 106b as the secondary sense coil 514, sense coil 106c as the first primary sense coil 512, and the sense coil 106d as the second primary sense coils 516, etc. Sense coil triples temporarily configured in this way may be overlapping. Overlapping sense coil arrangements 710 may reduce or eliminate blind spots as previously discussed in connection with FIG. 7C, if the blind spots of the plurality of the sense coil arrangements 710 are non-overlapping (disjoint). It may be also appreciated that in such implementation, the number of sense coil arrangements 710 that can be potentially configured is larger than the number N of sense elements of the array 106. Any combination of three sense elements of the plurality of sense elements 106a, 106b, . . . , 106n may be potentially used in a sense coil arrangement 710.

FIGS. 7D to 7H are cut views illustrating various exemplary implementations of planar sense coil arrangements 710 as they may be used for flux balanced mutual impedance sensing.

Figure 7D:
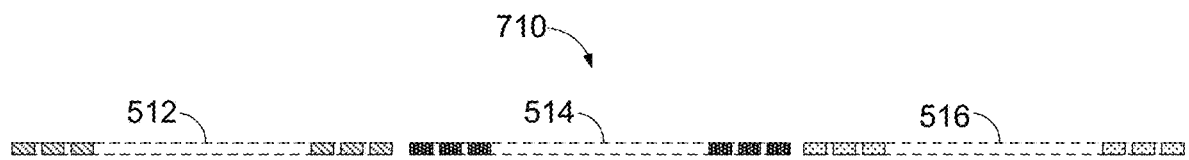
FIGS. 7D to 7H are schematic cut views illustrating different example implementations of the triple sense coil arrangement of FIG. 7A using planar sense coils.

FIG. 7D illustrates an implementation of a sense coil arrangement 710 where sense coil 512, 514, and 516 are coplanar and adjacent. This sense coil arrangement 710 may apply to an implementation using a plurality of substantially equal sense elements 106a, 106b, . . . , 106n each including a single planar sense coil arranged in an array 106 with reference to FIG. 2A. Triples of neighboring sense coils (e.g., sense coil 106a, 106b, 106c) are configured in accordance with the circuit 700 of FIG. 7A and analogously to the description of FIG. 5D.

Figure 7E:
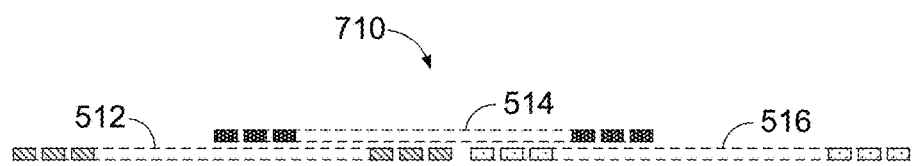
Figure 7F:
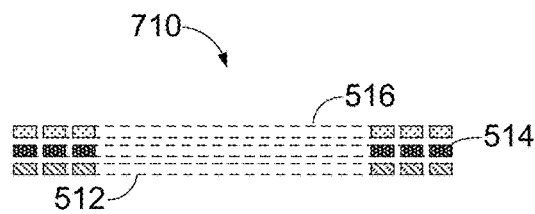
Figure 7G:
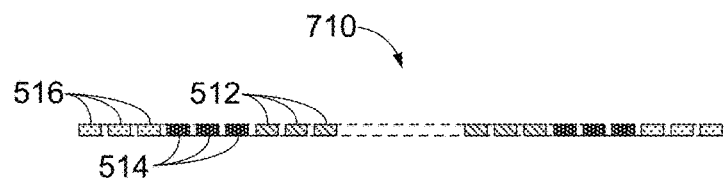
Figure 7H:
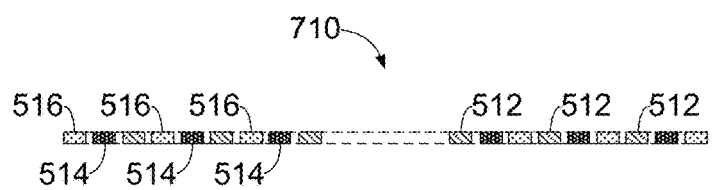

FIG. 7E illustrates another exemplary implementation in analogy to FIG. 5E where sense coils 512, 514, and 516 are partially overlapping. This sense coil arrangement 710 may apply to an implementation using a plurality of substantially equal sense elements 106a, 106b, . . . , 106n, each including a single planar sense coil arranged in an array 106 having a first and a second plane and where the sense coils in the first plane are offset relative to the sense coils in the second plane by half of the width of a sense coil. Triples of neighboring sense coils (e.g., sense coil 106a, 106b, 106c) may be temporarily (e.g., sequentially) configured analogously to the description of FIG. 5E. Sense coil triples that are temporarily (e.g., sequentially) configured may be overlapping. It may be also appreciated that in such implementation or operation, the number of triple sense coil arrangements 510 that can be potentially configured is larger than the number N of sense elements of the array 106.

FIG. 7F illustrates a further implementation of a sense coil arrangement 710 in analogy to FIG. 5F where sense coils 512, 514, and 516 are fully overlapping (on top of each other). This sense coil arrangement 710 may apply to an implementation using a plurality of sense elements 106a, 106b, . . . , 106n arranged in an array 106. Each of the plurality sense elements 106a, 106b, . . . , 106n includes a triple of planar sense coils stacked on top of each other. This sense coil arrangement 710 may be also considered as a trifilar winding structure with a first winding disposed in a first plane and a second and third winding disposed in a second and third plane, respectively.

FIG. 7G illustrates yet another implementation of a sense coil arrangement 710 in analogy to FIG. 5G where sense coil 512, 514, and 516 are coplanar and arranged inside of each other. This sense coil arrangement 710 may apply to an implementation using a plurality of sense elements 106a, 106b, . . . , 106n arranged in an array 106. Each sense element includes a triple of coplanar sense coils arranged inside each other.

FIG. 7H illustrates yet a further implementation in analogy to FIG. 5H where sense coil 512, 514, and 516 are coplanar and interleaved. This sense coil arrangement 710 may apply to an implementation using a plurality of sense elements 106a, 106b, . . . , 106n arranged in an array 106. Each sense element includes a triple of interleaved coplanar sense coils. This sense coil arrangement 710 may be also considered as a trifilar winding structure with a first, a second, and a third winding in the same plane.

While the implementations of FIGS. 7D and 7E may provide a substantial net response $\Delta V_3$ in presence of the object 110, the implementations of FIGS. 7E to 7H may not. This may be particularly true for an implementation based on FIG. 7F with a relatively small vertical spacing between the three sense coils 512, 514, and 516. In such implementation, the object 110 affects the mutual impedances $Z_{13}$ and $Z_{23}$ almost equally ($\Delta Z_{13} \cong \Delta Z_{23}$). Since $Z_{13} \cong Z_{23}$ and thus $I_1 \cong -I_2$, a very low net response $\Delta V_3$ may result in presence of the object 110 as evident from Equation (60). This may be true for any position of the object 110.

In some implementations of the object detection circuit 100 of FIG. 1 based on the flux balanced mutual impedance sensing technique illustrated in FIG. 7A, the object detection circuit 100 is configured to calibrate the mutual impedance measurement for purposes as previously described in connection with FIGS. 3A to 3D. However, implementation of such calibration may require higher circuit complexity and cost in certain aspects, e.g., compared to aspects of capacitively compensated self-impedance sensing using sense frequency tuning as discussed in connection with FIG. 4A.

Figure 8A:
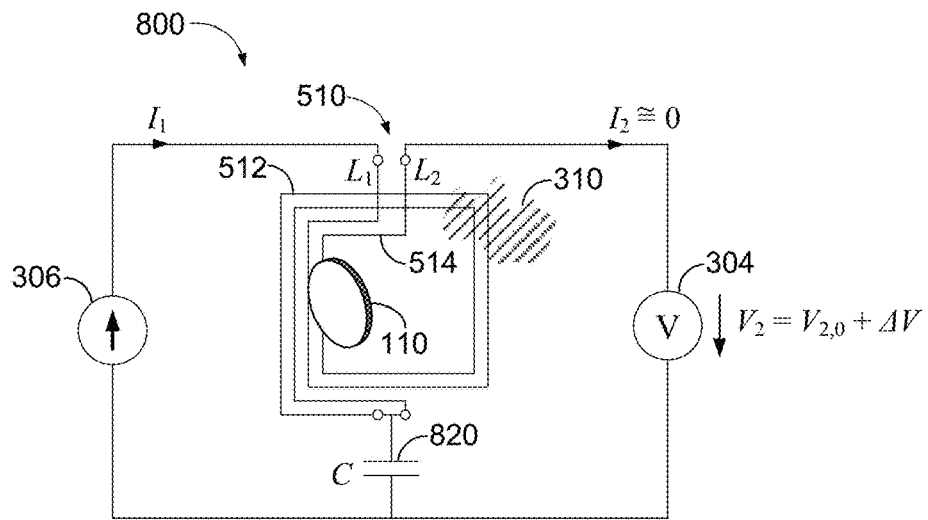
FIG. 8A is a schematic view illustrating an example of a double sense coil arrangement, an object, and an associated technique based on capacitively compensated mutual impedance sensing approach that may be used in conjunction with the object detection circuit of FIG. 1.

A technique that combines several advantages as previously discussed with reference to FIGS. 4A and 5A and that avoids certain issues related to blind spots as previously discussed with reference to FIGS. 6A and 6C is illustrated by the circuit 800 of FIG. 8A. This technique is referred to as capacitively compensated mutual impedance sensing. The circuit 800 is also based on the current source voltage measurement approach. A sense coil arrangement 510 is used for sensing the object 110. The sense coil arrangement 510 includes a primary sense coil 512 with inductance $L_1$ and a secondary sense coil 514 with inductance $L_2$, each having a first and second terminal. The circuit 800 further includes a capacitor 820 (compensation or tuning capacitor) with capacitance C. The capacitor 820 has a first and second terminal. The first terminal of the capacitor 820 is electrically connected to the second terminals of each of the sense coils 512 and 514. Further, the circuit 800 includes an alternating current source 306 that is tunable in frequency and that drives a current $I_1$ at sense frequency $f_s$ into the primary sense coil 512. The current source 306 is electrically connected to the first terminal of the primary sense coil 512 and to the second terminal of the capacitor 820 (in some implementations the second terminal of the capacitor 820 is electrically connected to a reference ground potential). The circuit 800 also includes a voltage measurement circuit 304 configured to measure an output voltage $V_2 = V_{2,0} + \Delta V_2$. The voltage measurement circuit 304 is electrically connected to the first terminal of the secondary sense coil 514 and to the second terminal of the capacitor 820. The voltage measurement circuit 304 may be frequency selective (narrowband) tuned to the sense frequency $f_s$. FIG. 8A also indicates presence of materials 310 by the shaded area.

Figure 8B:
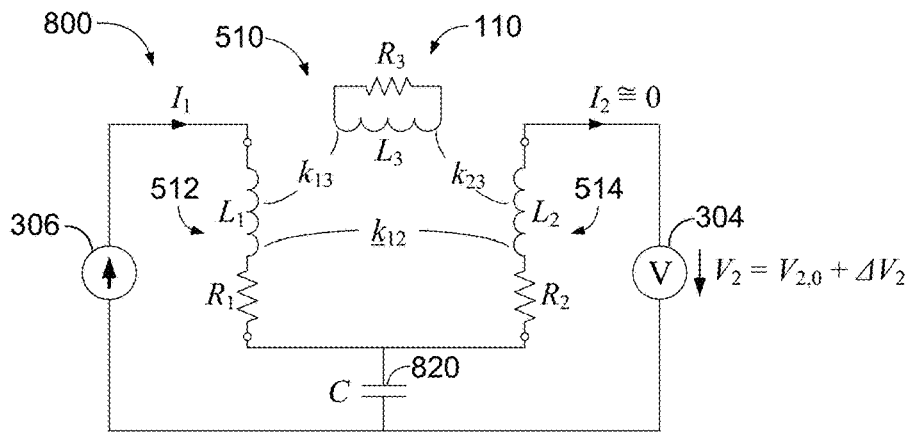
FIG. 8B shows an equivalent circuit of the circuit of FIG. 8A including a circuit model of the object.

An equivalent circuit of the circuit 800 of FIG. 8A including a circuit model of the object 110 is shown in FIG. 8B. In this equivalent circuit, the primary sense coil 512 and secondary sense coil 514 are each represented by an equivalent inductance $L_1$ and $L_2$, respectively, and by an equivalent loss resistance $R_1$ and $R_2$. Though not shown in FIG. 8B, each of these elements may be a function of temperature $\vartheta$.

The equivalent loss resistances $R_1$ and $R_2$ may each include a first resistance component due to losses in the sense coil's conductive structure (e.g., copper wires or PCB traces) and a second resistance component due to loss effects in materials 310 as previously discussed in connection with FIG. 3B. Magnetic coupling between sense coils 512 and 514 is represented by a complex coupling factor $\underline{k}_{12}$, which may be also a function of temperature $\vartheta$ as previously explained in connection with FIGS. 5B and 5C. As also previously discussed, the equivalent inductances and resistance $L_1$, $L_2$, $R_1$ and $R_2$, respectively, as well as the coupling factor $\underline{k}_{12}$ may include a change due to the presence of materials 310. Since the electromagnetic properties of materials 310 may generally be temperature dependent, some temperature dependence may be expected for the coupling factor $\underline{k}_{12}$. The change in $\underline{k}_{12}$ due to materials 310 may include a real and imaginary component due to reactive and resistive (loss) effects, respectively, in materials 310 but also due to mutual loss effects in the sense coils 512 and 514 as previously discussed. The real component relates to the mutual inductance $M_{12}$ defined by Equation (29) while the imaginary component relates to an equivalent mutual resistance $R_{12}$ defined by Equation (31). FIG. 8B shows each of the primary sense coil 512 and the secondary sense coil 514 magnetically coupled with coupling factor $k_{13}$ and $k_{23}$, respectively, to the object 110 represented by an LR-Model ($L_3$, $R_3$) as previously discussed e.g., with reference to FIG. 3B. The compensation capacitor appears with its equivalent capacitance C that may be also a function of temperature $\vartheta$ depending on the type of capacitor as previously discussed in connection with FIG. 4A.

Figure 8C:
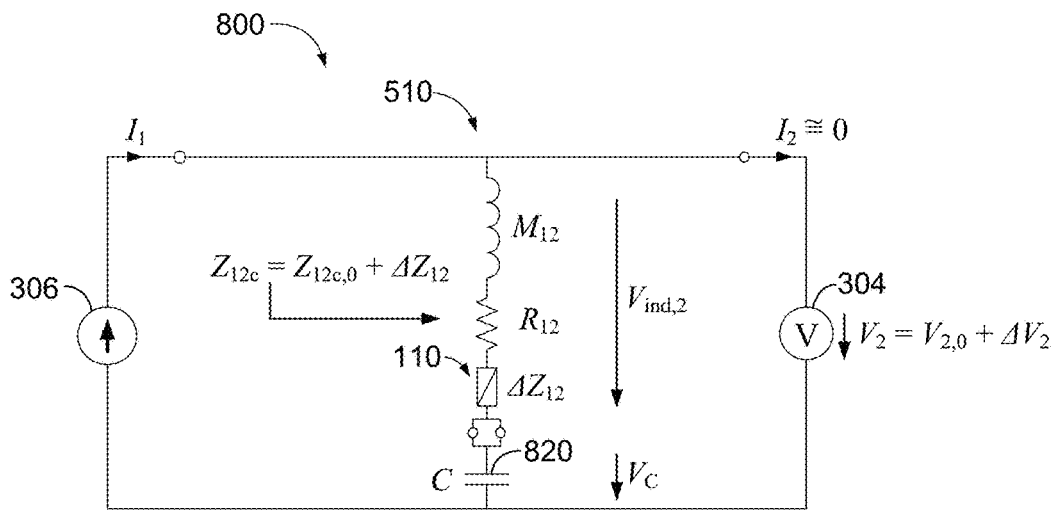
FIG. 8C shows a simplified 'T'-equivalent circuit of the equivalent circuit of FIG. 8B including the influence of the object model abstracted away.

FIG. 8C shows a simplified equivalent circuit of the circuit 800 of FIG. 8A. The sense coil arrangement 512 is represented by a simplified 'T' equivalent circuit model neglecting first and second series branch impedance as previously discussed with reference to FIG. 6B. This simplified equivalent circuit solely comprises the shunt branch impedance that is now referred to as the capacitively compensated mutual impedance $Z_{12c}$. It includes the mutual inductance $M_{12}$, the equivalent mutual resistance $R_{12}$, the capacitance C that appears now in series to mutual inductance $M_{12}$, and the equivalent mutual impedance change $\Delta Z_{12}$ that represents the object 110 abstracted away.

Transimpedance as measured with the current source voltage measurement approach is ideally only determined by the compensated mutual impedance $Z_{12,c}$ and may be expressed as $$Z_{12c} = Z_{12c,0} + \Delta Z_{12} = R_{12} + j\omega_s M_{12} + \frac{1}{j\omega_s C} + \Delta Z_{12} = \frac{V_{2,0} + \Delta V_2}{I_1}. \quad (70)$$

Based on equation (70), it may be appreciated that there exists an angular sense frequency $\omega_s$ where the capacitor 820 perfectly compensates for the mutual inductance $M_{12}$ (or the mutual reactance $\omega_s M_{12}$) so that $$Z_{12c,0} = R_{12} \quad (71)$$

results. This condition may also be considered as some sort of resonance and may be achieved by tuning the frequency $f_s$ of the current source so that the magnitude of the mutual impedance $Z_{12c}$ in absence of the object 110 denoted by $|Z_{12c,0}|$ becomes a minimum.

Assuming perfect compensation and using Equations (46) (47) and (52), the detection sensitivity of capacitively compensated mutual impedance sensing as defined by the fractional mutual impedance change may be expressed as $$\frac{\Delta Z_{12}}{|Z_{12c,0}|} = \frac{\alpha_{13}\alpha_{23}Z_3^*}{|Z_{12c,0}|}. \quad (72)$$

Defining a Q-factor for the mutual impedance of the sense coil arrangement 510

$$Q_{12} = \frac{\omega_s M_{12}}{R_{12}}, \quad (73)$$

Equation (72) may be expressed in terms of $Q_{12}$, coupling factors $k_{13}$, $k_{23}$, $|\underline{k}_{12}|$ and the object's 110 Q-factor $Q_3$ analogously to Equation (56) as follows:

$$\frac{\Delta Z_{12}}{|Z_{12c,0}|} \cong \frac{k_{13}k_{23}}{|\underline{k}_{12}|} \frac{Q_{12}Q_3}{1+Q_3^2}(1-jQ_3). \quad (74)$$

For non-ferromagnetic objects 110 with high enough Q-factor $Q_3 \gg 1$, equation (74) may be rewritten as $$\frac{\Delta Z_{12}}{|Z_{12c,0}|} \cong \frac{k_{13}k_{23}}{|\underline{k}_{12}|} Q_{12}\left(\frac{1}{Q_3} - j\right) \quad (75)$$

showing that the fractional change $|\Delta Z_{12}|/|Z_{12c,0}|$ that may be achievable with the circuit 800 of FIG. 8A using mutual reactance compensation is $Q_{12}$-times higher than the fractional change $|\Delta Z_{12}|/|Z_{12,0}|$ obtained with the circuit 500 of FIG. 5A. Therefore, in some aspects of an object detection circuit 100, mutual reactance compensation as illustrated by circuit 800 of FIG. 8A may be considered an improvement over the inductive sensing technique as illustrated by circuit 500 of FIG. 5A.

For the special case of a tightly coupled sense coil arrangement 510 with $|\underline{k}_{12}| \cong 1$ (e.g., using two identical (or substantially similar) sense coils 512 and 514 on top of each other and with zero displacement as shown by FIG. 5F, it may be a consequence that both sense coils 512 and 514 provide about equal coupling to the object 110 ($k_{13} \cong k_{23}$). In this special case, equation (75) may be rewritten as $$\frac{\Delta Z_{12}}{|Z_{12c,0}|} \cong k_{13}^2 Q_{12}\left(\frac{1}{Q_3} - j\right) \quad (76)$$

Further, using Equation (29) and the assumptions of $|\underline{k}_{12}| \cong 1$ and two identical sense coils 512 and 514 ($L_1 = L_2$), it follows that $$M_{12} \cong L_1 = L_2 \quad (77)$$

The Q-factor of the mutual impedance (Equation (73)) may then be also expressed as $$Q_{12} \cong \frac{\omega_s L_1}{R_{12}}. \quad (78)$$

Moreover, assuming each of the sense coils 512 and 514 of the circuit 800 of FIG. 8A identical (or substantially similar) to the sense coil 302 of the circuit 400 of FIG. 4A, the same coupling $k_{13}$ to the object 110, the same object 110, and same material 310 for both circuits 800 and 400, a higher Q-factor $Q_{12}$ may be expected from the circuit 800 relative to the Q-factor $Q_1$ of the circuit 400. Note that $R_{12}$ does not include the resistances of the sense coils' 512 and 514 windings so that $R_{12} < R_1$ may be expected. However, apart from a resistance contribution due to losses in materials 310, which may be inherent likewise to $R_{12}$ and $R_1$, the equivalent mutual resistance $R_{12}$ may additionally include a resistance component from mutual loss effects e.g., an eddy current loss effect in the secondary sense coil 514 produced by the magnetic field of the primary sense coil 512. This loss resistance component may be diminished by keeping a small vertical distance between the two sense coils 512 and 514 (e.g., in sense coil arrangement 510 of FIG. 5F) such that $|k_{12}| \cong <1$ remains valid. As such, in an aspect, a small vertical distance between the two sense coils 512 and 514 is provided to diminish the loss resistance. In reality, there may exist an optimum spacing for the sense coils 512 and 514 maximizing $Q_{12}$. A gain in Q-factor by a factor of four was found in a non-optimized experimental set-up integrated into a wireless power transfer structure 236 using identical sense coils with equal length lead lines for all sense coils 512, 514, and 302.

Based on Equation (22) and (23) relating the fractional change of an impedance to temperature sensitivity, a potentially lower temperature sensitivity may be expected from the capacitively compensated mutual impedance sensing if compared to compensated impedance sensing (e.g., circuit 400 of FIG. 4A).

In some implementations of the object detection circuit 100 of FIG. 1 based on capacitively compensated mutual impedance sensing, mutual impedance measurement may be subjected to measurement errors. Analogously to reactance compensation e.g., in the circuit 400 of FIG. A, mutual reactance compensation may provide a mechanism for accurate calibration of the mutual impedance measurement e.g., with respect to the angle $\arg\{Z_{12c}\}$ for purposes as previously discussed in connection with the circuit 300 of FIG. 3A. In some exemplary implementations of an object detection circuit 100, the frequency $f_s$ of the current source 306 is tuned such that the magnitude impedance $|Z_{12c,0}|$ becomes substantially a minimum in absence of the object 110, meaning that $|Z_{12c,0}| \cong R_{12}$. Knowing that in absence of the object 110, the minimum $|Z_{12c,0}|$ ideally corresponds to a zero angle ($\arg\{Z_{12c,0}\}=0$), the object detection circuit 100 may correct as part of a calibration procedure the actually measured mutual impedance by rotating the impedance plane so that the $\text{Im}\{Z_{12c,0}\}$ vanishes.

As with compensation capacitor 420 in the circuit 400 of FIG. 4A, compensation capacitor 820 together with current source 306 and a voltage measurement circuit 304 each presenting a high input impedance at sense frequency $f_s$ and a low impedance at low frequencies may form a high pass filter to attenuate low frequency signal components e.g., at the wireless power transfer frequency $f_{wpt}$ as described in more detail in connection with FIG. 12. This may result in relaxed requirements for the voltage measurement circuit 304 and the current source 306 with respect to the dynamic range, overvoltage capability, etc. as previously discussed in connection with the circuit 400 of FIG. 4A.

Multiplexed Implementations of Mutual Impedance Sensing

Figure 9:
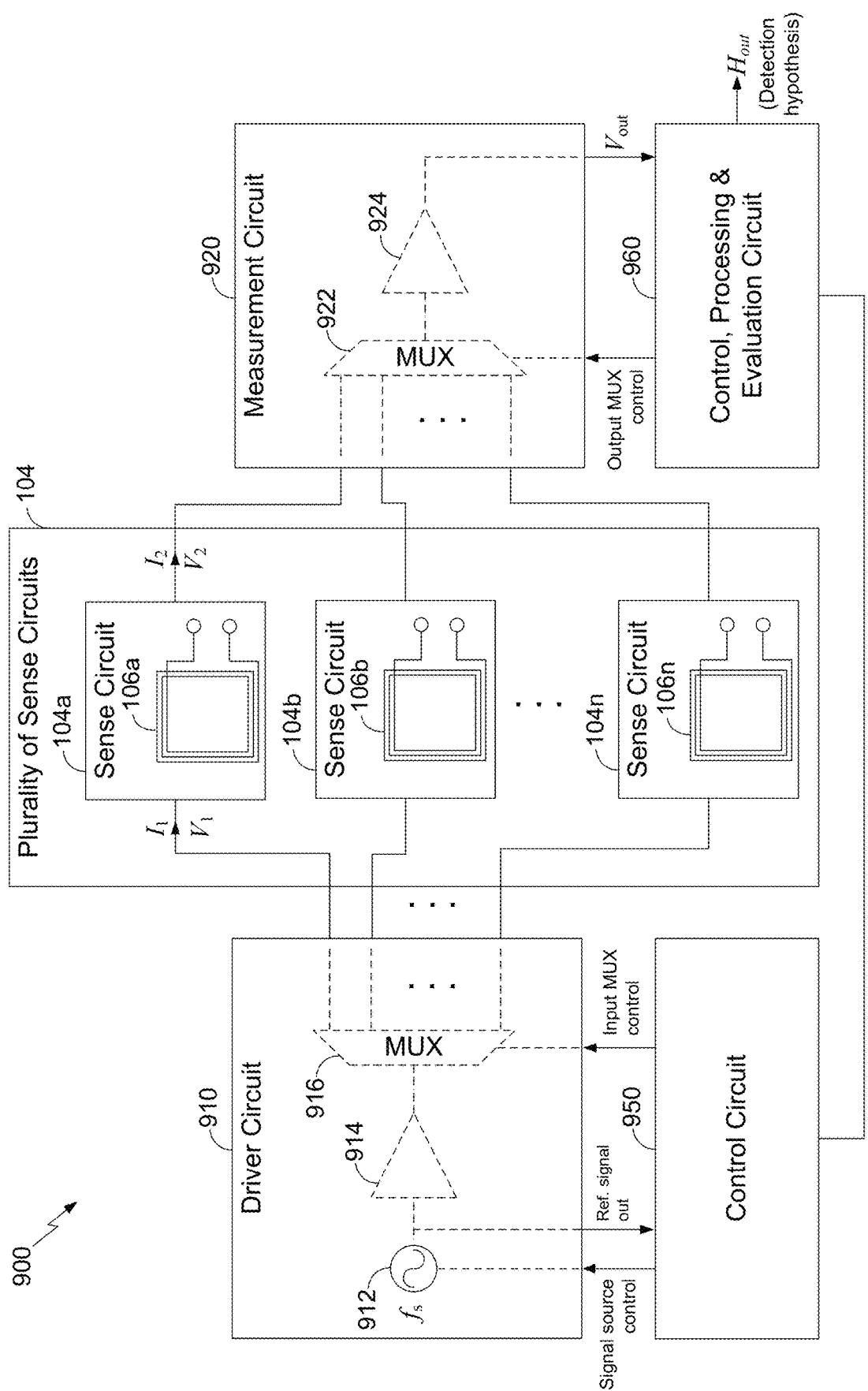
FIG. 9 is a generic block diagram illustrating example implementations and operations of the object detection circuit of FIG. 1 using a plurality of sense circuits applicable to both impedance and mutual impedance sensing techniques.

FIG. 9 is a block diagram of a circuit 900 illustrating example implementations or operations of an object detection circuit 100. The block diagram may apply to any of the impedance and transimpedance (e.g., mutual impedance) sensing techniques and variants thereof as described with reference to FIGS. 3A to 8A as well as to various impedance or transimpedance measurement approaches (e.g., the current source voltage measurement approach as previously described with reference to FIGS. 3A and 5A). The circuit 900 includes a driver circuit 910, a control circuit 950 associated with the driver circuit 910, a plurality of sense circuits 104, a measurement circuit 920, and a control, processing & evaluation circuit 960 associated with the measurement circuit 920.

The plurality of sense circuits 104 illustrated by the sense circuits 104a, 104b, some dots and sense circuit 104n may include any number N (e.g., N=64) of sense circuits. The plurality of sense circuits 104 is herein also referred to as the plurality of sense circuits 104a, 104b, . . . , 104n. Each of the plurality of sense circuits 104a, 104b, . . . , 104n includes a respective sense element of a plurality of sense elements 106a, 106b, . . . , 106n as previously described with reference to FIG. 1. Each sense element may include one or more sense coils (e.g., a sense coil arrangement 510 as it may be required by some of the mutual impedance sensing techniques as previously described with reference to FIGS. 5A to 8A). The plurality of sense elements 106a, 106b, . . . , 106n may be arranged in an array (e.g., array 106 as previously described with reference to FIGS. 1 and 2A). In some implementations of the object detection circuit 100 of FIG. 1 using capacitive compensation of an impedance or a mutual impedance as described with reference to FIGS. 4A and 8A, each of the plurality of the sense circuits 104a, 104b, . . . , 104n may include a compensation (tuning) capacitor (e.g., capacitor 420 or 820 as shown in FIG. 4A or 8A, respectively). Each of the plurality of sense circuits 104a, 104b, . . . , 104n may be tuned substantially to a nominal sense frequency. In some implementations, there is a nominal sense frequency common to each of the plurality of sense circuits 104a, 104b, . . . , 104n. In other implementations, sense circuits of the plurality of sense circuits 104a, 104b, . . . , 104n are intentionally or unintentionally tuned to different nominal sense frequencies.

The driver circuit 910 (e.g., a portion of the current source 306 with reference to FIG. 3A) is electrically connected to the plurality of sense circuits 104a, 104b, . . . , 104n. In some implementations, the driver circuit 910 is configured to operate as a current source (e.g., current source 306 as described in connection with FIG. 3A) and selectively (e.g., sequentially) apply a sense current signal $I_1$ (as indicated in FIG. 9) at an operating (sense) frequency $f_s$ to each of the plurality of sense circuits 104a, 104b, . . . , 104n. In other implementations, the driver circuit 910 is configured to operate as a voltage source e.g., as described in connection with FIG. 3A and selectively (e.g., sequentially) apply a sense voltage signal $V_1$ (as indicated in FIG. 9) at an operating (sense) frequency $f_s$ to each of the plurality of sense circuits 104a, 104b, . . . , 104n. In yet other implementations, the driver circuit 910 is configured to operate as a source that may be characterized neither by a current source nor a voltage source. For purposes of measuring an impedance or a mutual impedance, the driver circuit 910 may generate a sinusoidal sense signal with a defined frequency, amplitude and phase. The following descriptions of the circuit 900 of FIG. 9 assume a sinusoidal sense signal. However, it should be appreciated that other sense signal waveforms may be used in certain implementations as previously discussed in connection with FIG. 3A.

The driver circuit 910 may be configured to generate and apply more than one sense signal (e.g., sense current signal $I_1$) at a time as it may be required in some implementations or operations of an object detection circuit 100. In some implementations or operations, the concurrently applied sense signals may generally differ in frequency and amplitude. A driver circuit 910 capable of concurrently generating and applying a plurality of sense signals with different (distinct) sense frequencies $f_s$ may be used in some implementations or operations of the object detection circuit 100 e.g., to expedite an impedance measurement in each of the plurality of sense circuits 104a, 104b, . . . , 104n and/or to expedite a transimpedance measurement in each of a plurality of sense circuit pairs e.g., in an implementation where each sense circuit includes a single sense coil (e.g., sense coil 512 or 514) as discussed with reference to FIG. 5D.

Figure 11:
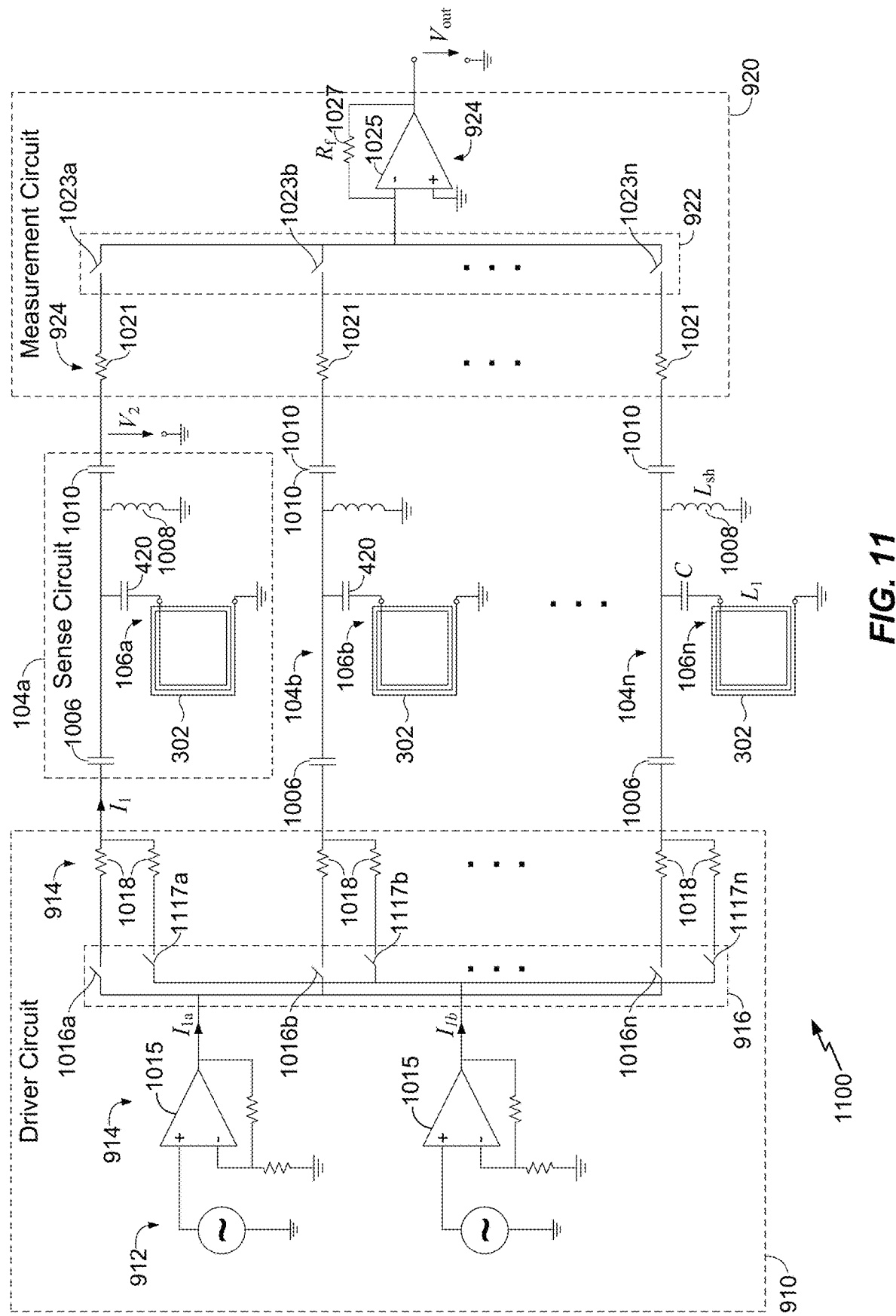
FIG. 11 is a circuit diagram illustrating another example implementation of a portion of the object detection circuit of FIG. 1 using a plurality of sense circuits applicable to both an impedance sensing and a mutual impedance sensing approach.

A driver circuit 910 configured to provide two outputs (e.g., current source outputs) each delivering a sinusoidal signal (e.g., sense current signal $I_1$) with the same frequency $f_s$ but generally different amplitude and phase may be used to accomplish flux balanced mutual impedance sensing as described with reference to FIG. 7A. An example implementation of a driver circuit 910 configured to provide two current source outputs delivering respective current signals $I_{1a}$ and $I_{1b}$ is illustrated by FIG. 11.

A control circuit 950 electrically connected to the driver circuit 910 is shown for illustrative purposes to indicate control of the driver circuit 910.

The measurement circuit 920 is electrically connected to each of the plurality of sense circuits 104a, 104b, . . . , 104n. In some implementations, the measurement circuit 920 is configured to selectively (e.g., sequentially) measure an electrical voltage $V_2$ (as indicated in FIG. 9) in each of the plurality of sense circuits 104a, 104b, . . . , 104n and to provide a measurement output $V_{out}$ proportional to the electrical voltage $V_2$. In some implementations, the measurement output $V_{out}$ is proportional to an electrical voltage $V_2$ in one of the plurality of sense circuits 104a, 104b, . . . , 104n in response to the at least one sense current signal $I_1$ being applied by the driver circuit 910 to the respective at least one sense circuit of the plurality of sense circuits 104a, 104b, . . . , 104n. In other implementations, the measurement circuit 920 is configured to selectively (e.g., sequentially) measure an electrical current $I_2$ (as indicated in FIG. 9) in each of the plurality of sense circuits 104a, 104b, . . . , 104n and to provide a measurement output $V_{out}$ proportional to the electrical current $I_2$. In some implementations, the measurement output $V_{out}$ is proportional to an electrical current $I_2$ in one of the plurality of sense circuits 104a, 104b, . . . , 104n in response to the at least one sense voltage signal $V_1$ being applied by the driver circuit 910 to the respective at least one sense circuit of the plurality of sense circuits 104a, 104b, . . . , 104n.

In some implementations of an object detection circuit 100, the measurement circuit 920 is an analog front-end portion of a more complex measurement circuit that also encompasses functions included in the control, processing & evaluation circuit 960. In certain implementations, the measurement circuit 920 may include a multiplexer (e.g., multiplexer 922) and an amplifier (e.g., amplifier 924) as illustrated in FIG. 9 by dashed lines.

In certain implementations or operations, the measurement circuit 920 is configured to measure more than one voltage $V_2$ or current $I_2$ at a time and to provide more than one respective measurement output $V_{out}$. Concurrent multiple voltage or current measurement may be required in some implementations or operations of the object detection circuit 100 e.g., to expedite an impedance and/or a transimpedance and/or a flux compensated mutual impedance measurement in each of the plurality of sense circuits 104a, 104b, . . . , 104n and/or in pairs and/or even in triples of sense circuits, respectively, of the plurality of sense circuits 104a, 104b, . . . , 104n as previously discussed in the context of the driver circuit 910. In certain implementations or operations of an object detection circuit 100, measurement of a plurality of voltages $V_2$ or currents $I_2$ is performed concurrently and frequency selectively at the respective frequency $f_s$ of each of the plurality of sense signals $I_1$ or $V_1$ that is selectively applied to the plurality of sense circuits 104a, 104b, . . . , 104n.

A control, processing & evaluation circuit 960 electrically connected to the measurement circuit 920 is shown for illustrative purposes to indicate control of the measurement circuit 920 and the further processing.

The following descriptions on FIG. 9 assume example implementations based on the current source voltage measurement approach as described with reference to FIG. 3A. However, this should not exclude other impedance or transimpedance measurement approaches (e.g., voltage source current measurement approach) that may apply.

As described above, the driver circuit 910 is configured to operate as at least one current source (e.g., characterized by a quasi-ideal current source as previously defined in connection with FIG. 3A) and selectively (e.g., sequentially) apply at least one sense current signal $I_1$ with a defined amplitude and phase at an operating frequency (sense frequency) $f_s$ to each of the plurality of sense circuits 104a, 104b, . . . , 104n. In one operational or implementational example, only one sense circuit of the plurality of sense circuits 104a, 104b, . . . , 104n is driven at a time. To accomplish selective driving of each of the plurality of sense circuits 104a, 104b, . . . , 104n, the driver circuit 910 may include components such as at least one signal source 912 (e.g., generating the sinusoidal sense signal with a defined frequency $f_s$, amplitude and phase), at least one driver amplifier circuit 914, and at least one multiplexer circuit 916 also referred to as the input multiplexer. The at least one driver amplifier circuit 914 is configured to provide a current source output characterized e.g., as a quasi-ideal current source suitable for selectively driving each of the plurality of sense circuits 104a, 104b, . . . , 104n based on a signal received from the respective signal source 912. The at least one multiplexer circuit 916 may be electrically connected between the output of the respective driver amplifier circuit 914 and the plurality of sense circuits 104a, 104b, . . . , 104n and is configured to selectively connect each of the plurality of sense circuits 104a, 104b, . . . , 104n to the output of the respective driver amplifier circuit 914. The driver circuit 910 may also return at least one reference signal to the control circuit 950. This at least one reference signal may be representative for the respective sense current signal $I_1$ in terms of frequency, amplitude, and phase. This at least one reference signal may be used in the control, processing & evaluation circuit 960 e.g., for computing at least one ratio $V_{out}/I_1$ (complex value) that may relate to an impedance or a transimpedance (e.g., a mutual impedance).

The control circuit 950 is configured to apply one or more control signals to the driver circuit (e.g., to control the at least one multiplexer circuit 916) to cause selective connection of the at least one driver amplifier circuit 914 to each of the plurality of sense circuits 104a, 104b, . . . , 104n and to control parameters (e.g., frequency, amplitude, and phase) of the at least one signal source 912. In certain implementations, the control circuit 950 is also configured to receive the at least one reference signal representative for the respective sense current signal $I_1$ from the driver circuit 910. FIG. 9 shows the control circuit 950 electrically linked with the control, processing & evaluation circuit 960. This electrical link will be required in some implementations to exchange information between the two circuits (e.g., to pass the at least one reference signal to the control, processing & evaluation circuit 960).

As described above, the measurement circuit 920 is configured to selectively (e.g., sequentially) measure at least one electrical voltage $V_2$ in each of the plurality of sense circuits 104a, 104b, . . . , 104n and to provide at least one measurement output $V_{out}$ proportional to the respective electrical voltage $V_2$. In one operational or implementational example, only one electrical voltage $V_2$ is measured at a time. The at least one input of the measurement circuit 920 may be characterized by a quasi-ideal measurement circuit as defined with reference to FIG. 3A. To accomplish selective voltage measurement in each of the plurality of sense circuits 104a, 104b, . . . , 104n, the measurement circuit 920 may include components such as at least one multiplexer circuit 922 also referred to as the output multiplexer and at least one measurement amplifier circuit 924. The at least one measurement amplifier circuit 924 may be configured to provide a sufficiently high input impedance as needed for a quasi-ideal voltage measurement e.g., as defined with reference to FIG. 3A and low noise in its measurement output $V_{out}$. The at least one multiplexer circuit 922 may be electrically connected between the input of the respective measurement amplifier circuit 924 and the plurality of sense circuits 104a, 104b, . . . , 104n and is configured to selectively connect each of the plurality of sense circuits 104a, 104b, . . . , 104n to the input of the respective measurement amplifier circuit 922.

The control, processing & evaluation circuit 960 is configured to apply one or more control signals to the measurement circuit 920 (e.g., to control the at least one multiplexer circuit 922) to cause selective connection of the at least one measurement amplifier circuit 924 to each of the plurality of sense circuits 104a, 104b, . . . , 104n. Further, it is configured to provide further signal processing and evaluation of the acquired measurement data. The control, processing & evaluation circuit 960 may be configured to provide analog-to-digital signal conversion, frequency selective filtering, synchronous detection, combining outputs, summation of outputs, averaging of outputs, scaling of outputs, correction of outputs, evaluation of sequences (time-series) and/or patterns of outputs indicative of an impedance and/or transimpedance (e.g., mutual impedance), etc. and eventually to decide whether an object (e.g., object 110 of FIG. 3A) is proximate to at least one sense element of the plurality of sense elements 106a, 106b, . . . , 106n based on a change in an impedance or transimpedance (e.g., mutual impedance) and to output at least a detection hypothesis $H_{out}$ as indicated in FIG. 9.

The detection hypothesis $H_{out}$ may be indicative for presence or absence of an object (e.g., object 110) and may be used by the wireless power transfer system 200 with reference to FIG. 2A to control wireless power transfer. A positive detection hypothesis $H_{out}$ may be indicative for presence of an object (e.g., object 110) and may cause the wireless power transfer system 200 to cease wireless power transfer or to reduce a level of power. Conversely, a negative detection hypothesis $H_{out}$ may be indicative for absence of an object and may cause the wireless power transfer system 200 to continue or resume wireless power transfer or to return to the ordinary power level. In some implementations, the detection hypothesis output $H_{out}$ may include additional information (e.g., the position of the at least one sense element associated to a positive hypothesis output $H_{out}$ and/or a detection confidence value).

In some implementations or operations of a control, processing & evaluation circuit 960, the evaluation of measurement outputs is based on the at least one measurement output $V_{out}$ proportional to the respective electrical voltage $V_2$ in response to a current $I_1$. In other implementations or operations, the evaluation is based on the at least one measurement output $V_{out}$ in relation to the respective (known) current $I_1$ e.g., on the ratio $V_{out}/I_1$ (complex value) that may be indicative of an impedance or transimpedance (e.g., a mutual impedance).

In an implementation or operation of the object detection circuit 100 of FIG. 1 employing an impedance sensing technique with reference to FIG. 3A or 4A, the input multiplexer 916 and the output multiplexer 922 are configured and controlled in a manner to selectively (e.g., sequentially) apply the current $I_1$ to a sense circuit (e.g., sense circuit 104a) of the plurality of sense circuits 104a, 104b, . . . , 104n and to selectively (e.g., sequentially) measure the electrical voltage $V_2$ in the same sense circuit (e.g., sense circuit 104a). In this case, the ratio $V_{out}/I_1$ is indicative of the impedance of the respective sense circuit (e.g., sense circuit 104a). The maximum number $N_{imp}$ of (self-) impedance measurements that may be performed equals the number N of the plurality of sense circuits 104a, 104b, . . . , 104n. More formally, $$N_{imp}=N. \quad (79)$$

In another implementation or operation of the object detection circuit 100 of FIG. 1 using a sense element array (e.g., array 106 with reference to FIG. 1) and employing a transimpedance (e.g., mutual impedance) sensing technique e.g., with reference to FIG. 5A, the input multiplexer 916 and the output multiplexer 922 are configured and controlled in a manner to selectively apply the current $I_1$ to a first sense circuit (e.g., sense circuit 104a) of the plurality of sense circuits 104a, 104b, . . . , 104n and to selectively measure the electrical voltage $V_2$ in a second sense circuit (e.g., sense circuit 104b) different from the first sense circuit. In this case, the ratio $V_{out}/I_1$ is indicative of the transimpedance between the first and second sense circuit. This operation may apply e.g., in an implementation where each of the plurality of sense circuits 104a, 104b, . . . , 104n includes a sense element including a single sense coil (e.g., sense coil 302). Using combinatorics, the maximum number $N_{trans}$ of transimpedance measurements that may be performed in pairs of sense circuits of the plurality (N) of sense circuits 104a, 104b, . . . , 104n may be formally expressed as $$N_{trans} = \binom{N}{2} = \frac{N(N-1)}{2}. \quad (80)$$

This number includes transimpedance measurements between neighboring and non-neighboring sense coils. In an example implementation of the object detection circuit 100 using a number N=64 sense circuits, each including a single sense coil, the maximum number of transimpedance measurements that may be performed in pairs of sense circuits amounts according to Equation (83) to $N_{trans}$=2,016.

In a further implementation or operation of the object detection circuit 100 of FIG. 1 employing a flux compensated mutual impedance sensing technique e.g., with reference to FIG. 7A, the input multiplexer 916 and output multiplexer 922 are configured and controlled in a manner to selectively apply a first current $I_1$ to a first sense circuit (e.g., sense circuit 104a) and a second current $I_1$ to a second sense circuit (e.g., sense circuit 104b) and to selectively measure the electrical voltage $V_2$ in a third sense circuit (e.g., sense circuit 104c) of the plurality of sense circuits 104a, 104b, . . . , 104n. In this case, a change in the measurement output $V_{out}$ due to presence of an object (e.g., object 110) is indicative of a change in transimpedance between the first sense circuit (e.g., sense circuit 104a) and the third sense circuit (e.g., sense circuits 104c) and/or between the second sense circuit (e.g., sense circuit 104b) and the third sense circuit (e.g., sense circuits 104c). This operation may apply in an implementation where each of the plurality of sense elements 106a, 106b, . . . , 106n consists of a single sense coil (e.g., sense coil 302). Using combinatorics, the maximum number $N_{fcti}$ of flux compensated mutual impedance measurements that may be performed in triples of sense circuits of the plurality (N) of sense circuits 104a, 104b, . . . , 104n may be formally expressed as $$N_{fcti} = \binom{N}{3} = \frac{N(N-1)(N-2)}{3}. \tag{81}$$

This number includes flux compensated mutual impedance measurements between neighboring and non-neighboring sense coils. In an example implementation of the object detection circuit 100 using a number N=64 of sense circuits, each including a single sense coil, the maximum number of flux compensated transimpedance measurements that may be performed in triples of sense circuits amounts according to Equation (81) to $N_{fcti}$=83,328.

In some implementations or operations using a plurality of sense circuits, each including a single sense coil, the object detection circuit 100 performs only a subset of all possible transimpedance or flux compensated mutual impedance measurements as described above. In an example operation, transimpedance or flux compensated mutual impedance measurements may be limited to pairs or triples, respectively, of neighboring sense coils.

In some aspect, the object detection circuit 100 performs an impedance measurement for each of the plurality of sense circuits 104a, 104b, . . . , 104n and additionally, a transimpedance measurement in each of a plurality of pairs (or triples) of sense circuits of the plurality of sense circuits 104a, 104b, . . . , 104n to determine whether an object (e.g., object 110) is in proximity of at least one of a sense coil of the plurality of sense coils 106a, 106b, . . . , 106n. It may be appreciated that these additional transimpedance measurements may provide supplementary information useful to improve a detection sensitivity or reliability as further discussed below.

In implementations or operations using a plurality of sense circuits 104a, 104b, . . . , 104n, each including a single sense coil, performing impedance and transimpedance measurements in a time-multiplexed fashion may be time consuming and may result in object detection latency. This may be even true if the object detection circuit 100 is configured to selectively and concurrently apply multiple sense current signals $I_1$ to the plurality of sense circuits 104a, 104b, . . . , 104n and to selectively and concurrently measure multiple electrical voltage $V_2$ in response to the current signals $I_1$ to expedite impedance and transimpedance measurement as previously discussed. Therefore, in certain implementations or operations, the object detection circuit 100 is configured to perform impedance measurements in times where object detection latency is critical (e.g., during active wireless power transfer) and to perform additional transimpedance measurements in times where object detection latency is uncritical (e.g., when wireless power transfer is inactive).

In certain implementations of an object detection circuit 100, the measurement output $V_{out}$ as provided by the measurement circuit 920 is an analog signal e.g., a sinusoidal signal with an amplitude proportional to the amplitude of the electrical voltage $V_2$. This analog measurement output $V_{out}$ is further processed (e.g., digitized, filtered, evaluated, etc.) in the control, processing & evaluation circuit 960 as previously discussed. Therefore, in some cases, measurement outputs $V_{out}$ may also refer to outputs as produced in the control, processing & evaluation circuit 960. These outputs are not shown in FIG. 9.

In an example implementation or operation of a control, processing & evaluation circuit 960, the evaluation is based on an absolute detection scheme, where at least one measurement outputs $V_{out}$ of a plurality of measurement outputs, each associated to at least one sense circuit (e.g., sense circuit 104a or pair of sense circuits 104a and 104b) of the plurality of sense circuits 104a, 104b, . . . , 104n is compared against a respective reference value $V_{out,0}$. The at least one measurement output $V_{out}$ may be indicative of an impedance and/or a transimpedance (e.g., a mutual impedance) and may refer to an output as obtained after processing (e.g., filtering, combining, averaging, etc.) in the control, processing & evaluation circuit 960. The respective reference value $V_{out,0}$ may be the measurement output $V_{out}$ associated to the same at least one sense circuit (e.g., sense circuit 104a or pair of sense circuits 104a and 104b) in absence of the object 110 and may have been determined in a process of calibration. In some implementations or operations based on an absolute detection scheme, presence of an object (e.g., object 110) is assumed, if at least one difference between a measurement output $V_{out}$ associated to the at least one sense circuit (e.g., sense circuit 104a or pair of sense circuits 104a and 104b) and the respective reference value $V_{out,0}$ exceeds a threshold. This difference may be indicative of the change $\Delta Z_1$ in an impedance $Z_1$ or to a change $\Delta Z_{12}$ in a mutual impedance $Z_{12}$ as previously defined e.g., with reference to FIGS. 3A and 5A, respectively.

In an example implementation or operation of a control, processing & evaluation circuit 960, the evaluation is based on a time-differential detection scheme that is sensitive e.g., to a fast (e.g., abrupt) change in a sequence (time-series) of consecutive measurement outputs $V_{out}$, each associated to the same at least one sense circuit (e.g., sense circuit 104a or pair of sense circuits 104a and 104b) of the plurality of sense circuits 104a, 104b, . . . , 104n. The measurement outputs $V_{out}$ may be indicative of an impedance and/or transimpedance (e.g., a mutual impedance) and may refer to outputs as obtained after processing (e.g., filtering, combining, averaging, etc.) in the control, processing & evaluation circuit 960. In some implementations or operations based on a time-differential detection scheme, presence of an object (e.g., object 110) is assumed, if at least one difference between a measurement output $V_{out}$ associated to at least one sense circuit (e.g., sense circuit 104a or pair of sense circuits 104a and 104b) of the plurality of sense circuits 104a, 104b, . . . , 104n and to at least one first time and a measurement output $V_{out}$ associated to the same at least one sense circuit and at least one second time exceeds a threshold. Using time-differential detection, an object can potentially be detected when it enters or leaves the proximity of the at least one sense element (e.g., sense element 106a) or generally when it moves in the proximity of the at least one sense element.

In a further example implementation or operation of a control, processing & evaluation circuit 960, the evaluation is based on a sense circuit-differential detection scheme that is sensitive to differences between measurement outputs $V_{out}$ associated to different sense circuits or different pairs of sense circuits of the plurality of sense circuits 104a, 104b, ..., 104n. This detection scheme may be also referred to as space-differential detection. The measurement outputs $V_{out}$ may be indicative of an impedance and/or a transimpedance (e.g., a mutual impedance) and may refer to outputs as obtained after processing (e.g., filtering, combining, averaging, etc.) in the control, processing & evaluation circuit 960. In some implementations or operations based on a space-differential detection scheme, presence of an object (e.g., object 110) is assumed if at least one difference between a measurement output $V_{out}$ associated to at least one first sense circuit (e.g., sense circuit 104a or pair of sense circuits 104a and 104b) of a plurality of sense circuits 104a, 104b, ..., 104n and a measurement output $V_{out}$ associated to at least one second sense circuit (e.g., sense circuit 104b) exceeds a threshold. In some implementations or operations of a true space-differential detection scheme, the plurality of measurement outputs $V_{out}$ used to determine at least one difference refer to substantially the same time. It may be appreciated that in certain cases, space-differential detection may be less sensitive and reliable than time-differential detection since sense circuits of the plurality of sense circuits 104a, 104b, ..., 104n may be at least partially differently (individually) affected by temperature, mechanical impacts, and ageing.

For certain implementations of the object detection circuit 100 of FIG. 1 solely relying on an absolute detection scheme, calibration for purposes of determining reference values as previously mentioned may be important. Moreover, absolute detection may require a circuit 900 either with high electrical and mechanical long-term stability with respect to temperature variations, mechanical impacts, and ageing or alternatively, high sensitivity (e.g., high fractional impedance change as previously defined with reference to FIG. 3A). For implementations of the object detection circuit 100 employing a time-differential or a space-differential detection approach or a combination thereof, calibration and long-term stability may be less important.

In some aspects, time-differential detection may be sensitive to movements of metallic structures in the environment of the sense element array (e.g., array 106). Such environmental effects may include micromovements of materials (e.g., materials 310 with reference to FIG. 3A) inside the wireless power transfer structure 224 that integrates the sense element array. Further, environmental effects may include movements of the metallic vehicle underbody structure including the vehicle-side wireless power transfer structure 260 when a vehicle is parked over the wireless power transfer structure 224. Vehicle underbody movements may be caused e.g., by the vehicle suspension system that bounces when persons are entering or leaving the vehicle or due to wind forces acting on the vehicle body. Disturbance effects from movements of metallic structure in the environment such as the vehicle underbody may cause false detections in certain implementations of the object detection circuit 100 that is solely based on a time-differential approach. Therefore, in some aspects, it may be desirable to mitigate such disturbance effects. Combining the time-differential scheme with a space-differential scheme on top may be an approach to effectively discriminate such disturbance effects. In a space-differential approach, presence of an object (e.g., object 110) is determined based on differences between measurement outputs $V_{out}$ associated to different sense circuits or pairs of sense circuits of the plurality of sense circuits 104a, 104b, ..., 104n as previously discussed. In certain implementations or operations of a space-differential detection scheme, presence of an object is determined by evaluating at least one difference between a measurement output $V_{out}$ associated to at least one sense circuit (e.g., sense circuit 104a or pair of sense circuits 104a and 104b) and a reference value that is determined based on a plurality of measurement outputs $V_{out}$, each associated to a different sense circuit or a different pair of sense circuits of the plurality of sense circuits 104a, 104b, ..., 104n. This reference value may be e.g., an arithmetic mean value, a r.m.s. value, a median value ($50^{th}$ percentile), or any other percentile value that is derived from a histogram built upon the plurality of measurement outputs $V_{out}$. It may be appreciated that this special space-differential scheme has the potential to discriminate environmental effects e.g., from a moving vehicle underbody that may produce time-varying impedance or mutual impedance changes in a majority (cluster) of sense circuits or pairs of sense circuits, respectively. This special scheme may be considered as a mechanism that automatically adapts the decision threshold used by the control, processing & evaluation circuit 960 for determining presence of an object (e.g., object 110). More specifically, in some implementations or operations, the control, processing & evaluation circuit 960 automatically adjusts the reference value as described above. When the vehicle underbody is moving, the reference value may rise and thus the detection threshold. Increasing the detection threshold will reduce the false detection rate but also the detection sensitivity (detection probability) to some extent. Therefore, a somewhat lower sensitivity must be accepted for an object entering the predetermined space while the vehicle is moving. As soon as the vehicle underbody comes to rest, the detection threshold is readjusted automatically, and the object detection circuit 100 may return to its ordinary sensitivity (detection probability) maintaining a specified false detection rate.

In yet a further example implementation or operation of a control, processing & evaluation circuit 960, the evaluation is based on a pattern recognition approach (e.g., based on machine learning principles). In some implementations or operations, pattern recognition may be considered as a form of space-differential detection. A plurality of measurement outputs $V_{out}$ associated to different sense circuits or different pairs of sense circuits or even different triples of sense circuits (e.g., with reference to FIG. 7A) of the plurality of sense circuits 104a, 104b, ..., 104n may be imaged as a pattern (e.g., a 2D pattern or a 3D pattern). The measurement outputs $V_{out}$ may be indicative of an impedance and/or a transimpedance (e.g., a mutual impedance) and may refer to outputs $V_{out}$ as obtained after processing (e.g., filtering, combining, averaging, etc.) in the control, processing & evaluation circuit 960. If the plurality of measurement outputs $V_{out}$ include outputs indicative of a transimpedance (e.g., a mutual impedance) obtained with a sense coil arrangement 510 or 710 as previously described with reference to FIG. 5D or 7D, respectively, the number $N_m$ of measurement outputs $V_{out}$ may be larger than the number N of the plurality of sense circuits 104a, 104b, ..., 104n as previously discussed with reference to Equations (79) and (80). In some implementations or operations, the control, processing & evaluation circuit 960 is trained with various objects placed at various positions and in various orientations. It may be also trained for typical environmental effects such as temperature variation, mechanical impacts, and ageing and for effects from the vehicle underbody structure including the vehicle-side wireless power transfer structure 260 with reference to FIG. 2B. An object (e.g., object 110) in proximity of at least one sense element (e.g., sense element 106a) of the plurality of sense elements 106a, 106b, ..., 106n may produce a characteristic change in the pattern of measurement outputs $V_{out}$. In some implementations or operations of a control, processing & evaluation circuit 960 employing pattern recognition, presence of an object (e.g., object 110) is assumed if a pattern resembles patterns learned in a training with a variety of objects as previously described. In some implementations of a pattern recognition approach, the control, processing & evaluation circuit 960 includes a neuronal network configured and trained for detecting objects (e.g., object 110). This neuronal network may be also configured and trained to mitigate effects from temperature variations and other environmental impacts as previously discussed.

Pattern recognition may be also contemplated as detecting a change of a vector in a multi-dimensional vector space. The plurality ($N_m$) of measurement outputs $V_{out}$ each associated to a different sense circuit or to a different pair of sense circuits of the plurality of sense circuits 104a, 104b, ..., 104n may be considered as a vector $\vec{V}_{out}$ in a $N_m$-dimensional vector space. If an object (e.g., object 110) is in proximity to at least one sense element (e.g., sense element 106a), the vector $\vec{V}_{out,0}$ as measured in absence of the object will generally experience a change $\overrightarrow{\Delta V}_{out}$. It may be found that changes $\overrightarrow{\Delta V}_{out}$ produced by objects (e.g., object 110) move in certain (typical) directions or in a certain subspace of the $N_m$-dimensional vector space while changes produced by environmental effects as previously discussed move mostly in other directions or in another subspace. In a probabilistic sense, these two subspaces may be largely non-overlapping (orthogonal). This orthogonality of the two subspaces may improve when the number $N_m$ increases. In some implementations of an object detection circuit 100, the number $N_m$ (dimensionality of the vector space) is increased e.g., by additionally measuring the mutual impedance between multiple pairs of sense circuits of the plurality of sense circuits 104a, 104b, ..., 104n. It may be appreciated that each mutual impedance measurement that is added may provide additional information that may potentially improve an object detection circuit 100. Considering environmental effects such as from temperature variations, mechanical impacts, and ageing, it may be found that increasing the dimensionality $N_m$ of the vector space is more effective in terms of detection reliability than increasing a sensitivity (e.g., by increasing a fractional change, a SNR, or a measurement time).

In some implementations of an object detection circuit 100, the control, processing & evaluation circuit 960 includes functions as needed for specialized detection schemes. In certain implementations, it includes e.g., a correlator function for purposes as discussed in more detail below.

Inductive thermal sensing may be a specialized detection scheme for detecting a metallic object (e.g., object 110) by its temperature variation as occurring when exposed to a magnetic field (e.g., the low frequency magnetic field as generated by the wireless power transfer system 200 with reference to FIG. 2A) with a level sufficient to produce a substantial temperature variation. In some implementations or operations of inductive thermal sensing, the change (response) in an electrical characteristic (e.g., impedance $Z_1$, mutual impedance $Z_{12}$) and thus in the measurement output $V_{out}$ due to the presence of the metallic object is stimulated by intermittently applying the magnetic field exposure in a manner so that the object's temperature is following the exposure ON and OFF cycles distinctly but not exceeding a critical level. This technique relies on an object's electrical properties (e.g., conductivity, permeability) and thus its equivalent impedance $Z_3$ (with reference to FIG. 3B) being generally a function of the object's temperature. It may be appreciated that the change (response) in an electrical characteristic (e.g., impedance $Z_1$, mutual impedance $Z_{12}$) and thus in the measurement output $V_{out}$ produced by an object whose equivalent impedance $Z_3$ is a function of the object's temperature will generally also be a function of the object's temperature. In some implementations or operations, presence of an object (e.g., object 110) is determined based on a correlation between the at least one first sequence (time-series) of consecutive measurement outputs $V_{out}$ each associated to the same at least one sense circuit (e.g., sense circuit 104a or pair of sense circuits 104a and 104b) of the plurality of sense circuits 104a, 104b, ..., 104n and a corresponding second sequence indicative of the level (e.g., the r.m.s. envelope) of the time-varying magnetic field exposure signal.

Inductive thermal sensing may potentially provide a solution for detecting objects of a certain category on an absolute basis as defined above. This category may include metallic objects with a sufficient temperature coefficient, strong eddy current heating effect when exposed to the magnetic field, and low thermal capacity so that they heat up and cool down faster than other metallic structures e.g., inside the wireless power transfer structure 224 or in its environment when exposed to the magnetic field. This category may include pieces of foil (Aluminum foil), metallized paper or the like. Non-limiting examples of objects belonging to this category may be a cigarette packet including a metallized foil, the cover of a yoghurt cup, a chewing gum wrapper, and a cigarette lighter with a metallized lighter head. Objects of this category may heat up rapidly to temperatures e.g., above 500 K if exposed to an alternating magnetic field with a flux density above 1 mT at a frequency of 85 kHz. Objects with temperatures above 500 K may be considered a potential risk for fire if the object comes into contact with a flammable material such as paper, dry foliage, oil, fuel, etc.

In an example implementation or operation of the object detection circuit 100 of FIG. 1 employing inductive thermal sensing, the object detection circuit 100 controls the wireless power transfer system 200 with reference to FIG. 2A to intermittently apply an exposure magnetic field (e.g., at a wireless power transfer frequency of 85 kHz) with a level sufficient to produce a substantial temperature variation in a metallic object (e.g., object 110). While the exposure magnetic field is intermittently applied, the control, processing & evaluation circuit 960 processes at least one first sequence of consecutive measurement outputs $V_{out}$ each associated to the same at least one sense circuit (e.g., sense circuit 104a or pair of sense circuits 104a and 104b) to determine a level of correlation between the at least one first sequence of consecutive measurement outputs $V_{out}$ and a corresponding second sequence indicative of the level of the intermittently applied exposure magnetic field signal. Presence of an object (e.g., object 110) is assumed if the level of correlation exceeds a threshold for at least one sense circuit or at least one pair of sense circuits of the plurality of sense circuits 104a, 104b, ..., 104n.

In some example implementations or operations of an object detection circuit 100, inductive thermal sensing is combined with a space-differential detection scheme. Presence of an object (e.g., object 110) may be assumed if at least one difference between the correlator output associated to at least one first sense circuit (e.g., sense circuit 104a) and the correlator output associated to at least one second sense circuit (e.g., sense circuit 104b) exceeds a threshold.

Inductive ferromagnetic sensing may be another specialized detection scheme for detecting a metallic ferromagnetic object (e.g., object 110) by the variation (modulation) of its electrical properties (e.g., permeability, conductivity) as it may occur when exposed to a magnetic field (e.g., a low frequency magnetic field as generated by the wireless power transfer system 200 with reference to FIG. 2A) with a level sufficient to produce a substantial variation. In some example implementation or operation of inductive ferromagnetic sensing, the change (response) in an electrical characteristic (e.g., impedance $Z_1$, mutual impedance $Z_{12}$) and thus in the measurement output $V_{out}$ due to the presence of the ferromagnetic object is stimulated by intermittently applying the magnetic field exposure in a manner so that the object's electrical properties are substantially modulated by the exposure ON and OFF cycles but also by the oscillation of the exposure magnetic field (e.g., with a frequency of 85 kHz) but with a level not causing the object to exceed a critical temperature. This technique relies on an object's electrical properties (e.g., conductivity, permeability) and thus its equivalent impedance $Z_3$ (with reference to FIG. 3B) being generally a function of the instantaneous amplitude of the exposure magnetic field signal. It may be appreciated that the change (response) in an electrical characteristic (e.g., impedance $Z_1$, mutual impedance $Z_{12}$) and thus in the measurement output $V_{out}$ produced by an object whose equivalent impedance $Z_3$ is a function of the instantaneous amplitude of the exposure magnetic field signal will generally also be a function of the instantaneous amplitude of the exposure signal. This function may be a non-linear function, may include memory (hysteresis) effects, and may also include thermal effects (e.g., Curie temperature effect). In some implementations or operations, presence of an object is determined based on a correlation between at least one first sequence (time-series) of consecutive measurement outputs $V_{out}$ each associated to the same sense circuit (e.g., sense circuit 104a) of the plurality of sense circuits 104a, 104b, . . . , 104n and a corresponding second sequence indicative of the exposure magnetic field signal.

Inductive ferromagnetic sensing may potentially provide a solution for detecting objects of a certain category on an absolute basis as defined above. This category may include metallic ferromagnetic objects whose electrical properties substantially vary when exposed to a time-varying (alternating) magnetic field and whose response in a measured electrical characteristic is stronger than a response from any ferromagnetic structure inside the wireless power transfer structure 224 or in its environment when exposed to the alternating magnetic field. Non-limiting examples of objects belonging to this category may be paper clips, pieces of steel wire, steel nails, steel pins, screws, nuts, and washers. Objects of this category may heat up to temperatures e.g., above 500 K if exposed to an alternating magnetic field with a flux density above 1 mT at a wireless power transfer frequency of 85 kHz since ferromagnetism (permeability $\mu_r \gg 1$) increases the heating effect due to the reduced skin depth (see Equation (15)) and additional hysteresis loss effects.

In an example implementation or operation of the object detection circuit 100 of FIG. 1 using inductive ferromagnetic sensing, the object detection circuit 100 controls the power conversion circuit 222 with reference to FIG. 2A to intermittently apply an exposure magnetic field with a level sufficient to produce a substantial variation in an electrical property of the metallic ferromagnetic object (e.g., object 110). While the exposure magnetic field is intermittently applied, the control, processing & evaluation circuit 960 processes at least one sequence (time-series) of consecutive measurement outputs $V_{out}$ each associated to the same at least one sense circuit (e.g., sense circuit 104a or pair of sense circuits 104a and 104b) of the plurality of sense circuits 104a, 104b, . . . , 104n to determine a level of correlation between the at least one first sequence of consecutive measurement outputs $V_{out}$ and a corresponding second sequence indicative of the applied exposure magnetic field signal. Presence of an object (e.g., object 110) is assumed if the level of correlation exceeds a threshold for at least one sense circuit or at least one pair of sense circuits of the plurality of sense circuits 104a, 104b, . . . , 104n.

In an example implementation or operation of an object detection circuit 100, inductive ferromagnetic sensing is combined with a space-differential detection scheme. Presence of an object (e.g., object 110) is assumed if at least one difference between the correlator output associated to at least one first sense circuit (e.g., sense circuit 104a) and the correlator output associated to at least one second sense circuit (e.g., sense circuit 104b) exceeds a threshold. In another example implementation or operation, respective correlator outputs obtained with inductive ferromagnetic sensing and with inductive thermal sensing are combined.

Inductive kinematic sensing may be a further specialized detection scheme for detecting an object (e.g., object 110) by its relative motion e.g., when the object is mechanically moved relative to the sense elements (e.g., the plurality of sense elements 106a, 106b, . . . , 106n). In an example implementation or operation of inductive kinematic sensing, the top surface of the housing 236 of the wireless power transfer structure 224 where an object may rest is mechanically moved back and forth relative to the sense element array 106. (Either the top-surface of housing 236 is moved or the wireless power transfer structure including sense element array 106 inside housing 236 is moved, or both are moved.) In some implementations or operations of inductive kinematic sensing, an object is moved relative to the sense elements with an amplitude e.g., in the centimeter range and at a low frequency (e.g., 3 Hz). In other implementations or operations, the object is moved (vibrated) with an amplitude e.g., in the millimeter or even submillimeter range at a higher frequency (e.g., 50 Hz). The relative movement of an object (e.g., object 110) in proximity of a sense element (e.g., sense element 106a) may produce a time-varying change in an electrical characteristic (e.g., impedance $Z_1$, mutual impedance $Z_{12}$) and thus in the measurement output $V_{out}$. It may be appreciated that this change (response) in an electrical characteristic will generally be a function of the object's instantaneous position relative to the sense element array 106. This function may be a non-linear function. In some implementations or operations, presence of an object (e.g., object 110) is determined based on a correlation between the at least one first sequence of consecutive measurement outputs $V_{out}$ each associated to the same at least one sense circuit (e.g., sense circuit 104a or pair of sense circuits 104a and 104b) of the plurality of sense circuits 104a, 104b, . . . , 104n and a corresponding second sequence indicative of the mechanical movement signal.

Inductive kinematic sensing may potentially provide a solution for detecting objects of any category e.g., as described with reference to FIG. 3D on an absolute basis as defined above.

In an example implementation of a wireless power transfer system 200 including the object detection circuit 100 of FIG. 1 employing inductive kinematic sensing, the wireless power transfer structure 224 includes electrical and mechanical functions as required to move (or vibrate) a potential object (e.g., object 110 resting on the surface of housing 236) relative to the sense element array 106. Moreover, the object detection circuit 100 may control the wireless power transfer structure 224 with reference to FIG. 2B to apply mechanical movements with an amplitude and frequency as required for inductive kinematic sensing. While mechanical movements are applied, the control, processing & evaluation circuit 960 processes at least one first sequence of consecutive measurement outputs $V_{out}$ each associated to the same at least one sense circuit (e.g., sense circuit 104a or pair of sense circuits 104a and 104b) of the plurality of sense circuits 104a, 104b, ..., 104n to determine a level of correlation between the at least one first sequence of consecutive measurement outputs $V_{out}$ and a corresponding second sequence indicative of the mechanical movement signal. Presence of an object (e.g., object 110) is assumed if the level of correlation exceeds a threshold for at least one sense circuit or at least one pair of sense circuits of the plurality of sense circuits 104a, 104b, ..., 104n.

In an example implementation or operations of an object detection circuit 100, inductive kinematic sensing is combined with a space-differential detection scheme. Presence of an object (e.g., object 110) is assumed if at least one difference between the correlator output associated to at least one first sense circuit (e.g., sense circuit 104a) and the correlator output associated to at least one second sense circuit (e.g., sense circuit 104b) exceeds a threshold. In another example implementation or operation, correlator outputs obtained with inductive kinematic sensing, inductive thermal sensing, and inductive ferromagnetic sensing are combined.

In some implementations or operations of an object detection circuit 100, one or more specialized detection schemes as described above are applied initially before starting regular wireless power transfer e.g., for the purpose of charging an electric vehicle. If the object detection circuit 100 determines presence of an object (e.g., object 110), the wireless power transfer system 200 stops detection based on a specialized detection scheme and does not start regular wireless power transfer. During regular wireless power transfer, the object detection circuit 100 may employ at least one other detection scheme e.g., a time-differential scheme capable of detecting an object (e.g., object 110) when it enters the predetermined space.

In other implementations or operations of an object detection circuit 100, one or more specialized detection schemes as described above are applied in the event that the object detection circuit 100 trips during regular wireless power transfer. In this case, one or more specialized detection schemes may be used to verify this detection by first ceasing regular power transfer and then reapplying one or more specialized detection schemes. This may apply in case of a detection with low confidence. If the previous finding of presence of an object (e.g., object 110) is confirmed, the wireless power transfer system 200 discontinues regular wireless power transfer else it reactivates regular wireless power transfer.

In some aspects of an object detection circuit 100, the control circuit 950 and/or the control, processing & evaluation circuit 960 are configured to perform calibration for purposes of determining reference values as previously described for purposes of threshold detection. In further aspects, they may be configured to perform calibration of the impedance or transimpedance measurement with respect to the angle (e.g., $\arg\{Z_1\}$) as previously described with reference to the circuit 300 of FIG. 3A.

In other aspects of an object detection circuit 100, the control circuit 950 and/or the control, processing & evaluation circuit 960 are configured to perform functions such as finding optimum sense frequencies $f_s$ minimizing the effect of circuit extrinsic noise as previously described with reference to the circuit 300 of FIG. 3A.

In some implementations or operations of an object detection circuit 100, the driver circuit 910 is configured to concurrently generate and selectively (e.g., sequentially) apply a plurality of current signals $I_1$ each with a distinct frequency $f_s$. Each of the plurality of current signals $I_1$ is selectively (e.g., sequentially) applied to each of a subset of the plurality of sense circuits 104a, 104b, ..., 104n. The number of subsets may equal the number of concurrently applied current signals $I_1$. As previously mentioned, such multiple current signal operation may be used to expedite impedance and/or transimpedance measurements in each of a plurality of sense circuits and/or in each of a plurality of pairs of sense circuits, respectively, of the plurality of sense circuits 104a, 104b, ..., 104n.

In some implementations or operations where two or more current signals $I_1$ are applied at a time, intermodulation effects may occur e.g., due to cross-talk in multiplexers 916 and 922, in the plurality of sense circuits 104a, 104b, ..., 104n, and residual non-linearity e.g., in the measurement circuit 920. If three or more current signals $I_1$ each with a distinct frequency $f_s$ are concurrently applied, intermodulation products may fall on one or more of the applied sense frequencies $f_s$ thus interfering with the one or more voltage signals $V_2$ in the measurement circuit 920. In an example operation where three current signals $I_1$ each with a distinct frequency $f_s$ are concurrently applied, an intermodulation product generated by the first and second current signal $I_1$ having a first and second frequency $f_s$ may fall onto the third frequency $f_s$ of the third current signal $I_1$, thus interfering e.g., in the measurement circuit 920 with the voltage signal $V_2$ in response to the third current signal $I_1$. Interference caused by intermodulation products generally manifests in variations in a sequence (time-series) of consecutive measurement outputs $V_{out}$ associated to the same at least one sense circuit (e.g., sense circuit 104a or pair of sense circuits 104a and 104b). If measurement outputs $V_{out}$ refer to an output (not shown in FIG. 9) in the control, processing & evaluation circuit 960, these variations may be generally characterized by variations in a magnitude and phase. These variations may resemble the effects of circuit intrinsic or extrinsic noise sources as previously discussed with reference to FIG. 3A. However, the variance caused by intermodulation interference may be significantly larger than that produced e.g., by circuit intrinsic noise. These variations may require the detection threshold to be increased e.g., in an implementation or operation based on a time-differential detection scheme as described below, thus resulting in lower detection sensitivity.

In some implementations or operations of an object detection circuit 100, interference caused by intermodulation effects is mitigated by a smart selection of sense frequencies $f_s$ e.g., by selecting a set of frequencies whose intermodulation products (e.g., up to the fourth order) do not fall on any of the frequencies $f_s$ of the selected set of frequencies. However, this approach may put some constraints on the choice of sense frequencies $f_s$. This may be true if intermodulation products of several orders need to be taken into account, the number of concurrently applied currents $I_1$ is greater than three and in implementations or operations where sense circuits have to be operated at or near resonance, have tolerances with respect to the resonant frequency, and where some frequency bands e.g., jammed by frequency selective switching noise have to be avoided for purposes as previously discussed.

In another implementation or operation of an object detection circuit 100, interference due to intermodulation effects is mitigated by choosing sense frequencies $f_s$ for the plurality of concurrently applied current signals $I_1$ from a set of frequencies with a fixed frequency spacing $\Delta f$ (e.g., a frequency grid). In some implementations, each sense frequency $f_s$ is a multiple of the frequency spacing $\Delta f$ (e.g., 1 kHz). It may be appreciated that the plurality of current signals $I_1$ with sense frequencies $f_s$ differing by integer multiples of $\Delta f$ generates intermodulation products with frequencies that are also an integer multiple of $\Delta f$, thus may potentially fall on one or more sense frequencies $f_s$. Additionally, the phase of each of the plurality of concurrently applied current signals $I_1$ is controlled in a manner so that any intermodulation product falling on a sense frequencies $f_s$ produces a static offset (instead of noise-like variations) in sequences (time-series) of consecutive measurement outputs $V_{out}$ associated to the same at least one sense circuit (e.g., sense circuit 104a or pair of sense circuits 104a and 104b). It may be appreciated that a small static offset (e.g., equivalent to a fractional change below 1%) as it may be caused by intermodulation effects may not negatively impact operation of an object detection circuit 100. This may be particularly true for implementations or operations employing a time-differential detection scheme.

In some implementations or operations of the object detection circuit 100 of FIG. 1 employing multiple sense current signal operation and phase control to mitigate intermodulation effects, the phase of each of the plurality of sinusoidal current signals $I_1$ that is concurrently and selectively (e.g., sequentially) applied is reset (e.g., to zero) at the start of a measurement time interval. More precisely, in a multiple sense current signal operation where each of a plurality of current signals $I_1$ is concurrently and sequentially applied to each sense circuit of a subset of the plurality of sense circuits 104a, 104b, . . . , 104n as previously described, the phase of each current signal $I_1$ is reset at the start of each measurement time interval as provided for sequentially measuring an electrical voltage $V_2$ in each of the plurality of sense circuits 104a, 104b, . . . , 104n in a time-multiplexed fashion.

In some aspect of an object detection circuit 100, the control, processing & evaluation circuit 960 is also configured to extract a residual low frequency signal component e.g., at the wireless power transfer frequency $f_{wpt}$ (e.g., 85 kHz) as it may exist in the measurement output $V_{out}$ of the at least one measurement amplifier circuit 924. Such low frequency signal component may be present during wireless power transfer or whenever the wireless power transfer structure 224 generates a low frequency magnetic field. To some extent, such low frequency signal component may be also present if the vehicle-side wireless power transfer structure 260 generates a low frequency magnetic field e.g., at the wireless power transfer frequency $f_{wpt}$. In implementations using capacitive compensation of an impedance or mutual impedance e.g., based on the circuit 400 of FIG. 4A or on the circuit 800 of FIG. 8A, respectively, this low frequency component in the measurement output $V_{out}$ may be substantially attenuated as previously discussed with reference to FIG. 3A and FIG. 8A, respectively. In some aspect, this low frequency signal component is indicative for the electrical voltage induced into the sense element (e.g., sense element 106a) of the plurality of sense elements 106a, 106b, . . . , 106n by the low frequency magnetic field as present at the location of this sense element. It is also indicative for the low frequency signal component in the electrical voltage $V_2$ at the respective sense circuit (e.g., sense circuit 104a). More precisely, in some aspect, this low frequency signal component in the measurement output $V_{out}$ may be proportional to the low frequency signal component in the electrical voltage $V_2$ at the sense circuit (e.g., sense circuit 104a) that is selectively connected to the measurement amplifier circuit 924 via multiplexer 922. In some implementations or operations of an object detection circuit 100, the level (e.g., r.m.s. level) of this low frequency component in the measurement output $V_{out}$ is proportional to the level of the low frequency magnetic flux passing through the sense element (e.g., sense element 106a) associated to the measurement output $V_{out}$.

In some implementations or operations an object detection circuit 100, the control, processing & evaluation circuit 960 may use the low frequency component extracted from the measurement output $V_{out}$ for various purposes e.g., in connection with the specialized detection schemes as previously described.

In some implementations or operations, the control, processing & evaluation circuit 960 is configured to use the extracted low frequency component being indicative for the level of the low frequency magnetic field at the location of the sense element (e.g., sense element 106a) for correlation. More precisely, it is configured to correlate a sequence (time-series) of low frequency components extracted from consecutively measured $V_{out}$, each associated to the same at least one sense circuit (e.g., sense circuit 104a or pair of sense circuits 104a and 104b) with a corresponding sequence of consecutively measured $V_{out}$ being indicative for the electrical voltage $V_2$ at the sense frequency $f_s$. In another example implementation or operation employing inductive thermal sensing, the control, processing & evaluation circuit 960 is configured to correlate a sequence of consecutively measured low frequency components each associated to the same at least one sense circuit (e.g., sense circuit 104a or pair of sense circuits 104a and 104b) with a corresponding sequence of a time derivative of consecutively measured $V_{out}$ being indicative for the electrical voltage $V_2$ at sense frequency $f_s$. In a further example implementation or operation employing inductive thermal sensing the control, processing & evaluation circuit 960 is configured to use other functions (e.g., similar to the time derivative) to modify the sequence of measurement outputs $V_{out}$ indicative for the electrical voltage $V_2$ at sense frequency $f_s$.

In other implementations or operations, the control, processing & evaluation circuit 960 is configured to use the extracted low frequency component being indicative for the low frequency magnetic field signal at the location of the sense element (e.g., sense element 106a) for correlation. In an example implementation or operation employing inductive ferromagnetic sensing, the control, processing & evaluation circuit 960 is configured to correlate a sequence (time-series) of low frequency components, each associated to the same at least one sense circuit (e.g., sense circuit 104a or pair of sense circuits 104a and 104b) with a corresponding sequence of consecutively measured $V_{out}$ being indicative for the electrical voltage $V_2$ at sense frequency $f_s$. In an example implementation or operation, the control, processing & evaluation circuit 960 is configured to modify the sequence of low frequency components prior correlation e.g., by applying an appropriate function so that the new modified sequence is representative for the low frequency magnetic field signal waveform as it would look like after rectification.

In further implementations or operations, the control, processing & evaluation circuit 960 is configured to use the extracted low frequency component as supplementary information being indicative of presence and level of the low frequency magnetic field at wireless power transfer frequency $f_{wpt}$ e.g., to improve the evaluation of measurement outputs $V_{out}$ to determine presence of an object (e.g., object 110). As a non-limiting example, this improvement may include adaptation of a threshold e.g., to reduce a false detection rate e.g., due to external noise at sense frequency $f_s$ generated by the power conversion circuit 222 with reference to FIG. 2A, which may accompany the low frequency magnetic field.

In yet another implementation or operation, the control, processing & evaluation circuit 960 is configured to use the extracted low frequency component as supplementary information for determining presence of an object (e.g., object 110). This low frequency component may be indicative e.g., for the magnitude and phase of the magnetic flux that is generated by the wireless power transfer coil 226 and that passes through a sense element (e.g., sense element 106a that may include a sense coil e.g., sense coil 302 with reference to FIG. 3A). It may be appreciated that the magnitude and phase of the magnetic flux and thus of the extracted low frequency component associated to a sense element (e.g., sense element 106a) may change if an object (e.g., object 110) is in proximity of that sense coil. Therefore, in some implementations or operations of a control, processing & evaluation circuit 960 is configured to additionally evaluate magnitude and phase of the extracted low frequency component associated to each of the plurality of sense circuits 104a, 104b, . . . , 104n for determining presence of an object (e.g., object 110) in proximity to the at least one of the plurality of sense elements 106a, 106b, . . . , 106n. This sensing technique based on the extracted low frequency component in measurement outputs $V_{out}$ may be considered as measuring a change in a transimpedance (e.g., mutual impedance) between the wireless power transfer coil 226 and each of the plurality of sense elements 106a, 106b, . . . , 106n.

As described above with reference to the measurement and detection circuit 108 of FIG. 1, at least a portion of the control circuit 950 and/or the control, processing & evaluation circuit 960 may be implemented by one or more micro-controllers or other type processors. This portion may be implemented as an application-specific integrated circuit (ASIC), a field programmable gate array (FPGA) device, a digital signal processor (DSP), another processor device or combinations thereof. The control circuit 950 and/or the control, processing & evaluation circuit 960 may be configured to receive information from each of the components of the circuit 900 and perform calculations based on the received information. The control circuit 950 and/or the control, processing & evaluation circuit 960 may be configured to generate control signals for each of the components that may adjust the operation of that component. The control circuit 950 and/or the control, processing & evaluation circuit 960 may further include a memory (not shown) configured to store data, for example, such as instructions for causing the circuit 900 to perform particular functions, such as those related to object detection. In some implementations, certain portions of circuitry, components and/or processors of control circuit 950 and the control, processing & evaluation circuit 960 may be shared or combined. In addition, while different blocks are shown for purposes of illustration, it is noted that the circuitry and/or components involved in the driver circuit 910, the control circuit 950, the plurality of sense circuits 104a, 104b, . . . , 104n, the measurement circuit 920, and the control, processing & evaluation circuit 960 may be combined in different ways on one or more circuit boards or integrated circuits regardless of any particular line shown separating different blocks.

The dashed lines used in FIG. 9 are to emphasize that the components and their configuration in the driver circuit 910 and the measurement circuit 920 are illustrative and other implementations may have these or other components configured to selectively drive the plurality of sense circuits 104a, 104b, . . . , 104n with at least one sense current signal $I_1$ and to selectively measure at least one electrical voltage $V_2$ in the plurality of sense circuits 104a, 104b, . . . , 104n, respectively. Furthermore, while certain circuit elements are described as connected between other elements it should be appreciated that there may be other circuit elements in various implementations that may also be in between the two elements described as electrically connected (e.g., other elements interposed).

Figure 10:
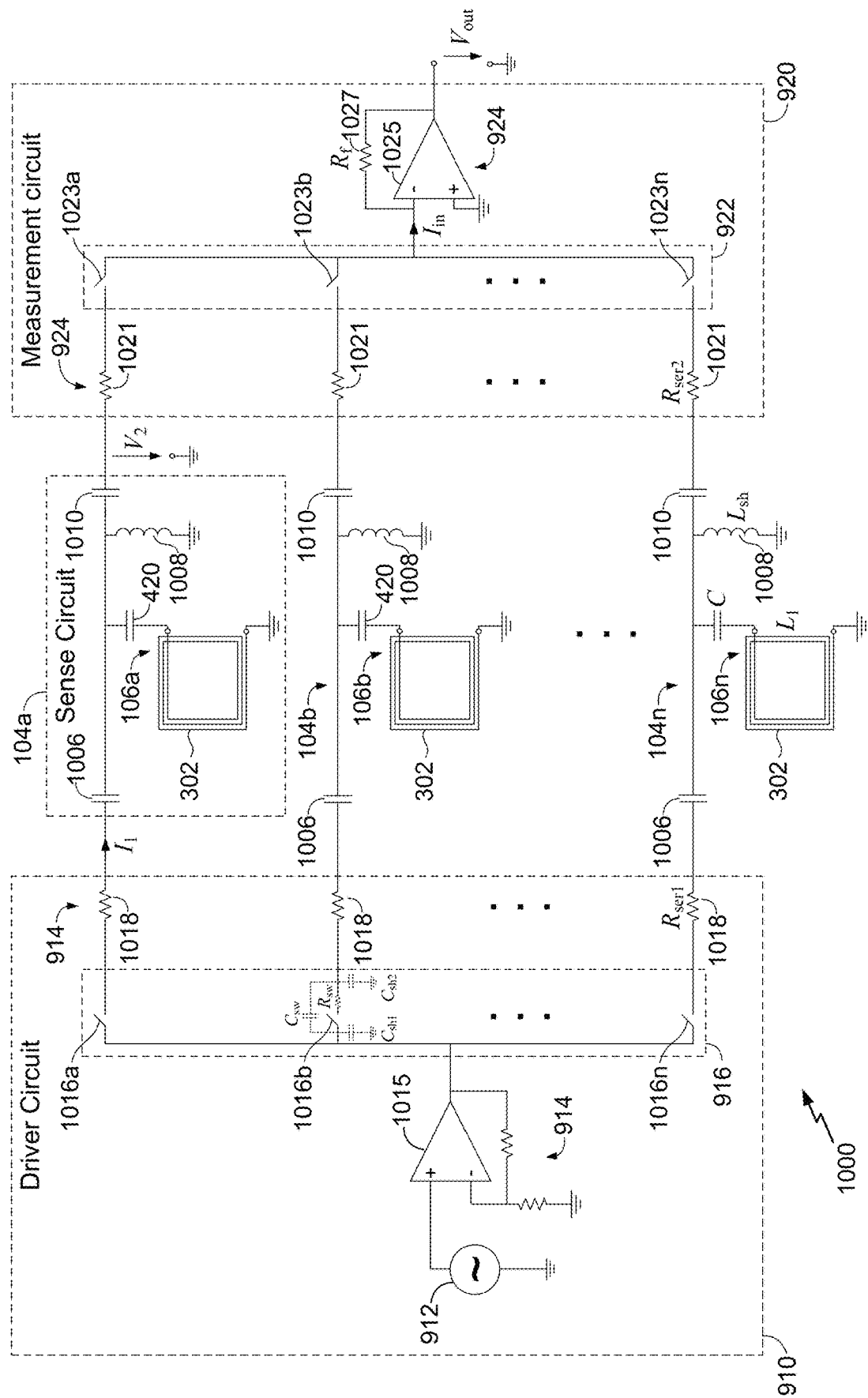
FIG. 10 is a circuit diagram illustrating an example implementation of a portion of the object detection circuit of FIG. 1 using a plurality of sense circuits applicable to both an impedance sensing and a mutual impedance sensing approach.

FIG. 10 is a circuit diagram of a circuit 1000 illustrating an example implementation of a portion of an object detection circuit 100. The circuit 1000 of FIG. 10 illustrates the analog front-end circuit portion of the object detection circuit 100 of FIG. 1 and for purposes of illustration may exclude various other signal generation, processing and evaluation circuitry (e.g., control circuit 950 and control, processing & evaluation circuit 960 with reference to FIG. 9) that may be needed in some implementations of an object detection circuit 100. As further explained below, the circuit 1000 may apply to certain impedance and mutual impedance sensing techniques as previously described with reference to FIGS. 4A and 5A. The circuit 1000 is based on the current source voltage measurement approach as previously described in connection with FIG. 3A and may be subdivided into a driver circuit 910, a plurality of sense circuits 104a, 104b, . . . , 104n, and a measurement circuit 920 as previously described with reference to the generic block diagram of FIG. 9.

In the exemplary implementation shown in FIG. 10, each of the plurality of sense circuits 104a, 104b, . . . , 104n have an identical circuit topology. Therefore, descriptions given below for the sense circuit 104a also apply to the other sense circuits (e.g., 104b, . . . , 104n). The sense circuit 104a includes sense element 106a including a sense coil 302 (e.g., a planar multi-turn coil), a first capacitor 420, a shunt inductor 1008, a second capacitor 1006, and a third capacitor 1010. The first capacitor 420 also referred to as the compensation or tuning capacitor is connected electrically in series with the sense element 106a forming a series-resonant circuit. If operated at a sense frequency $f_s$ near resonance, the first capacitor 420 compensates for the gross portion of the reactance of the sense element 106a (sense coil 302) for purposes as previously discussed with reference to FIGS. 4A and 4B.

In some implementations, capacitors 420, 1006, and 1010 may be of a type with a low temperature coefficient providing high thermal stability (e.g., a NP0-type capacitor) reducing thermal drift of an electrical characteristic (e.g., an impedance) as measured at each of the plurality of sense circuits 104a, 104b, . . . , 104n.

Moreover, as previously mentioned in connection with the circuit 400 of FIG. 4A, the first capacitor 420 may act as a high pass filter to attenuate the high voltages that may be induced into the sense coil 302 by the strong magnetic fields associated with the wireless power transfer at a frequency $f_{wpt}$. Therefore, the first capacitor 420 may also serve for protecting the sense coil 302, the components of the driver circuit 910 as well as the measurement circuit 920 e.g., from damage by excessive current flow, consequent heating effects, overloading, or surpassing some voltage limits. To more effectively attenuate any signal component at the wireless power transfer frequency $f_{wpt}$ and low frequency harmonics thereof in the electrical voltage $V_2$, a shunt inductor 1008 is connected in parallel to (across) the series circuit of capacitor 420 and sense coil 302 as shown in FIG. 10. The capacitor 420 together with the shunt inductor 1008 form a $2^{nd}$ order high pass filter that is configured to attenuate these low frequency signal components to a level e.g., significantly below the level of the electrical voltage $V_2$ in response to a respective sense current $I_1$ at sense frequency $f_s$ (e.g., in the MHz range). Therefore, this high pass filter may substantially reduce dynamic range requirements in the measurement circuit 920 and in a further processing (e.g., ADC) e.g., as part of the control, processing & evaluation circuit 960 of FIG. 9. It may also reduce any cross-modulation effects between any low frequency signals at the wireless power transfer frequency $f_{wpt}$ and harmonics thereof and the sense signal at frequency $f_s$. Cross-modulation may be produced by residual non-linear effects in the measurement circuit 920. At sense frequencies $f_s$, this high pass filter may exert a minor impact on the voltage (impedance) measurement and which may be corrected (compensated for) in a further processing (e.g., in the control, processing & evaluation circuit 960 shown in FIG. 9). Any phase shift caused by this high pass filter may be determined e.g., by performing an impedance calibration with respect to the angle e.g., $\arg\{Z_{1c}\}$ as previously mentioned with reference to FIGS. 3A and 9.

An exemplary sense circuit (e.g., sense circuit 104a) designed for a nominal sense frequency $f_s$=3 MHz may use a sense coil 302 with an inductance $L_1$=5 pH, a compensation capacitor 420 with a capacitance C=560 pF, and a shunt inductor 1008 of $L_{sh}$=5 µH. In this example, for illustrative purposes only, the sense circuit may provide 60 dB attenuation of the voltage induced into sense coil 302 at a wireless power frequency $f_{wpt}$=85 kHz. Assuming an induced voltage $V_{ind}$=30 V across the sense coil's 302 terminals, the component at $f_{wpt}$ in the voltage $V_2$ across the sense circuit (e.g., sense circuit 104a) may be only 30 mV while the wanted signal component at sense frequency $f_s$ may be in the order of 100 mV.

The second capacitor 1006 may be needed in some implementations to block any residual DC flow at the output of the driver circuit 910 (e.g., due to a DC offset). In some aspect, the capacitor 1006 may also help to attenuate any residual low frequency current component (e.g., at a wireless power frequency $f_{wpt}$) at the output of the driver circuit 910. Moreover, in some implementations, it may be also used to compensate or partially compensate for the effect of the reactance of shunt inductor 1008 in the measured impedance $Z_{1c}$=$V_2/I_1$. Likewise, the third capacitor 1010 may be needed in some implementations to block any residual DC flow at the input of the measurement circuit 920 (e.g., due to a DC offset). In some aspect, the capacitor 1010 may also help to attenuate any residual low frequency current component (e.g., at a wireless power frequency $f_{wpt}$) at the input of the measurement circuit 920. Moreover, in some implementations, it may be also used to compensate or partially compensate for the effect of the reactance of shunt inductor 1008 in the measured impedance $Z_{1c}$.

The driver circuit 910 includes a signal source 912, a driver amplifier circuit 914, an input multiplexer circuit 916 illustrated in FIG. 10 as a plurality of switches 1016a, 1016b, . . . , 1016n, and a plurality of series resistors 1018 each having a resistance $R_{ser1}$. The driver circuit 910 is configured to operate as a current source (e.g., current source 306 as described in connection with FIG. 3A) and selectively (e.g., sequentially) apply a sense current signal $I_1$ at an operating (sense) frequency $f_s$ to each of the plurality of sense circuits 104a, 104b, . . . , 104n. The signal source 912 generates the sense signal e.g., a sinusoidal sense signal with a defined frequency $f_s$, amplitude and phase. The driver amplifier circuit 914 as illustrated in FIG. 10 includes an operational amplifier 1015 (e.g., a low noise operational amplifier) and is configured to receive the sense signal from signal source 912 and to provide a corresponding voltage source output with an output voltage sufficient to selectively (e.g., sequentially) drive each of the plurality of sense circuits 104a, 104b, . . . , 104n with a specified sense current $I_1$ at a sense frequency $f_s$. The driver amplifier circuit 914 together with series resistors 1018 mimic a current source characteristic at each of the plurality of outputs of the driver circuit 910. It may be appreciated that series resistor 1018 with a large enough resistance $R_{ser1}$ potentially transforms the voltage source output (virtually zero source impedance) of the driver amplifier circuit 914 into a quasi-ideal current source 306 (high source impedance) with reference to FIG. 3A. Given an output voltage constraint for the driver amplifier circuit 914, a series resistor 1018 with a very large resistance $R_{ser1}$ may provide an almost ideal current source characteristic but may also result in a too low sense current $I_1$ and thus in insufficient SNR as it may be seen from Equation (58). Therefore, in some implementations, the resistance $R_{ser1}$ may be a trade-off between the quality of the current source (e.g., as specified with reference to FIG. 3A) and the resulting SNR. In an example implementation using an operational amplifier 1015 with an output voltage constraint of 3 Vrms, the trade-off may be found in a resistance $R_{ser1}$=100Ω resulting in a short circuit output current $I_1$=30 mA. The quality of this current source may be assessed using the definition of Equation (inequality) (2) assuming a sense frequency $f_s$=3 MHz, an example sense circuit (e.g., sense circuit 106a) operated at resonance with an equivalent loss resistance (series resonant resistance) $R_1$=3Ω. The following expression may be found for the left side of Equation (2):

$$\left|\frac{\Delta V_2}{V_{2,0}}\right|\left|\frac{I_{1,0}}{\Delta I_1}\right| \cong \frac{R_{ser1} + R_1}{R_1} = 34.3 > 10, \tag{82}$$

where $|V_2/V_{2,0}|$ refers to the fractional change in the voltage $V_2$ e.g., at the sense circuit 104a caused by an object (e.g., object 110) and $|\Delta I_1/I_{1,0}|$ to the resulting fractional change in the respective current $I_1$. The numerical result of Equation (82) indicates that this example implementation of a driver circuit 910 satisfies the requirements specified by Equation (2).

Within limits of the operational amplifier 1015, the driver circuit 910 has the potential to drive more than one sense circuit with a current $I_1$ at a time, each having the same frequency $f_s$ and substantially the same amplitude and phase. If e.g., switch 1016a and 1016b are closed, each of the sense circuits 104a and 104b is driven with a current $I_1$.

The input multiplexer circuit 916 includes a plurality of switches 1016a, 1016b, . . . , 1016n and is configured to selectively connect each of the plurality of sense circuits 104a, 104b, . . . , 104n via series resistor 1018 to the driver amplifier circuit 914 to selectively (e.g., sequentially) drive each of the plurality of sense circuits 104a, 104b, . . . , 104n with a sense current $I_1$ at a sense frequency $f_s$. Therefore, each of the plurality of switches 1016a, 1016b, . . . , 1016n is electrically connected to a common input node that is electrically connected to the output of the driver amplifier circuit 914. Each of the plurality of switches 1016a, 1016b, . . . , 1016n may be one of a semiconductor analog switch (e.g., a single FET switch, a complementary FET switch composed of a p-channel and a n-channel type FET), a micro-mechanical (MEMS) switch or any other type of switch providing a sufficiently high current signal attenuation in the off-state. An analog switch (e.g., a complementary FET switch) may be modelled by an on-state series resistance $R_{sw}$, an off-state series capacitance $C_{sw}$, a first and a second parasitic shunt capacitance $C_{sh1}$ and $C_{sh1}$, respectively, as indicated in FIG. 10 by the dashed line symbols for the switch 1016b by example. It may be appreciated that the on-state series resistance $R_{sw}$ (e.g., of switch 1016a) may be uncritical for the functioning of the driver circuit 910 since it merges into an overall series resistance $R_{ser1}$. Semiconductor switches may be subject of temperature variations larger than those of normal resistors (e.g., metal film resistors). However, if $R_{sw} \ll R_{ser1}$ holds, the switch (e.g., switch 1016a) may not significantly deteriorate temperature stability of the overall resistance $R_{ser1}$. It may also be appreciated that the total capacitive load produced by the plurality of first shunt capacitances $C_{sh1}$ may not noticeably impair the current source characteristic of the driver circuit 910 since it is in parallel to the voltage source output (virtually zero source impedance) of the driver amplifier circuit 914. This may be true as long as the operational amplifier 1015 can handle the resulting total capacitive load. Assuming operations where only one or a few switches of the plurality of switches 1016a, 1016b, 1016n are closed at a time, the total capacitive load at the common input node is governed by the plurality of first capacitances $C_{sh1}$. Only one or a few second shunt capacitances $C_{sh2}$ will add to the total capacitive load via the switch on-state series resistance $R_{sw}$. An exemplary multiplexer circuit 916 for a sense frequency $f_s$=3 MHz may use complementary FET switches with an on-state resistance $R_{sw}$=5Ω, an off-state series capacitance $C_{sw}$=3 pF (corresponding to a series reactance of 17.7 kΩ), a first shunt capacitance $C_{sh1}$=12 pF, and a second shunt capacitance $C_{sh2}$=12 pF.

The measurement circuit 920 includes a plurality of series resistors 1021 each having a resistance $R_{ser2}$, an output multiplexer circuit 922 illustrated in FIG. 10 as a plurality of switches 1023a, 1023b, . . . , 1023n and a measurement amplifier circuit 924. The measurement circuit 920 is configured to selectively (e.g., sequentially) measure an electrical voltage $V_2$ in each of the plurality of sense circuits 104a, 104b, . . . , 104n and to provide a measurement output $V_{out}$ proportional to the respective electrical voltage $V_2$ at a level suitable for further processing e.g., in the control, processing & evaluation circuit 960 with reference to FIG. 9. The measurement amplifier circuit 924 as illustrated in FIG. 10 includes an operational amplifier 1025 (e.g., a low noise operational amplifier) and is configured to operate as a transimpedance amplifier using feedback resistor 1027.

This circuit transforms an input current $I_{in}$ into an output voltage $V_{out}$ proportional to $I_{in}$. Since the voltage at the negative input of operational amplifier 1025 is virtually zero (virtual ground), the measurement amplifier circuit 924 exhibits a virtually zero input impedance. The measurement amplifier circuit 924 together with series resistors 1021 mimic a quasi-ideal voltage measurement circuit 304 with reference to FIG. 3A to selectively (e.g., sequentially) measure the electrical voltage $V_2$ at each of the plurality of sense circuits 104a, 104b, . . . , 104n. They form together a sign inverting voltage amplifier with an output $V_{out}$ proportional to the sign inverse of the voltage $V_2$. It may be appreciated that series resistor 1021 with a large enough resistance $R_{ser2}$ potentially transforms the quasi-zero impedance input of the measurement amplifier circuit 914 into a high impedance input as required for a quasi-ideal voltage measurement circuit 304 with reference to FIG. 3A. A series resistor 1021 with a very large resistance $R_{ser2}$ may provide an almost ideal measurement circuit but may also result in a lower current $I_{in}$ and thus in insufficient SNR with respect to the measurement circuit's 920 intrinsic noise. Increasing resistance $R_{ser2}$ also requires the feedback resistance $R_f$ to be increased if a specified voltage gain of the measurement circuit 960 needs to be met. However, a too high resistance $R_f$ may cause the measurement amplifier circuit 924 to become unstable. Therefore, in some implementations of a measurement circuit 920, the resistance $R_{ser2}$ may be a trade-off between the quality of the voltage measurement (as defined with reference to FIG. 3A), resulting SNR, and stability conditions. In an example implementation, the measurement circuit 920 is designed to provide an output voltage $V_{out}$=350 mVrms when the sense circuit (e.g., sense circuit 104a) is operated at resonance and driven with a current $I_1$=30 mA. An equivalent loss resistance (resonance resistance) $R_1$=3Ω is assumed for each of the plurality sense circuits 104a, 104b, . . . , 104n. In this example implementation, the trade-off may be found in a series resistor 1012 with a resistance $R_{ser2}$=150Ω and a feedback resistor with a resistance $R_f$=590Ω resulting in a voltage gain of the measurement circuit 920 of about 4. The quality of this quasi-ideal voltage measurement circuit may be assessed using the definition of Equation (inequality) (3) assuming resonance conditions and a resonant resistance $R_1$=3Ω. The following expression may be found for the left side of Equation (3):

$$\frac{|\varepsilon|}{|V_{out,\infty}|} = \frac{|V_{out} - V_{out,\infty}|}{|V_{out,\infty}|} = \frac{R_1}{R_{ser2}} = 0.02 < 0.1, \qquad (83)$$

where $V_{out}$ refers to the measurement output of the measurement circuit 920 (quasi-ideal voltage measurement circuit with a finite input impedance) and $V_{out,\infty}$ to the measurement output of an ideal voltage measurement circuit (infinite input impedance) but the same voltage gain. The numerical result of Equation (83) indicates that this example implementation of a measurement circuit 920 satisfies the requirements specified by Equation (3).

Within limits of the operational amplifier 1025, the measurement circuit 920 has the potential to measure the sum voltage of two or more electrical voltages $V_2$ at a time since it is configured as a summation amplifier. Series resistor 1021 transforms the voltage $V_2$ into a corresponding current at the common output node (input of the measurement amplifier circuit 924). If e.g., switch 1023a and switch 1023b are closed, the measurement output $V_{out}$ is proportional to the sign inverse of the sum of the voltage $V_2$ at sense circuit 104a and sense circuit 104b, since currents $V_2/R_{ser2}$ resulting at the common output node add up.

The output multiplexer circuit 922 including the plurality of switches 1023a, 1023b, . . . , 1023n is configured to selectively connect each of the plurality of sense circuits 104a, 104b, . . . , 104n via series resistor 1021 to the measurement (transimpedance) amplifier circuit 924 to selectively (e.g., sequentially) measure an electrical voltage $V_2$ at each of the plurality of sense circuits 104a, 104b, . . . , 104n in response to a current $I_1$ at a sense frequency $f_s$. Therefore, each of the plurality of switches 1023a, 1023b, . . . , 1023n is electrically connected to a common output node that is electrically connected to the input of the measurement amplifier circuit 924. As for the input multiplexer 916, each of the plurality of switches 1023a, 1023b, . . . , 1023n may be one of a semiconductor analog switch (e.g., a single FET switch, a complementary FET switch composed of a p-channel and a n-channel type FET), a micro-mechanical (MEMS) switch or any other type of switch providing a sufficiently high current signal attenuation in the off-state. As previously described in connection with the input multiplexer 916, each of the plurality of switches 1023a, 1023b, . . . , 1023n may exhibit an on-state series resistance $R_{sw}$, an off-state series capacitance $C_{sw}$, a first and a second parasitic shunt capacitance $C_{sh1}$ and $C_{sh1}$, respectively, as indicated in FIG. 10 by the dashed line symbols for the switch 1016b by example. It may be appreciated that the on-state series resistance $R_{sw}$ (e.g., of switch 1023a) may be non-critical for the functioning of the measurement circuit 920 since it merges into an overall series resistance $R_{ser2}$. If $R_{sw} \ll R_{ser2}$ holds, the switch 1023b may not significantly deteriorate temperature stability of the overall resistance $R_{ser2}$ for reasons as previously discussed. It may also be appreciated that the total capacitive load produced by the plurality of first parasitic shunt capacitances $C_{sw1}$ at the common output node may not impair the measurement circuit 920 since it is in parallel to the virtually zero-impedance input of the measurement amplifier 924. This may be true as long as the operational amplifier 1025 can handle the resulting total capacitive load at its negative input. Assuming operations where only one or a few switches of the plurality of switches 1023a, 1023b, . . . , 1023n are closed at a time, the total capacitive load is governed by the plurality of first capacitances $C_{sh1}$. Only one or a few second shunt capacitances $C_{sh2}$ will add to the total capacitive load via the switch' on-state resistance $R_{sw}$. An exemplary output multiplexer circuit 922 for a sense frequency $f_s=3$ MHz may use complementary FET switches with the same characteristics as those previously described for an example input multiplexer 916.

As previously mentioned, the circuit 1000 of FIG. 10 may apply to certain impedance and mutual impedance sensing techniques e.g., as previously described with reference to FIGS. 4A and 5A. In an operation of an object detection circuit 100, the circuit 1000 is controlled in a manner to perform capacitively compensated impedance sensing with reference to the circuit 400 of FIG. 4A by selectively (e.g., sequentially) applying a current $I_1$ to each of the plurality of sense circuits 104a, 104b, . . . , 104n and by selectively measuring an electrical voltage $V_2$ at the corresponding sense circuit in response to the current $I_1$ in a time-sharing mode. In some operations, switches of the input multiplexer 916 (plurality of switches 1016a, 1016b, . . . , 1016n) and corresponding switches of the output multiplexer 922 (plurality of switches 1023a, 1023b, . . . , 1023n) are closed sequentially in a round robin fashion. In a first time interval, a first switch (e.g., switch 1016a) of the input multiplexer 916 and a corresponding switch of the output multiplexer 922 (e.g., switch 1023a) are closed and all other switches are open. In a second time interval, a second input multiplexer switch (e.g., switch 1016b) and a corresponding output multiplexer switch (e.g., switch 1023b) are closed and all other switches are open. In a third time interval, a third input multiplexer switch (e.g., switch 1016n) and a corresponding output multiplexer switch (e.g., switch 1023n) are closed and all other switches are open, etc.

In another operation of an object detection circuit 100, the circuit 1000 is controlled in a manner to perform mutual impedance sensing with reference to FIGS. 5A and 5D by selectively (e.g., sequentially) applying a current $I_1$ to each of the plurality of sense circuits 104a, 104b, . . . , 104n and by selectively (e.g., sequentially) measuring at least one electrical voltage $V_2$ at a different (non-corresponding) sense circuit of the plurality of sense circuits 104a, 104b, . . . , 104n where no current $I_1$ is applied. In an example operation, each switch of the input multiplexer 916 (plurality of switches 1016a, 1016b, . . . , 1016n) and a different (non-corresponding) switch of the output multiplexer 922 (plurality of switches 1023a, 1023b, . . . , 1023n) are closed sequentially in a round robin fashion. In a first time interval, a first input multiplexer switch (e.g., switch 1016a) and a non-corresponding output multiplexer switch (e.g., switch 1023b) are closed and all other switches are open. In a second time interval, a second input multiplexer switch (e.g., switch 1016b) and a non-corresponding output multiplexer switch (e.g., switch 1023n) are closed and all other switches are open. In a third time interval, a third input multiplexer switch (e.g., switch 1016n) and a non-corresponding output multiplexer switch are closed and all other switches are open, etc. In this example operation of mutual impedance sensing, the pair of switches that are closed at the same time (e.g., switch 1016a and switch 1023b) may be associated to a pair of neighboring sense coils e.g., sense coil 106a and 106b of the sense coil array 106. In this example operation of mutual impedance sensing, the pair of switches that are closed at the same time (e.g., switches 1016a and 1023b) may be associated to a pair of neighboring sense coils e.g., sense coil 106a and 106b of the sense coil array 106. In another example operation, some pairs of switches that are closed at the same time (e.g., switches 1016a and 1023b) may be associated to pairs of neighboring sense coils (e.g., sense coils 106a and 106b), while other switch pairs (e.g., switch 1016b and switch 1023n) may be associated to non-neighboring sense coils (e.g., sense coils 106b and 106n).

In some implementations based on the circuit 1000 of FIG. 10, the object detection circuit 100 is configured to perform impedance and mutual impedance measurements with reference to FIGS. 4A, 5A and 5D for purposes as previously described with reference to FIG. 9. In one operational example, it performs an impedance measurement for each of the plurality (N) of sense circuits 104a, 104b, . . . , 104n and it performs a mutual impedance measurement for each of at least a portion (subset) of the plurality of all possible pairs ($N_{trans}$ combinations with reference to Equation (80)) of sense circuits of the plurality of sense circuits 104a, 104b, . . . , 104n to determine whether an object (e.g., object 110) is in proximity of at least one of a sense coil of the plurality of sense coils 106a, 106b, . . . , 106n.

FIG. 11 is a circuit diagram of a circuit 1100 illustrating an example implementation of a portion of an object detection circuit 100. Similar to the circuit 1000 of FIG. 10, the circuit 1100 of FIG. 11 illustrates the analog front-end circuit portion of the object detection circuit 100 of FIG. 1 and for purposes of illustration may exclude various other signal generation, processing and evaluation circuitry. As further explained below, the circuit 1100 may apply to certain impedance and mutual impedance sensing techniques as previously described with reference to FIGS. 4A, 5A, and 7A. The circuit 1100 is based on the current source voltage measurement approach as previously described in connection with FIG. 3A and may be subdivided into a driver circuit 910, a plurality of sense circuits 104a, 104b, . . . , 104n, and a measurement circuit 920 as previously described with reference to the block diagram of FIG. 9.

The circuit 1100 of FIG. 11 differs from the circuit 1000 of FIG. 10 by the driver circuit 910. The driver circuit 910 is configured to operate as a dual current source to selectively (e.g., sequentially) apply two sense current signals $I_1$ at a time to each of the plurality of sense circuits 104a, 104b, . . . , 104n. A dual current source is required in an implementation or operation of a flux compensated mutual impedance sensing technique as illustrated by FIGS. 7A and 7D or 7E. Therefore, the driver circuit 910 includes a first and second signal source 912, a first and second driver amplifier circuit 914, a first and second input multiplexer 916, and a first and second plurality of series resistors 1018. For purposes of measuring an impedance or a mutual impedance, each of the first and second signal source 912 may generate a sinusoidal signal at a common sense frequency $f_s$, but with a generally different amplitude and phase as required to compensate for the magnetic flux in a sense coil (e.g., sense coil 514) where the electrical voltage $V_2$ is measured and nullified as previously described with reference to FIG. 7A. Each of the first and second driver amplifier circuit 914 may include an identical operational amplifier 1015 (e.g., a low noise operational amplifier) and is configured to receive the sense signal from the respective signal source 912 and to provide a corresponding voltage source output with an output voltage sufficient to selectively (e.g., sequentially) drive each of the plurality of sense circuits 104a, 104b, . . . , 104n with a specified sense current $I_1$ at a sense frequency $f_s$. The first input multiplexer 916 includes a first plurality of switches 1016a, 1016b, . . . , 1016n each electrically connected to the first driver amplifier circuit 914 and to a series resistor of the first plurality of series resistors 1018. Likewise, the second input multiplexer 916 includes a second plurality of switches 1117a, 1117b, . . . , 1117n each electrically connected to the second driver amplifier circuit 914 and to a series resistor of the second plurality of series resistors 1018. As previously described with reference to FIG. 10, the first and second driver amplifier circuit 914 together with series resistors 1018 mimic a current source characteristic at each of the first and second plurality of outputs of the driver circuit 910. For more detailed descriptions of the driver circuit 910, the plurality of sense circuits 104a, 104b, . . . , 104n, and the measurement circuit 920, it is referred to the descriptions of FIG. 10.

As previously mentioned, the circuit 1100 of FIG. 11 may apply to certain impedance and mutual impedance sensing techniques e.g., as previously described with reference to FIGS. 4A, 5A, and 7A. In an operation of an object detection circuit 1100, the circuit 1100 is controlled in a manner to perform flux compensated mutual impedance sensing with reference to the circuit 700 of FIG. 7A by selectively (e.g., sequentially) applying a first current $I_1$ to a first sense circuit and a second current $I_1$ to a second sense circuit different from the first sense circuit of the plurality of sense circuits 104a, 104b, . . . , 104n and by selectively measuring an electrical voltage $V_2$ at a third sense circuit different from the first and second sense circuit in response to the first and second current $I_1$ in a time-sharing mode. In an operation based on the flux compensated mutual impedance sensing technique with reference to FIGS. 7A and 7D or 7E, a first switch of the first input multiplexer 916 (plurality of switches 1016a, 1016b, . . . , 1016n), a non-corresponding second switch of the second input multiplexer 916 (plurality of switches 1117a, 1117b, . . . , 1117n), and a non-corresponding third switch of the output multiplexer 1023 are closed sequentially in a round robin fashion. The first, second, and third switch are each associated to a different sense circuit of the plurality of sense circuits 104a, 104b, . . . , 104n. In a first time interval, a first input multiplexer switch (e.g., switch 1016a), a second input multiplexer switch (e.g., switch 1117b), and a third output multiplexer switch (e.g., switch 1023n) are closed and all other switches are open. In a second time interval, a first input multiplexer switch (e.g., switch 1016b), a second input multiplexer switch (e.g., switch 1117n) (not shown in FIG. 11), and a third output multiplexer switch (e.g., switch 1023a) are closed and all other switches are open. In a third time interval, another combination of a first input multiplexer switch, a second non-corresponding input multiplexer switch, and a third non-corresponding output multiplexer switch are closed and all other switches are open, etc. In this example operation of flux compensated mutual impedance sensing, the pair of switches that are closed at the same time (e.g., switches 1016a, 1117b, and 1023n) may be associated to a triple of neighboring sense coils e.g., sense coils 106a, 106b, and 106n, respectively, of the sense coil array 106. In another example operation, some triples of switches that are closed at the same time (e.g., switches 1016a, 1117b, and 1023n) may be associated to a triple of neighboring sense coils (e.g., sense coils 106a, 106b, and 106n), while other triples may be associated to non-neighboring sense coils.

In some implementations based on the circuit 1100 of FIG. 11, the object detection circuit 100 is configured to perform impedance and mutual impedance measurements with reference to FIGS. 4A, 5A, and 7A for purposes as previously described with reference to FIG. 9. In one operational example, it performs an impedance measurement for each of the plurality (N) of sense circuits 104a, 104b, . . . , 104n and it performs a mutual impedance measurement for each of at least a portion (subset) of the plurality of all possible triples ($N_{fcmi}$ combinations with reference to Equation (81)) of sense circuits of the plurality of sense circuits 104a, 104b, . . . , 104n to determine whether an object (e.g., object 110) is in proximity of at least one of a sense coil of the plurality of sense coils 106a, 106b, . . . , 106n.

Figure 12A:
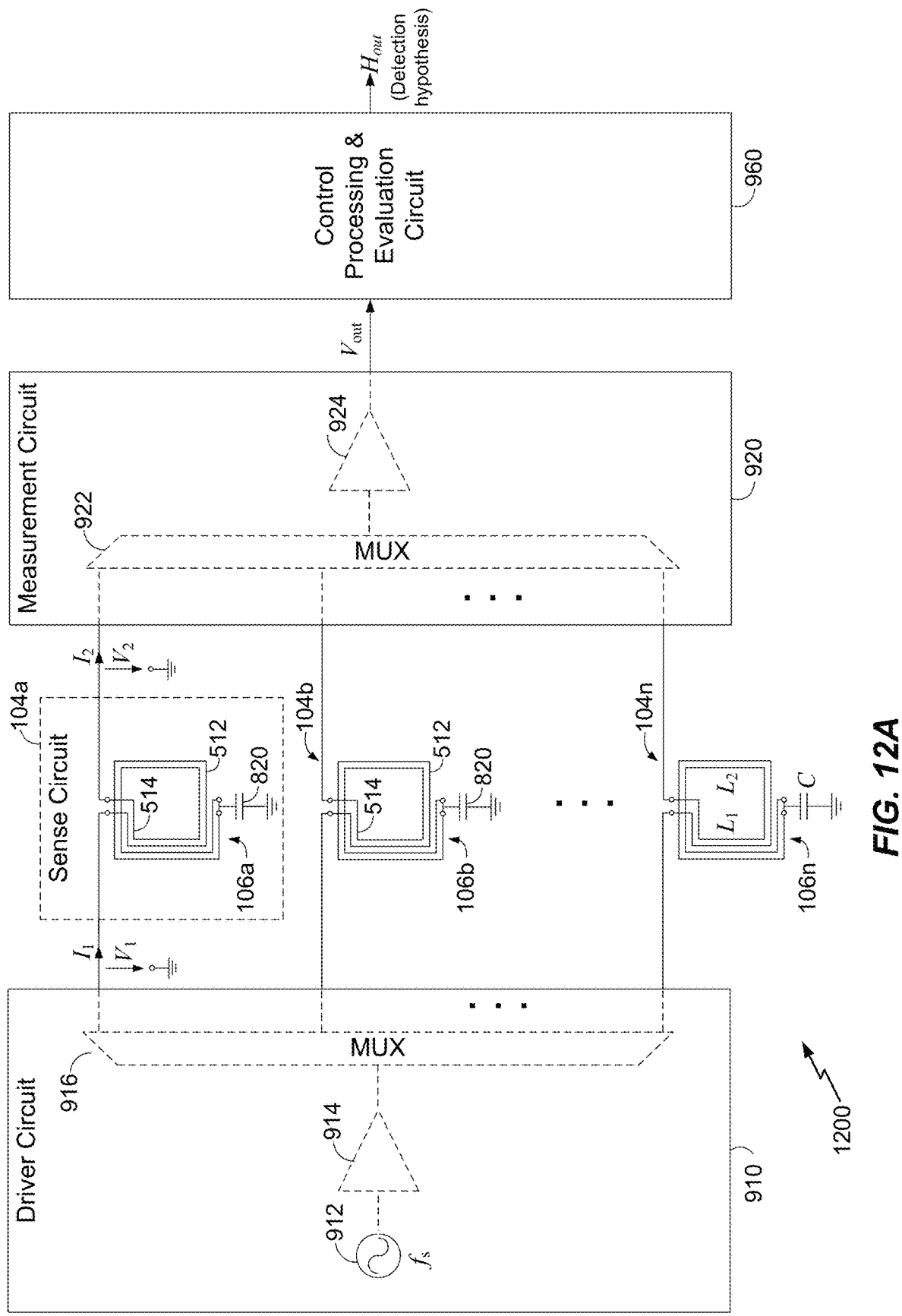
FIG. 12A is a block diagram illustrating example implementations of a portion of the object detection circuit of FIG. 1 using a plurality of sense circuits applicable to the capacitively compensated mutual impedance sensing approach of FIG. 8A.

FIG. 12A is a block diagram of a circuit 1200 illustrating example implementations of a portion of the object detection circuit 100 of FIG. 1 based on the capacitively compensated mutual impedance sensing technique as previously described with reference to FIG. 8A. The block diagram may also apply to other transimpedance (e.g., mutual impedance) sensing techniques e.g., with reference to FIGS. 5A and 5D and to various measurement approaches such as the current source voltage measurement approach as previously described in connection with FIG. 3A. The circuit 1200 as shown in FIG. 12A includes a driver circuit 910, a plurality of sense circuits 104a, 104b, . . . , 104n, a measurement circuit 920, and a control, processing & evaluation circuit 960 as previously described with reference to FIG. 9 and for purposes of illustration may exclude other circuitry (e.g., control circuit 950 with reference to FIG. 9) and electrical connections between circuits that may be needed in some implementations of the object detection circuit 100 of FIG. 1.

Each of the plurality of sense circuits 104a, 104b, . . . , 104n is configured for capacitively compensated mutual impedance sensing and has an identical circuit topology. Each sense circuit (e.g., sense circuit 104a) includes a sense element comprised of a primary sense coil 512 and a secondary sense coil 514 (e.g., planar multi-turn coils), and a capacitor 820. Capacitor 820 may also be referred to as compensation or tuning capacitor. A first terminal of capacitor 820 is electrically connected to a second terminal of each of the two sense coils 512 and 514, while its second terminal is connected to a circuit ground. The first terminal of the primary sense coil 512 is electrically connected to a respective output of the driver circuit 910 while the first terminal of the secondary sense coil 512 is electrically connected to a respective input of the measurement circuit 920. The two sense coils 512 and 514 together with capacitor 820 form a series-resonant circuit with respect to the mutual impedance as previously shown and described with reference to FIGS. 8A, 8B, 8C. If operated at a sense frequency $f_s$ near resonance, capacitor 820 compensates for the gross portion of the reactance in the mutual impedance between primary sense coil 512 and secondary sense coil 514 for purposes as previously discussed with reference to FIG. 8A.

The driver circuit 910 is electrically connected to the plurality of sense circuits 104a, 104b, . . . , 104n. In some implementations, the driver circuit 910 is configured to operate as a current source (e.g., current source 306 as described in connection with FIG. 3A) and selectively (e.g., sequentially) apply a sense current signal $I_1$ (as indicated in FIG. 12A) at a sense frequency $f_s$ to each of the plurality of sense circuits 104a, 104b, . . . , 104n. In other implementations, the driver circuit 910 is configured to operate as a voltage source e.g., as described in connection with FIG. 3A and selectively (e.g., sequentially) apply a sense voltage signal $V_1$ (as indicated in FIG. 12A) at an operating (sense) frequency $f_s$ to each of the plurality of sense circuits 104a, 104b, . . . , 104n. In yet other implementations, the driver circuit 910 is configured to operate as any source that may be characterized neither by a current source nor a voltage source. In certain implementations or operations, the driver circuit 910 is configured to generate and apply more than one current $I_1$ or voltage $V_1$ at a time for purposes as previously discussed in connection with FIG. 9. To accomplish selective driving of each of the plurality of sense circuits 104a, 104b, . . . , 104n, the driver circuit 910 may include components such as at least one signal source 912 (e.g., generating the sinusoidal sense signal with a defined frequency $f_s$, amplitude and phase), at least one driver amplifier circuit 914, and at least one input multiplexer circuit 916.

The measurement circuit 920 is electrically connected to each of the plurality of sense circuits 104a, 104b, . . . , 104n. In some implementations, the measurement circuit 920 is configured to selectively (e.g., sequentially) measure an electrical voltage $V_2$ (as indicated in FIG. 12A) in each of the plurality of sense circuits 104a, 104b, . . . , 104n in response to the current $I_1$ being applied by the driver circuit 910 to the respective sense circuit and to provide a measurement output $V_{out}$ proportional to the electrical voltage $V_2$. In other implementations, the measurement circuit 920 is configured to selectively (e.g., sequentially) measure an electrical current $I_2$ (as indicated in FIG. 12A) in each of the plurality of sense circuits 104a, 104b, . . . , 104n in response to the voltage $V_1$ being applied by the driver circuit 910 to the respective sense circuit and to provide a measurement output $V_{out}$ proportional to the electrical current $I_2$. In certain implementations or operations, the measurement circuit 920 is configured to measure more than one voltage $V_2$ or electrical current $I_2$ at a time and to provide more than one respective measurement output $V_{out}$ for purposes as previously discussed in connection with FIG. 9. To accomplish selective measurement of an electrical voltage $V_2$ or electrical current $I_2$ in each of the plurality of sense circuits 104a, 104b, . . . , 104n, the measurement circuit 920 may include components such as at least one output multiplexer circuit 922 and at least one measurement amplifier circuit 924. In some implementations e.g., based on the current source voltage measurement approach, the at least one measurement amplifier circuit 924 may be configured to provide a sufficiently high input impedance as needed for a quasi-ideal voltage measurement e.g., as defined with reference to FIG. 3A and low noise in its measurement output $V_{out}$. In other implementations e.g., based on the voltage source current measurement approach, the at least one measurement amplifier circuit 924 may be configured to provide a sufficiently low input impedance as needed for a quasi-ideal current measurement e.g., as defined with reference to FIG. 3A and low noise in its measurement output $V_{out}$. The at least one multiplexer circuit 922 may be electrically connected between the input of the respective measurement amplifier circuit 924 and the plurality of sense circuits 104a, 104b, . . . , 104n and is configured to selectively connect each of the plurality of sense circuits 104a, 104b, . . . , 104n to the input of the respective measurement amplifier circuit 922.

The control, processing & evaluation circuit 960 is configured to provide further signal processing and evaluation of the acquired measurement data. As previously discussed in connection with FIG. 9, it may be configured to provide analog-to-digital signal conversion, frequency selective filtering, synchronous detection, combining outputs, summation of outputs, averaging of outputs, scaling of outputs, correction of outputs, evaluation of sequences (time-series) and/or patterns of outputs indicative of an impedance and/or transimpedance (e.g., mutual impedance), etc. and eventually to decide whether an object (e.g., object 110 of FIG. 3A) is proximate to at least one sense element of the plurality of sense elements 106a, 106b, . . . , 106n based on a change in a transimpedance (e.g., capacitively compensated mutual impedance) and to output at least a detection hypothesis $H_{out}$ as indicated in FIG. 12A.

Figure 12B:
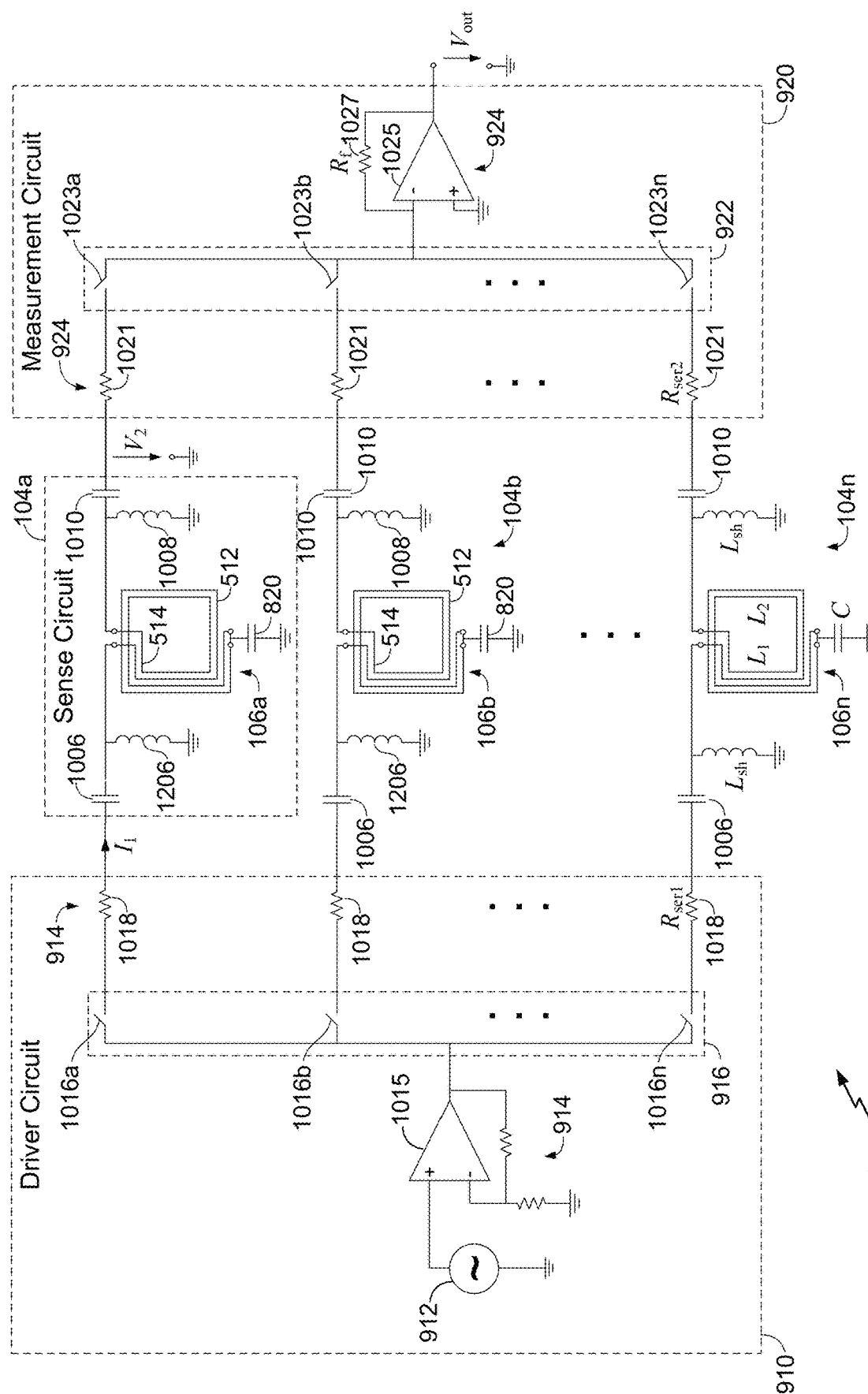
FIG. 12B is a circuit diagram illustrating an example implementation of the generic circuit of FIG. 12A based on the current source voltage measurement approach.

FIG. 12B is a circuit diagram of a circuit 1210 illustrating an example implementation of a portion of the circuit 1200 of FIG. 12A. Similar to the circuit 1000 of FIG. 10 and the circuit 1100 of FIG. 11, the circuit 1210 illustrates the analog front-end circuit portion of the object detection circuit 100 of FIG. 1 and for purposes of illustration may exclude various other signal generation, processing and evaluation circuitry. Similar to the circuit 1200 of FIG. 12A, the circuit 1210 applies to the capacitively compensated mutual impedance sensing technique as previously described with reference to FIG. 8A but may also apply to other transimpedance sensing techniques e.g., with reference to FIGS. 5A and 5D. The circuit 1210 is based on the current source voltage measurement approach as previously described in connection with FIG. 3A and includes the driver circuit 910, the plurality of sense circuits 104a, 104b, . . . , 104n, and the measurement circuit 920 as previously described with reference to the block diagram of FIGS. 9 and 12A.

Each sense circuit of the plurality of sense circuits 104a, 104b, . . . , 104n is configured for capacitively compensated mutual impedance sensing and have an identical circuit topology. Therefore, descriptions given below for the sense circuit 104a also apply to the other sense circuits (e.g., 104b, ..., 104n).

The sense circuit 104a includes a sense element comprised of a primary sense coil 512 and a secondary sense coil 514 (e.g., planar multi-turn coils), a first capacitor 820, a first shunt inductor 1206, a second capacitor 1006, a second shunt inductor 1008, and a third capacitor 1010. The first capacitor 820 may also be referred to as the compensation or tuning capacitor is electrically connected to a second terminal of each of the two sense coils 512 and 514 forming a series-resonant circuit with respect to the mutual impedance as previously described with reference to FIG. 8A. If operated at a sense frequency $f_s$ near resonance, the first capacitor 820 compensates for the gross portion of the reactance in the mutual impedance between primary sense coil 512 and secondary sense coil 514 for purposes as previously discussed with reference to FIG. 8A. The first terminal of the primary sense coil 512 is electrically connected to a respective output of the driver circuit 910 via the second capacitor 1006 while the first terminal of the secondary sense coil 512 is electrically connected to a respective input of the measurement circuit 920 via the third capacitor 1010.

In some implementations, capacitors 820, 1006, and 1010 may be of a type with a low temperature coefficient providing high thermal stability (e.g., a NP0-type capacitor) reducing thermal drift of the transimpedance (e.g., capacitively compensated mutual impedance) as measured in each of the plurality of sense circuits 104a, 104b, ..., 104n.

Moreover, as previously mentioned in connection with the circuit 800 of FIG. 8A, the first capacitor 820 may act as a high pass filter to attenuate the high voltages that may be induced into the sense coils 512 and 514 by the strong magnetic fields associated with the wireless power transfer at a frequency $f_{wpt}$. Therefore, the first capacitor 820 may also serve for protecting the sense coils 512 and 514, the components of the driver circuit 910 and the measurement circuit 920 e.g., from damage by excessive current flow, consequent heating effects, overloading, or surpassing some voltage limits. To more effectively attenuate any signal component at wireless power transfer frequency $f_{wpt}$ and low frequency harmonics thereof in the current $I_1$, a shunt inductor 1206 is connected in parallel to (across) the series circuit of capacitor 820 and primary sense coil 512 as shown in FIG. 12. The capacitor 820 together with the shunt inductor 1206 form a $2^{nd}$ order high pass filter that is potential to attenuate these low frequency signal components in the current $I_1$ to a level e.g., significantly below the current level at sense frequency $f_s$ (e.g., in the MHz range). Therefore, this high pass filter may protect the driver amplifier circuit 914 and the multiplexer circuit 916 and may also reduce any cross-modulation effects between any low frequency signals at the wireless power transfer frequency $f_{wpt}$ and harmonics thereof and the sense signal at frequency $f_s$. Cross-modulation may be produced by residual non-linear effects in the driver circuit 910. Likewise, a shunt inductor 1008 is connected in parallel to (across) the series circuit of capacitor 820 and the secondary sense coil 514 as shown in FIG. 12B to more effectively attenuate any signal component at the wireless power transfer frequency $f_{wpt}$ and low frequency harmonics thereof in the electrical voltage $V_2$ at the input of the voltage measurement amplifier circuit 920. Therefore, this high pass filter may substantially reduce dynamic range requirements in the measurement circuit 920 and in a further processing (e.g., ADC) e.g., as part of the control, processing & evaluation circuit 960 with reference to FIG. 9. The shunt inductor 1008 may also reduce any cross-modulation effects between any low frequency signals at the wireless power transfer frequency $f_{wpt}$ and harmonics thereof and the sense signal at frequency $f_s$ (e.g., in the MHz range). Cross-modulation may be produced by residual non-linear effects in the measurement circuit 920. At sense frequencies $f_s$, the primary and secondary side high pass filters of the sense circuit 104a may exert a minor impact on the voltage (transimpedance) measurement and which may be corrected (compensated for) in a further processing (e.g., in the control, processing & evaluation circuit 960 with reference to FIG. 9). Any phase shift caused by these high pass filters may be determined e.g., by performing a transimpedance calibration with respect to the angle e.g., $\arg\{Z_{12c}\}$ as previously mentioned with reference to FIGS. 8A and 9.

As previously discussed in connection with FIG. 10, the second capacitor 1006 may be needed in some implementations to block any residual DC flow at the output of the driver circuit 910 (e.g., due to a DC offset). In some aspects, the capacitor 1006 may also help to attenuate any residual low frequency current component (e.g., at a wireless power frequency $f_{wpt}$ and low frequency harmonics thereof) at the output of the driver circuit 910. Moreover, in some implementations, it may be also used to compensate or partially compensate for the effect of the reactance of shunt inductor 1206 in the measured transimpedance $Z_{12c}=V_2/I_1$. Likewise, the third capacitor 1010 may be needed in some implementations to block any residual DC flow at the input of the measurement circuit 920 (e.g., due to a DC offset). In some aspect, the capacitor 1010 may also help to attenuate any residual low frequency voltage component (e.g., at a wireless power frequency $f_{wpt}$ and low frequency harmonics thereof) at the input of the measurement circuit 920. Moreover, in some implementations, it may be also used to compensate or partially compensate for the effect of the reactance of shunt inductor 1008 in the measured transimpedance $Z_{12c}$.

The exemplary implementations of the driver circuit 910 and the measurement circuit 920 as shown in FIG. 12B are not further described herein as they may be identical to the driver circuit 910 and the measurement circuit 920 of FIG. 10.

In some implementations of a circuit 1210 of FIG. 12B, sense coil 512 and 514 are tightly coupled as previously discussed with reference to FIG. 8A and FIG. 5F. In this special case, the mutual inductance $M_{12}$ approaches the self-inductance $L_1$ or $L_2$ of the sense coil 512 or 514, respectively, as expressed by Equation (77). As a consequence, capacitor 820 compensates for the mutual reactance between sense coil 512 and 514 as well as for the self-reactance of the individual sense coils 512 and 514 substantially at the same frequency. In other words, resonance with respect to the mutual inductance $M_{12}$ occurs substantially at the same frequency as resonance with respect to each of the self-inductances $L_1$ and $L_2$. If tuned on resonance, the load impedance as presented by the sense circuit 104a to the driver circuit 910 is low and substantially equals the loss resistance $R_1$ of the primary sense coil 512 as shown in the equivalent circuit of FIG. 8B. For a given output voltage of the driver amplifier circuit 914 and a given resistance $R_{ser1}$ of series resistor 1018, a low load impedance (e.g., substantially equal to the loss resistance $R_1$ and $R_1 \ll R_{ser1}$) may be beneficial to satisfy the requirements of a quasi-ideal current source as evident from Equation (82). Likewise, if tuned on resonance, the source impedance that is presented by the sense circuit 104a to the measurement circuit 920 is low and substantially equals the loss resistance $R_2$ of the secondary sense coil 514 as shown in the equivalent circuit of FIG. 8B. For a given configuration of the measurement amplifier circuit 924 and a given resistance $R_{ser2}$ of series resistor 1021, a low source impedance (e.g., substantially equal to the loss resistance $R_2$ and $R_2 \ll R_{ser2}$) may be beneficial to satisfy the requirements of a quasi-ideal voltage measurement circuit as evident from Equation (82) if $R_1$ is replaced by $R_2$.

An exemplary circuit 1210 designed for a nominal sense frequency $f_s$=3 MHz may use a sense coil 512 and 514 with substantially equal inductance $L_1 \cong L_2$=5 µH and loss resistance $R_1 \cong R_2$=3Ω, a compensation capacitor 820 with a capacitance C=560 pF, and shunt inductors 1006 and 1010 with an inductance $L_{sh}$=5 µH, an operational amplifier 1015 with an output voltage constraint of 3 Vrms, a plurality of series resistors 1018 with a resistance $R_{ser1}$=100Ω, and a plurality of resistors 1021 with a resistance $R_{ser1}$=150Ω. This exemplary circuit 1200 may provide a figure of merit for the driver circuit 910 of 34.3 with reference to Equation (82) and a figure of merit for the measurement circuit 920 with reference to Equation (83) of 0.02 as for the circuit 1000 of FIG. 10.

Figures 13A, 13B:
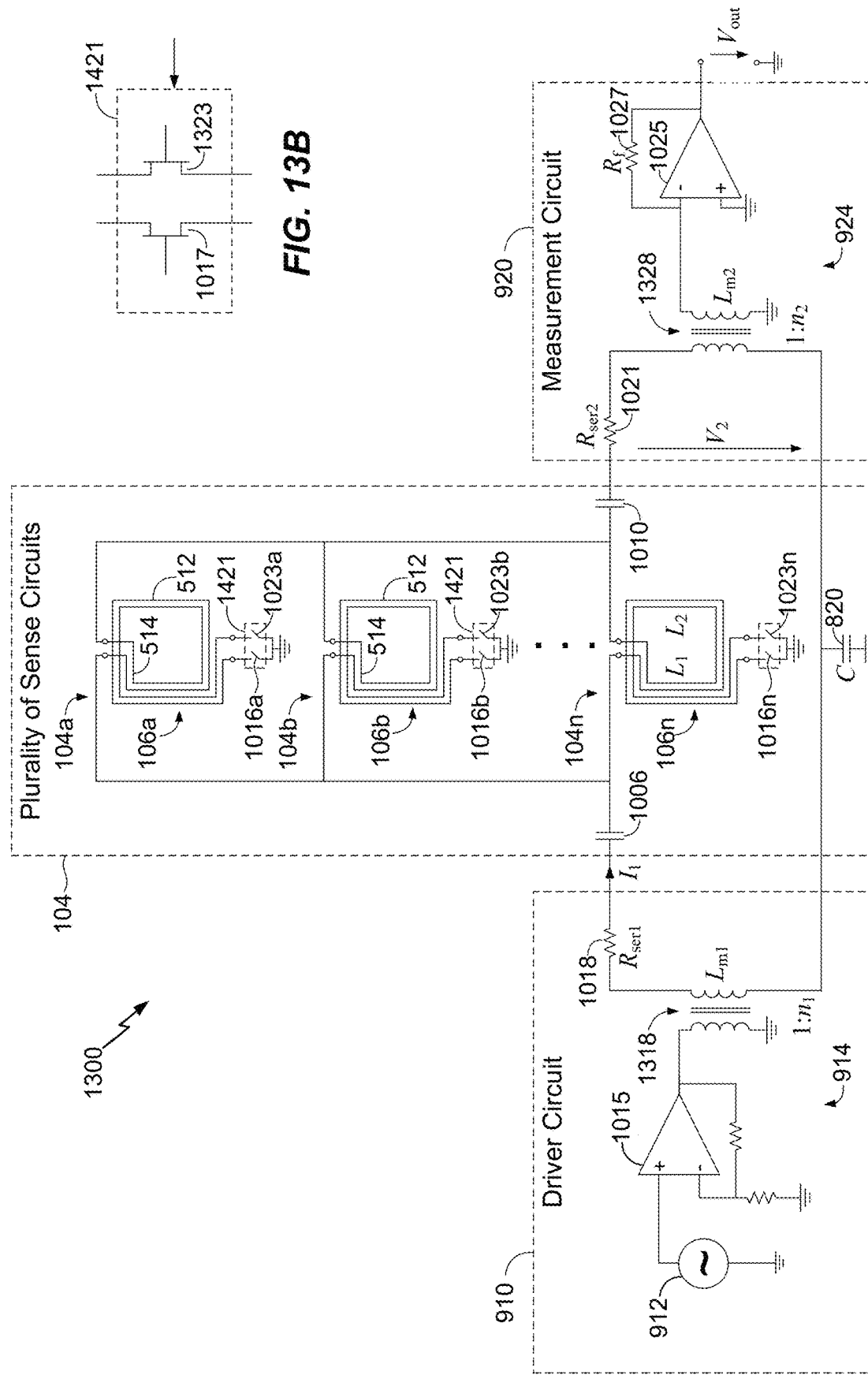
FIG. 13A is a circuit diagram illustrating another example implementation of a portion of the object detection circuit of FIG. 1 using a plurality of sense circuits applicable to the capacitively compensated mutual impedance sensing approach of FIG. 8A.
FIG. 13B is a detail view illustrating a FET multiplexer switch cell of the circuit of FIG. 13A.

FIG. 13A is a circuit diagram of an alternative implementation (circuit 1300) of a portion of the object detection circuit 100 of FIG. 1 based on the capacitively compensated mutual impedance sensing technique using the current source voltage measurement approach. Similar to the circuit 1000 of FIG. 10, the circuit 1300 illustrates the analog front-end circuit portion of the object detection circuit 100 of FIG. 1 and for purposes of illustration may exclude various other signal generation, processing and evaluation circuitry. The circuit 1300 differs from the circuit 1210 of FIG. 12B by the implementation of the driver circuit 910, the plurality of sense circuits 104, and the measurement circuit 920. It uses less components and may therefore provide a BOM cost advantage over the circuit 1210 of FIG. 12B as explained in more detail below.

Each sense circuit (e.g., sense circuit 104a) of the plurality of sense circuits 104 includes a sense element (e.g., sense element 106a) comprised of a primary sense coil 512 and a secondary sense coil 514. Each sense circuit (e.g., sense circuit 104a) includes a switch cell 1421 including a first switch (e.g., switch 1016a) and a second switch (e.g., switch 1023a) of the input and output multiplexer 916 and 922 (with reference to FIG. 9), respectively. As compared to the circuit 900 of FIG. 9, the circuit 1300 of FIG. 13A considers multiplexers 916 and 922 as part of the plurality of sense circuits 104. The plurality of sense circuits 104 further includes a first capacitor 820 (compensation capacitor), a second capacitor 1006, and a third capacitor 1010. As opposed to the circuit 1200 of FIG. 12, first, second, and third capacitors of the circuit 1300 of FIG. 13A are common to the plurality of sense circuits 104. A first terminal of each of the plurality of primary sense coils 512 is electrically connected to a first terminal of capacitor 1006, while a first terminal of each of the plurality of secondary sense coils 512 is electrically connected to a first terminal of capacitor 1010. The second terminal of each of the plurality of primary sense coils 512 is electrically connected to a first terminal of a respective switch (e.g., switch 1016a) of the plurality of switches 1016a, 1016b, . . . , 1016n, while the second terminal of each of the plurality of secondary sense coils 514 is electrically connected to a first terminal of a respective switch (e.g., switch 1023a) of the plurality of switches 1023a, 1023b, . . . , 1023n. The second terminal of each of the plurality of switches 1016a, 1016b, . . . , 1016n and the plurality of switches 1023a, 1023b, . . . , 1023n is electrically connected to the circuit ground. Moreover, the plurality of sense circuits 104 provides an input port and output port, each having a first and a second terminal. Input and output port are common to the plurality of sense circuits. As opposed to the circuit 1200 of FIG. 12, the input port and the output port are common to the plurality of sense circuits 104a, 104b, . . . , 104n. The input port may be also referred to as the driver port and the output port to the measurement port. The first terminal of the input port corresponds to the second terminal of capacitor 1006, while the first terminal of the output port corresponds to the second terminal of capacitor 1010. The second terminal of the input port and the second terminal of the output port correspond to a first terminal of capacitor 820, while the second terminal of capacitor 820 is electrically connected to circuit ground.

The driver circuit 910 is electrically connected to the common input port of the plurality of sense circuits 104. It includes a signal source 912, a driver amplifier circuit 914, and a series resistors 1018 common. The driver circuit 910 is configured to operate as a current source (e.g., current source 306 as described in connection with FIG. 3A) and selectively (e.g., sequentially) apply a sense current signal $I_1$ at an operating (sense) frequency $f_s$ to each of the plurality of sense circuits 104a, 104b, . . . , 104n. The signal source 912 generates the sense signal e.g., a sinusoidal sense signal with a defined frequency $f_s$, amplitude and phase. The driver amplifier circuit 914 as illustrated in FIG. 13A includes an operational amplifier 1015 (e.g., a low noise operational amplifier) and a transformer 1318 (e.g., a balun transformer), and is configured to receive the sense signal from signal source 912 and to provide a corresponding voltage source output with an output voltage sufficient to selectively (e.g., sequentially) drive each of the plurality of sense circuits 104a, 104b, . . . , 104n with a specified sense current $I_1$ at a sense frequency $f_s$. The transformer 1318 is configured to convert the unbalanced (asymmetrical) output of the operational amplifier 1015 to a balanced (symmetrical) output for selectively driving each of the plurality of sense circuits 104a, 104b, . . . , 104n including the common (compensation) capacitor 820. In some implementations, the transformer is a 1:1 transformer. In other implementations, it transforms the voltage by a ratio 1:2 or by any other ratio 1:$n_1$. The driver amplifier circuit 914 together with series resistors 1018 mimic a current source characteristic at the output of the driver circuit 910 as previously described in connection with FIG. 10.

The measurement circuit 920 includes a series resistor 1021 and a measurement amplifier circuit 924. The measurement circuit 920 is configured to selectively (e.g., sequentially) measure an electrical voltage $V_2$ in each of the plurality of sense circuits 104a, 104b, . . . , 104n including the common compensation capacitor 820 and to provide a measurement output $V_{out}$ proportional to the respective electrical voltage $V_2$ at a level suitable for further processing e.g., in the control, processing & evaluation circuit 960 with reference to FIG. 9. The measurement amplifier circuit 924 as illustrated in FIG. 10 includes an operational amplifier 1025 (e.g., a low noise operational amplifier) and a transformer 1328 (e.g., a balun transformer) and is configured to operate as a transimpedance amplifier using feedback resistor 1027. The transformer 1328 is configured to convert the unbalanced (asymmetrical) input of the operational amplifier 1025 to a balanced (symmetrical) input at the measurement amplifier circuit for selectively measuring an electrical voltage $V_2$ in each of the plurality of sense circuits 104a, 104b, . . . , 104n including the common (compensation) capacitor 820. In some implementations, the transformer is a 1:1 transformer. In other implementations, it transforms the voltage by a ratio 1:2 or by any other ratio 1:$n_2$. As previously described in connection with FIG. 10, the measurement amplifier circuit 924 together with series resistors 1021 mimic a quasi-ideal voltage measurement circuit 304 with reference to FIG. 3A to selectively (e.g., sequentially) measure the electrical voltage $V_2$ at each of the plurality of sense circuits 104a, 104b, . . . , 104n including the common (compensation) capacitor 820. They form together a sign inverting voltage amplifier with an output $V_{out}$ proportional to the sign inverse of the voltage $V_2$.

In an operation of the circuit 1300, both switches of each of the plurality of switch cells 1421 including switches 1016a and 1023a, 1016b and 1023b, . . . , 1016n and 1023n are selectively (e.g., sequentially) closed to apply a sense current signal $I_1$ to the corresponding sense circuit (e.g., sense circuit 104a) of the of the plurality of sense circuits 104a, 104b, . . . , 104n including the common (compensation) capacitor 820. In a first time interval, a first input multiplexer switch (e.g., switch 1016a) and a corresponding output multiplexer switch (e.g., switch 1023a) are closed and all other switches are open. In a second time interval, a second input multiplexer switch (e.g., switch 1016b) and a corresponding output multiplexer switch (e.g., switch 1023b) are closed and all other switches are open. In a third time interval, a third input multiplexer switch (e.g., 1016n) and a corresponding output multiplexer switch (e.g., 1023n) are closed and all other switches are open, etc. For example, if the switches 1016a and 1023a are closed and all other switches are open, the primary sense coil 512 of the sense element 106a is driven with a sense current $I_1$ and the electrical voltage $V_2$ as indicated in FIG. 13A at the common output port of the plurality of the sense circuits 104 corresponds to the sum of the voltage across the secondary sense coil 514 of sense circuit 104a and the voltage across compensation capacitor 820. If additionally the sense frequency $f_s$ is adjusted for resonance with respect to the mutual impedance of the sense circuit 104a, the voltage across capacitor 820 substantially compensates for the voltage across sense coil 514 so that the electrical voltage $V_2$ at the common output port of the plurality of sense circuits 104 becomes a minimum. In other words, the mutual reactance between sense coil 512 and 514 of sense circuit 104a is compensated for by the reactance of capacitor 820. If switches 1016b and 1023b are closed and all other switches are open and if the sense frequency $f_s$ is adjusted for resonance with respect to the mutual impedance of the sense circuit 104b, the mutual reactance between sense coil 512 and 514 of the sense circuit 104b is compensated for by the reactance of capacitor 820 and the electrical voltage $V_2$ at the common output port of the plurality of sense circuits 104 becomes a minimum, etc.

In another operation of the circuit 1300, a sense current signal $I_1$ is selectively (e.g., sequentially) applied to each (e.g., sense circuit 104a) of the plurality of sense circuits 104 including the common (compensation) capacitor 820 and the electrical voltage $V_2$ is selectively measured in a sense circuit (e.g., sense circuit 104b) different from the sense circuit where the current $I_1$ is applied. In this operation, the mutual impedance between a sense coil 512 of a first sense circuit (e.g., 104a) and a sense coil 514 of a second sense circuit (e.g., 104b) is measured for detecting presence of an object in proximity of at least one of the sense coils. In a first time interval of an example operation based on crosscoupling between sense coils of different sense circuits, a first input multiplexer switches (e.g., switch 1016a) and a non-corresponding output multiplexer switch (e.g., switch 1023b) are closed and all other switches are open. In a second time interval, a second input multiplexer switch (e.g., switch 1016b) and a non-corresponding output multiplexer switch (e.g., switch 1023n) are closed and all other switches are open. In a third time interval, a third input multiplexer switch (e.g., switch 1016n) and a non-corresponding output multiplexer switch are closed, and all other switches are open, etc. For example, if the switches 1016a and 1023b are closed and all other switches are open, the primary sense coil 512 of the sense circuit 104a is driven with a sense current $I_1$ and the electrical voltage $V_2$ as indicated in FIG. 13A at the common output port of the plurality of the sense circuits 104 corresponds to the sum of the voltage across the secondary sense coil 514 of the sense circuit 104b and the voltage across compensation capacitor 820. If additionally, the sense frequency $f_s$ is adjusted for resonance with respect to the mutual impedance between sense coil 512 of the sense circuit 104a and sense coil 514 of the sense circuit 104b, the voltage across capacitor 820 substantially compensates for the voltage across sense coil 514 of the sense circuit 104b so that the electrical voltage $V_2$ at the common output port of the plurality of sense circuits 104 becomes a minimum. In other words, the mutual reactance between sense coil 512 of the sense circuit 104a and sense coil 514 of the sense circuit 104b is compensated for by the reactance of capacitor 820. If switches 1016b and 1023n are closed and all other switches are open and if the sense frequency $f_s$ is adjusted for resonance with respect to the mutual impedance between sense coil 512 of the sense circuit 104b and sense coil 514 of the sense circuit 104n, the mutual reactance between sense coil 512 of the sense circuit 104b and sense coil 514 of the sense circuit 104c is compensated for by the reactance of capacitor 820 and the electrical voltage $V_2$ at the common output port of the plurality of sense circuits 104 becomes a minimum, etc.

It may be appreciated that the first (compensation) capacitor 820 may also act as a high pass filter to attenuate the high voltages that may be induced into the sense coils 512 and 514 by the strong magnetic fields associated with the wireless power transfer at a frequency $f_{wpt}$. Therefore, the first capacitor 820 may also serve for protecting the sense coils 512 and 514 of each of the plurality of sense elements 106a, 106b, . . . , 106n, each of the plurality of the multiplexer switch cells 1421, components of the driver circuit 910 and the measurement circuit 920 e.g., from damage by excessive current flow, consequent heating effects, overloading, or surpassing some voltage limits. To more effectively attenuate any signal component at wireless power transfer frequency $f_{wpt}$ and low frequency harmonics thereof in the current $I_1$, the transformer 1318 of the driver circuit 910 may be configured to provide a relatively low main inductance that appears in parallel to (across) the series circuit of capacitor 820 and the primary sense coil 512 of the selected sense circuit (e.g., sense circuit 104a). The capacitor 820 together with the transformer's 1318 main inductance form a $2^{nd}$ order high pass filter that is potential to attenuate these low frequency signal components in the current $I_1$ to a level e.g., significantly below the current level at sense frequency $f_s$ (e.g., in the MHz range). The circuit 1300 may provide similar attenuation to the circuit 1200 of FIG. 12 using capacitor 820 and shunt inductor 1206. Therefore, this high pass filter may protect the driver amplifier circuit 914 as well as the plurality of switches 1016a, 1016b, . . . , 1016n and may also reduce any cross-modulation effects as previously discussed in connection with FIG. 10. Likewise, transformer 1328 of the measurement circuit 920 may be configured to provide a relatively low main inductance that appears in parallel to (across) the series circuit of capacitor 820 and the secondary sense coil 514 of the selected sense circuit (e.g., sense circuit 104a) to more effectively attenuate any signal component at the wireless power transfer frequency $f_{wpt}$ and low frequency harmonics thereof in the electrical voltage $V_2$ at the input of the voltage measurement amplifier circuit 920. The circuit 1300 may provide similar attenuation to the circuit 1200 of FIG. 12 using capacitor 820 and shunt inductor 1008. Therefore, this high pass filter may substantially reduce dynamic range requirements in the measurement circuit 920 and in a further processing (e.g., ADC) e.g., as part of the control, processing & evaluation circuit 960 with reference to FIG. 9. The shunt inductor 1008 may also reduce any cross-modulation effects between any low frequency signals at the wireless power transfer frequency $f_{wpt}$ and harmonics thereof and the sense signal at frequency $f_s$ (e.g., in the MHz range) as previously discussed in connection with FIG. 10. At sense frequencies $f_s$, these high pass filters that are effective at the common input and output of the plurality of sense circuits 104 may exert a minor impact on the transimpedance measurement and may be corrected (compensated for) in a further processing (e.g., in the control, processing & evaluation circuit 960 with reference to FIG. 9). Any phase shift caused by these high pass filters may be determined e.g., by performing a transimpedance calibration with respect to the angle e.g., $\arg\{Z_{12c}\}$ as previously mentioned with reference to FIGS. 8A and 9.

As previously discussed in connection with FIG. 10, the second capacitor 1006 may be needed in some implementations to block any residual DC flow at the output of the driver circuit 910 (e.g., due to a DC offset). In some aspect, the capacitor 1006 may also help to attenuate any residual low frequency current component (e.g., at a wireless power frequency $f_{wpt}$ and low frequency harmonics thereof) at the output of the driver circuit 910. Moreover, in some implementations, it may be also used to compensate or partially compensate for the effect of the reactance of the transformer's 1318 main inductance in the measured transimpedance $Z_{12c}=V_2/I_1$. Likewise, the third capacitor 1010 may be needed in some implementations to block any residual DC flow at the input of the measurement circuit 920 (e.g., due to a DC offset). In some aspect, the capacitor 1010 may also help to attenuate any residual low frequency voltage component (e.g., at a wireless power frequency $f_{wpt}$ and low frequency harmonics thereof) at the input of the measurement circuit 920. Moreover, in some implementations, the capacitor 1010 may be also used to compensate or partially compensate for the effect of the reactance of the transformer's 1328 main inductance in the measured transimpedance $Z_{12}c$.

In some implementations, capacitors 820, 1006, and 1010 may be of a type with a low temperature coefficient providing high thermal stability (e.g., a NP0-type capacitor) reducing thermal drift of the transimpedance (e.g., capacitively compensated mutual impedance) as measured e.g., in each of the plurality of sense circuits 104a, 104b, . . . , 104n including capacitor 820.

In an example implementation of the circuit 1300 of FIG. 13A designed for a nominal sense frequency $f_s$=3 MHz, an operational amplifier 1015 with an output voltage constraint of 3 Vrms, a series resistor 1018 with a resistance $R_{ser1}$=100Ω, a transformer 1318 with a turns ratio of 1:$n_1$=1:1 and a main inductance of $L_{m1}$=5 μH, a tightly coupled primary and secondary sense coil 512 and 514 (coupling factor $|k_{12}|>0.9$) with an inductance $L_1=L_2$=5 μH, a series resistor 1012 with a resistance $R_{ser2}$=150Ω, a compensation capacitor 820 with a capacitance C=560 pF, a transformer 1328 with a turns ratio of 1:$n_1$=1:1 and a main inductance of $L_{m2}$=5 μH, and a measurement amplifier circuit with a feedback resistor with a resistance $R_f$=590Ω may be used.

As opposed to the circuit 1200 of FIG. 12, capacitors 820, 1006, 1010, series resistors 1018 and 1328, and transformers 1318 and 1328 (replacing shunt inductors 1206 and 1008, respectively) are common to the plurality of sense circuits 104a, 104b, . . . , 104n, which may provide a BOM cost advantage over the circuit 1200 of FIG. 12.

In some implementations, a switch cell 1421 includes a pair of FETs as illustrated by the detail view of FIG. 13B. Since one terminal of each FET is electrically connected to ground as shown in FIG. 13A, it may be appreciated that the gate drive circuit (not shown in FIGS. 13A and 13B) may be less complex compared to a non-ground connected analog switch (e.g., a complementary FET switch) as needed for the circuit 1200 of FIG. 12. It may be also appreciated that the on-state resistance of the FET switches (e.g., switch 1016a and 1023a) may be uncritical for the functioning of the driver circuit 910 and the measurement circuit 920 since it merges into an overall series resistance $R_{ser1}$ and $R_{ser2}$, respectively.

Figure 14:
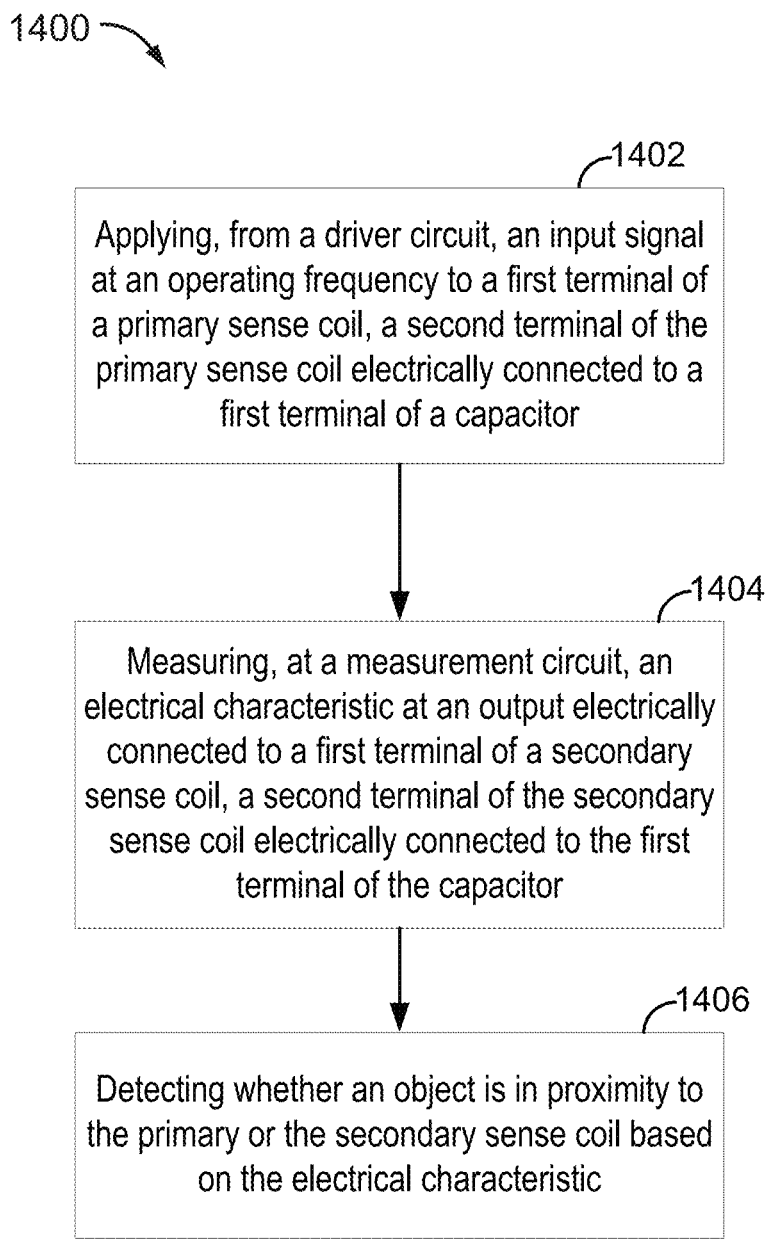
FIG. 14 is a flow diagram of an example of a method for detecting objects.

FIG. 14 is a flow diagram illustrating an example of a method 1400 for detecting objects. The method is described with reference to FIG. 12A, however the techniques described may be implemented using any of the previously described elements of the example environment, components, or circuits. Reference to elements is made by example only and is not intended to limit the ways in which the techniques can be implemented. Operations of a method may be repeated, combined, separated, omitted, performed in alternate orders, performed concurrently, or used in conjunction other methods illustrated in FIG. 14. At operational block 1402, the method 1400 includes applying, from a driver circuit 910, an input signal at an operating frequency to a first terminal of a primary sense coil 512, a second terminal of the primary sense coil 512 electrically connected to a first terminal of a capacitor 820. At operational block 1404, the method 1400 further includes measuring, at a measurement circuit 920, an electrical characteristic at an output electrically connected to a first terminal of a secondary sense coil 514, a second terminal of the secondary sense coil electrically connected to the first terminal of the capacitor 820. At operational block 1406, the method 1400 further includes detecting whether an object is in proximity to the primary or the secondary sense coil 512 and 514 based on the electrical characteristic.

As described above the implementations of the object detection circuit 100 of FIG. 1 described above may be implemented in the context of an inductive wireless power transfer system, and in particular a wireless electrical vehicle charging system where it may be desirable to detect objects that may experience inductive heating due to the magnetic field used for power transfer.

Figure 15:
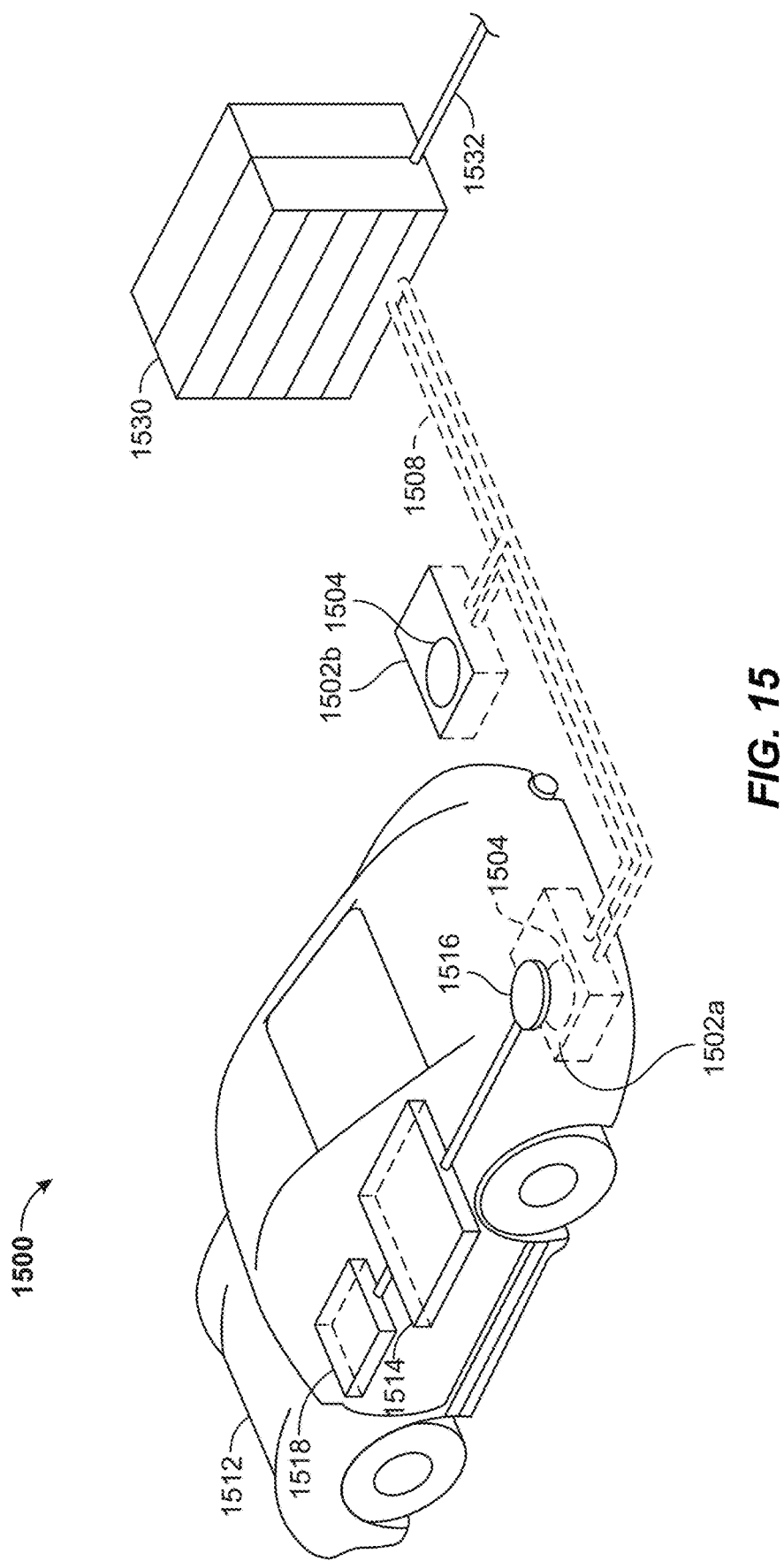
FIG. 15 is a perspective view illustrating a wireless charging system for charging an electric vehicle in which any of the elements/functionality described with reference to FIGS. 1-14 may be implemented.

FIG. 15 illustrates a wireless charging system 1500 for charging an electric vehicle in which any of the elements/functionality described with reference to FIGS. 1-14 may be implemented.

The wireless charging system 1500 enables charging of an electric vehicle 1512 while the electric vehicle 1512 is parked so as to wirelessly couple power from a base wireless power transfer unit 1502a. The base wireless power transfer unit 1502a may correspond to the wireless power transfer system 200 as described with reference to FIG. 2A (e.g., and particularly incorporate the base-side (e.g., transmit) wireless power transfer structure 224 shown in FIG. 2A or 2B).

Spaces for two electric vehicles are illustrated in a parking area to be parked over corresponding base wireless power transfer units 1502a and 1502b. In some implementations, a local distribution center 1530 may be connected to a power backbone 1532 and configured to provide an alternating current (AC) or a direct current (DC) supply through a power link 1508 to the base wireless power transfer units 1502a and 1502b. Each of the base wireless power transfer units 1502a and 1502b also includes a base coil 1504 for wirelessly transferring power. The base coil 1504 may correspond to the coil 226 of the base wireless power transfer structure 224 as described with reference to FIGS. 2A and 2B. As described above the any of the object detection systems described above with respect to FIGS. 1-14 may be integrated into the base wireless power transfer units 1502a and 1502b.

The electric vehicle 1512 may include a battery unit 1518, an electric vehicle coil 1516, and an electric vehicle wireless power transfer unit 1514. The electric vehicle coil 1516 may correspond to the coil 266 of the wireless power transfer structure 260 with reference to FIG. 2B.

The electric vehicle wireless power transfer unit 1514 may receive power when the electric vehicle coil 1516 is located in an electromagnetic field produced by the base coil 1504. The field may correspond to a region where energy output by the base coil 1504 may be captured by the electric vehicle coil 1516. For example, the energy output by the base coil 1504 may be at a level sufficient to charge or power the electric vehicle battery 1518.

In some implementations, the electric vehicle coil 1516 may be aligned with the base coil 1504 and, therefore, disposed within a near-field region simply by the electric vehicle operator positioning the electric vehicle 1512 such that the electric vehicle coil 1516 is sufficiently aligned relative to the base coil 1504.

Base wireless charging units (e.g., 1502a) may be located in a variety of locations. As non-limiting examples, some suitable locations include a parking area at a home of the electric vehicle 1512 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless charging system 1500. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 1512 may be used as distributed storage devices to stabilize a power grid, a convenient docking-to-grid solution may help to increase availability of vehicles for vehicle-to-grid (V2G) operation.

Figure 16:
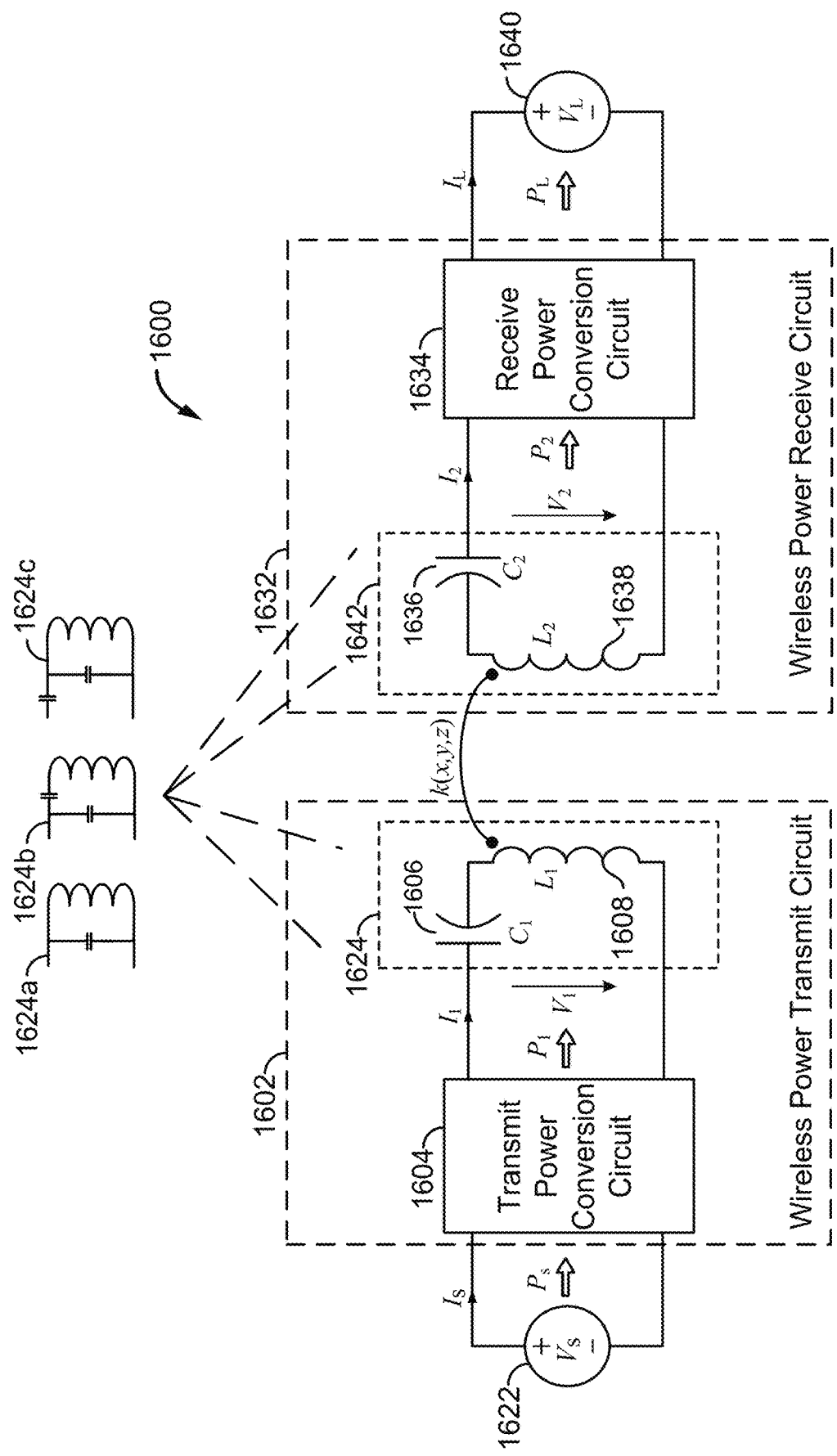
FIG. 16 is a schematic view illustrating an example implementation of a portion of the wireless charging system of FIG. 15.

FIG. 16 is a schematic view illustrating an example implementation of a wireless power transfer system 1600 that may be a portion of the wireless charging system 1500 of FIG. 15. The wireless power transfer system 1600 of FIG. 16 includes a wireless power transmit circuit 1602. The wireless power transmit circuit includes a transmit resonant circuit 1624 including a transmit coil 1608 having an inductance L1. The transmit coil 1608 may correspond to the wireless power transfer coil 226 with reference to FIG. 2A or 2B.

The wireless power transfer system 1600 further includes a wireless power receive circuit 1632. The wireless power receive circuit 1632 includes a receive resonant circuit 1642 including a receive coil 1638 having an inductance L2. The receive coil 1638 may correspond to the wireless power transfer coil 266 with reference to FIG. 2B. Implementations described herein may use capacitively loaded conductor loops (e.g., multi-turn coils) forming a resonant structure that is capable of more efficiently coupling energy from a primary structure (transmitter) to a secondary structure (receiver) via a magnetic or electromagnetic near-field (e.g., where both the transmit resonant circuit 1624 and the receive resonant circuit 1642 are tuned substantially to a common resonant frequency). Using resonant structures for coupling energy may be referred to as "magnetically coupled resonance," "electromagnetically coupled resonance," and/or "resonant induction."

With reference to FIG. 16, a power supply 1622 (e.g., AC or DC) with a voltage Vs supplies power Ps to the transmit power conversion circuit 1604. In some implementations, the transmit power conversion circuit 1604 includes circuitry such as an AC-to-DC converter configured to convert power from standard mains AC to DC power at a suitable DC voltage level, and a DC-to-AC frequency converter configured to convert DC power to power at an operating frequency $f_{wpt}$ suitable for wireless high power transfer (e.g., at 85 kHz). In some implementations, the transmit power conversion circuit 1604 includes an inverter amongst other circuitry for regulating the current Is drawn from the power supply 1622, the current $I_1$ in the transmit resonant circuit 1642, the voltage $V_1$ across the transmit resonant circuit 1624, and the power $P_1$ supplied to the transmit resonant circuit 1624. The transmit resonant circuit 1624 includes a tuning capacitor 1606 with capacitance $C_1$ in series with the transmit coil 1608 to compensate for the reactance of the transmit coil 1608 substantially at the operating frequency $f_{wpt}$. When excited by a current $I_1$, the transmit coil 1608 generates a magnetic field at the operating frequency $f_{wpt}$.

While the transmit resonant circuit 1624 is shown as series-tuned this should be considered as just one example implementation. Resonant circuits 1624a, 1624b, and 1624c provide just a few examples of other resonant topologies of parallel tuned, parallel series tuned, and the like. Other implementations may use further reactive components such as further capacitors or additional inductors (e.g., for filtering/matching and other purposes to form other topologies— e.g., LCL-topology, etc.). The transmit coil 1608 receives the power $P_1$ from the transmit power conversion circuit 1604 (e.g., AC current is driven into the transmit coil 1608) and wirelessly transmits power at a level sufficient to charge or power a load connected to the wireless power receive circuit 1632. For example, the level of power provided wirelessly by the transmit coil 1608 may be on the order of kilowatts (kW) (e.g., anywhere from 1 kW to 110 kW, although actual levels may be higher or lower).

The receive coil 1638 may be positioned within the near-field of the transmit coil 1608. In this case, the transmit coil 1608 and the receive coil 1638 may become wirelessly coupled (e.g., via a magnetic field) to one another such that power may be transferred wirelessly from the transmit coil 1608 to the receive coil 1638.

The series capacitor 1636 with capacitance $C_2$ may be provided to form a receive resonant circuit 1642 with the receive coil 1638 having an inductance $L_2$ that resonates substantially at the operating frequency $f_{wpt}$. The series-tuned receive resonant circuit 1642 should be construed as being exemplary and other resonant topologies may be used similarly as described with the transmit resonant circuit 1624 (e.g., with respect to resonant circuits 1624a, 1624b, and 1624c to form any combination of parallel or series topology).

FIG. 16 also indicates magnetic field coupling between transmit coil 1608 and receive coil 1638 with a coupling coefficient k(x,y,z) that is a function of the vertical separation (z) and horizontal displacement (x,y). If sufficiently coupled to the transmit coil 1608, the receive resonant circuit 1642 receives and provides the power $P_2$ to a receive power conversion circuit 1634 of the wireless power receive circuit 1632. An electrical current in the receive resonant circuit 1642 is represented by $I_2$ and a voltage across the receive resonant circuit 1642 is represented by $V_2$.

The receive power conversion circuit 1634 may include, among other things, an AC-to-DC converter configured to convert power at an operating frequency back to DC power at a voltage $V_L$ of the load 1640 that may represent a battery unit. In some implementations, the receive power conversion circuit 1634 includes a rectifier amongst other circuitry (e.g., DC-DC converter) for regulating the current $I_2$ in the receive coil 1638), the voltage $V_2$ across the receive resonant circuit 1642, the current $I_L$ and the power $P_L$ supplied to the load 1640.

The transmit power conversion circuit 1604 and/or the transmit resonant circuit 1624 may further include other matching and/or filter circuitry configured to match impedances between the transmit resonant circuit 1624 and the transmit power conversion circuit 1604 and provide other filter functions (e.g., harmonics filtering). Other amplifiers/oscillators and other circuitry for driving the transmit coil 1608 with the appropriate current/voltage is also contemplated. Likewise, the receive power conversion circuit 1634 and/or the receive resonant circuit 1642 may also include similar matching and/or filter circuitry.

While the term "coil" is used above, the transmit coil 1608 and the receive coil 1638 may also correspond to other forms of power transfer elements. As such, the term "coil" is intended to refer to a component that may wirelessly output or receive energy for coupling to another "coil." However, in particular exemplary implementations the transmit coil 1608 and the receive coil 1638 are configured as coils of wire (e.g., Litz wire) and be configured as "conductor loops", and more specifically, "multi-turn conductor loops."

While an example has provided for the implementations described herein to be part of an electric vehicle charging system, other these techniques/implementations described with reference to FIGS. 1-14 may be used for other applications.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general-purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The bus may also link various other circuits such as timing sources, peripherals, voltage regulators, power management circuits, and the like.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for detecting objects, the apparatus comprising:
    a plurality of sense circuits, each of the plurality of sense circuits comprising:
        a sense coil configured to inductively sense an object and having a reactance and an equivalent series resistance at an operating frequency; and
        a series capacitor electrically connected in series to the sense coil and configured to compensate for the reactance of the sense coil at an operating frequency;
    a driver circuit having a plurality of outputs each electrically connected to a first terminal of a respective sense circuit of the plurality of sense circuits and configured to selectively drive a current at the operating frequency in the sense coil and the series capacitor of the respective sense circuit, the driver circuit further comprising:
  a driver amplifier having a voltage source output;
  a plurality of input multiplexer switches each configured to selectively connect the voltage source output to a selected one of the plurality of outputs of the driver circuit; and
  a plurality of first resistors each configured to mimic a current source characteristic at each of the plurality of outputs of the driver circuit and provide a current source output to the respective sense circuit; and
a measurement circuit having a plurality of inputs each electrically connected to a second terminal of the respective sense circuit of the plurality of sense circuits and configured to selectively measure a voltage across the sense coil and the series capacitor of the respective sense circuit in response to the current in the sense coil and the series capacitor, the measurement circuit comprising:
  a plurality of second resistors each configured to mimic a voltage measurement circuit characteristic at each of the plurality of inputs of the measurement circuit;
  a measurement amplifier having an input with a current measurement circuit characteristic; and
  a plurality of output multiplexer switches each configured to selectively connect a selected input of the plurality of inputs of the measurement circuit to the input of the measurement amplifier and provide an output of the respective sense circuit to the input of the measurement amplifier.

2. The apparatus of claim 1, further comprising a detection circuit electrically connected to the measurement circuit and configured to determine whether an object is proximate to the sense coil of at least one of the plurality of sense circuits based on an output of the measurement circuit.

3. The apparatus of claim 2, wherein the output of the measurement circuit is indicative of an impedance of the respective sense circuit and wherein proximity of the object to the sense coil of the respective sense circuit is determined based on a change in the impedance of the respective sense circuit.

4. The apparatus of claim 1, wherein each sense circuit additionally comprises a shunt inductor electrically connected in parallel to the series connection of the sense coil and the series capacitor, the shunt inductor configured to:
  have a reactance substantially larger than an impedance of the series connection of the sense coil and the series capacitor; and
  attenuate a signal component with a frequency substantially lower than the operating frequency in the voltage at the input of the measurement circuit that is selectively connected to the respective sense circuit.

5. The apparatus of claim 1, wherein each sense circuit additionally comprises a DC block capacitor configured to attenuate a current with a frequency substantially lower than the operating frequency at the output of the driver circuit that is selectively connected to the respective sense circuit.

6. The apparatus of claim 1, wherein each sense circuit additionally comprises a DC block capacitor configured to attenuate a voltage with a frequency substantially lower than the operating frequency at the input of the measurement circuit that is selectively connected to the respective sense circuit.

7. The apparatus of claim 1, wherein the sense coils of the plurality of sense circuits are positioned to be distributed over a predetermined area at least partially defined by a wireless power transmit coil configured to inductively transfer power.

8. The apparatus of claim 7, wherein the operating frequency is higher than a fundamental frequency of a magnetic field generated by the wireless power transmit coil.

9. The apparatus of claim 1, wherein the impedance of the series connection of each sense coil and series capacitor at the operating frequency is substantially resistive.

10. A method of detecting objects, the method comprising:
  in a driver circuit having a plurality of outputs each electrically connected to a first terminal of a respective sense circuit of a plurality of sense circuits each comprising: a sense coil having a reactance and an equivalent series resistance at an operating frequency; and a series capacitor electrically connected in series to the sense coil, selectively driving a current at an operating frequency into the sense coil and series capacitor of the respective sense circuit of the plurality of sense circuits by at least:
    producing a voltage at a voltage source output of a driver amplifier;
    operating a plurality of input multiplexer switches to selectively connect the voltage source output to a selected output of the plurality of outputs of the driver circuit; and
    in a selected resistor of a plurality of first resistors connected to the plurality of outputs of the driver circuit, mimicking a current source characteristic at the selected output and providing a current source output to the respective sense circuit;
  in the sense coil of the respective sense circuit, inductively sensing the object;
  in the series capacitor, compensating for the reactance of the sense coil at the operating frequency; and
  in a measurement circuit having a plurality of inputs each electrically connected to a second terminal of the respective sense circuit, selectively measuring a voltage across the sense coil and the series capacitor of the respective sense circuit in response to the current in the sense coil and the series capacitor, wherein measuring the voltage comprises:
    operating a plurality of output multiplexer switches to selectively connect a selected input of the plurality of inputs of the measurement circuit to an input of a measurement amplifier having a current measurement circuit characteristic; and
    in a selected resistor of a plurality of second resistors connected to the plurality of inputs of the measurement circuit, mimicking a current voltage measurement circuit characteristic at the selected input.

11. The method of claim 10, further comprising driving current into and measuring voltage across each of the sense circuits in turn.

12. The method of claim 10, further comprising, in a detection circuit electrically connected to the measurement circuit, determining whether an object is proximate to the sense coil of at least one of the plurality of sense circuits based on an output of the measurement circuit.

13. The method of claim 12, wherein the output of the measurement circuit is indicative of an impedance of the respective sense circuit and wherein proximity of the object to the sense coil of the respective sense circuit is determined based on a change in the impedance of the respective sense circuit.

14. The method of claim 10, further comprising, in the respective sense circuit, attenuating a signal component with a frequency substantially lower than the operating frequency in the voltage at the input of the measurement circuit that is selectively connected to the respective sense circuit via a shunt inductor electrically connected in parallel to the series connection of the sense coil and the series capacitor, the shunt inductor configured to have a reactance substantially larger than an impedance of the series connection of the sense coil and the series capacitor.

15. The method of claim 10, further comprising, in the respective sense circuit, using a DC block capacitor to attenuate a current with a frequency substantially lower than the operating frequency at the output of the driver circuit that is selectively connected to the respective sense circuit.

* * * * *